US012598069B2

(12) United States Patent (10) Patent No.: US 12,598,069 B2
Radu et al. (45) Date of Patent: *Apr. 7, 2026

(54) MONITORING IN DISTRIBUTED COMPUTING SYSTEM

(71) Applicant: MASTERCARD INTERNATIONAL INCORPORATED, Purchase, NY (US)

(72) Inventors: Cristian Radu, Beauvechain (BE); Mehdi Collinge, Mont-Sainte-Aldegonde (BE); Omar Laazimani, London (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 98 days.

This patent is subject to a terminal disclaimer.

(21) Appl. No.: 18/761,652

(22) Filed: Jul. 2, 2024

(65) Prior Publication Data

US 2025/0007713 A1 Jan. 2, 2025

Related U.S. Application Data

(63) Continuation of application No. 17/088,079, filed on Nov. 3, 2020, now Pat. No. 12,052,361.

(30) Foreign Application Priority Data

Nov. 4, 2019 (EP) .................................... 19206982

(51) Int. Cl.
*H04L 29/06* (2006.01)
*G06F 9/50* (2006.01)
(Continued)

(52) U.S. Cl.
CPC .............. *H04L 9/32* (2013.01); *G06F 9/5072* (2013.01); *G06F 9/546* (2013.01);
(Continued)

(58) Field of Classification Search
CPC ......... H04L 9/32; H04L 9/3242; H04L 63/12; G06F 9/5072; G06F 9/546;
(Continued)

(56) References Cited

U.S. PATENT DOCUMENTS 7,571,230 B2 8/2009 Gissel et al.
8,463,894 B2 6/2013 Chen
(Continued)

FOREIGN PATENT DOCUMENTS

CA 2944361 A1 10/2015
CN 1567755 A 1/2005
(Continued)

OTHER PUBLICATIONS

International Search Report and Written Opinion for International Patent Application No. PCT/US2020/053193, mailed Dec. 29, 2020, 11 pages.
(Continued)

*Primary Examiner* — Sher A Khan
(74) *Attorney, Agent, or Firm* — Jordan IP Law, LLC

(57) ABSTRACT

A method is described of monitoring a service performed at a computing node. The computing node is one of a plurality of computing nodes in a distributed computing system. Each computing node is adapted to perform at least one service for clients. A monitoring process is adapted to monitor a service process performing the process. In the method, the monitoring process monitors the service process on performance of the service. The monitoring service then provides monitoring information to a monitoring process for another service process. A suitable computing node for performing the service is described, as is a coordinated monitoring service for supporting multiple monitoring services.

20 Claims, 33 Drawing Sheets

(51) Int. Cl.

| | |
|---|---|
| *G06F 9/54* | (2006.01) |
| *G06F 11/30* | (2006.01) |
| *H04L 9/32* | (2006.01) |
| *H04L 9/40* | (2022.01) |

(52) U.S. Cl.
CPC ........ *G06F 11/3006* (2013.01); *H04L 9/3242* (2013.01); *H04L 63/12* (2013.01)

(58) Field of Classification Search
CPC ............. G06F 11/3006; G06Q 20/202; G06Q 20/223; G06Q 30/018; G07F 9/002; G07F 9/026; G07F 17/3223
See application file for complete search history.

(56) References Cited

U.S. PATENT DOCUMENTS

| | | | |
|---|---|---|---|
| 9,787,697 | B2 | 10/2017 | Betz et al. |
| 10,038,619 | B2 | 7/2018 | Mercuri |
| 10,078,571 | B2 | 9/2018 | Altman et al. |
| 10,313,117 | B1 | 6/2019 | Carlough et al. |
| 10,467,422 | B1 | 11/2019 | Roth et al. |
| 10,812,319 | B1 | 10/2020 | Prakash et al. |
| 11,777,712 | B2 | 10/2023 | Androulaki et al. |
| 12,052,361 | B2 | 7/2024 | Radu et al. |
| 2002/0198848 | A1 | 12/2002 | Michener |
| 2003/0023864 | A1 | 1/2003 | Muttik et al. |
| 2003/0036886 | A1 | 2/2003 | Stone |
| 2004/0019565 | A1 | 1/2004 | Goringe et al. |
| 2004/0255163 | A1 | 12/2004 | Swimmer et al. |
| 2005/0013293 | A1 | 1/2005 | Sahita |
| 2006/0156380 | A1 | 7/2006 | Gladstone et al. |
| 2006/0179296 | A1 | 8/2006 | Bartlett et al. |
| 2007/0118483 | A1 | 5/2007 | Hill et al. |
| 2008/0167003 | A1 | 7/2008 | Wang et al. |
| 2008/0307088 | A1 | 12/2008 | Chen |
| 2009/0048953 | A1 | 2/2009 | Hazel et al. |
| 2010/0325265 | A1* | 12/2010 | Schuster ............... H04L 67/125 |
| | | | 709/224 |
| 2011/0126059 | A1* | 5/2011 | Klein .................. G06F 11/3055 |
| | | | 709/224 |
| 2012/0158925 | A1* | 6/2012 | Shen ................... G06F 11/3082 |
| | | | 709/221 |
| 2012/0254965 | A1* | 10/2012 | Parker ................. H04L 63/0838 |
| | | | 726/7 |
| 2013/0031042 | A1 | 1/2013 | Dehnie et al. |
| 2014/0046998 | A1 | 2/2014 | Dain et al. |
| 2014/0229729 | A1 | 8/2014 | Roth et al. |
| 2014/0359280 | A1 | 12/2014 | Saboor et al. |
| 2014/0359281 | A1 | 12/2014 | Saboori et al. |
| 2015/0026786 | A1 | 1/2015 | Alexander |
| 2015/0135279 | A1 | 5/2015 | Hayat |
| 2015/0163121 | A1 | 6/2015 | Mahaffey et al. |
| 2015/0178724 | A1 | 6/2015 | Ngo et al. |
| 2016/0148202 | A1 | 5/2016 | McCormack et al. |
| 2016/0149873 | A1 | 5/2016 | Dickinson et al. |
| 2016/0149923 | A1 | 5/2016 | Zhang et al. |
| 2016/0323362 | A1 | 11/2016 | Srinivasaiah et al. |
| 2016/0378629 | A1 | 12/2016 | Gwozdz |

| | | | | |
|---|---|---|---|---|
| 2017/0026371 | A1 | 1/2017 | Holtmanns et al. | |
| 2017/0083860 | A1 | 3/2017 | Sriram et al. | |
| 2017/0331802 | A1 | 11/2017 | Keshava et al. | |
| 2017/0339178 | A1* | 11/2017 | Mahaffey ........... | G06F 11/3006 |
| 2018/0041336 | A1 | 2/2018 | Keshava et al. | |
| 2018/0075262 | A1 | 3/2018 | Auh | |
| 2018/0109508 | A1 | 4/2018 | Wall et al. | |
| 2018/0240110 | A1 | 8/2018 | Smets et al. | |
| 2019/0098039 | A1 | 3/2019 | Gates et al. | |
| 2019/0108511 | A1 | 4/2019 | Dunjic et al. | |
| 2019/0158594 | A1 | 5/2019 | Shadmon et al. | |
| 2019/0236592 | A1 | 8/2019 | Arora | |
| 2019/0253434 | A1 | 8/2019 | Biyani et al. | |
| 2020/0394648 | A1 | 12/2020 | Blackshear et al. | |
| 2021/0067550 | A1 | 3/2021 | Paine | |
| 2021/0133067 | A1* | 5/2021 | Radu ..................... | H04L 9/3242 |
| 2023/0318816 | A1 | 10/2023 | Nakazawa et al. | |

FOREIGN PATENT DOCUMENTS

| | | | | | |
|---|---|---|---|---|---|
| CN | 106462544 | A | | 2/2017 | |
| CN | 106462601 | A | | 2/2017 | |
| CN | 106464500 | A | | 2/2017 | |
| CN | 108959038 | A | * | 12/2018 | .......... G06F 11/3006 |
| CN | 109154885 | A | | 1/2019 | |
| CN | 109413062 | A | | 3/2019 | |
| CN | 109542725 | A | * | 3/2019 | .......... G06F 11/3409 |
| CN | 105391744 | B | * | 10/2019 | .......... H04L 63/083 |
| CN | 108446947 | B | | 5/2021 | |
| EP | 2965465 | A1 | | 1/2016 | |
| EP | 2780832 | B1 | | 5/2016 | |
| EP | 2965465 | B1 | | 5/2018 | |
| EP | 3358867 | A1 | | 8/2018 | |
| EP | 3364363 | A1 | | 8/2018 | |
| EP | 3416118 | A1 | | 12/2018 | |
| EP | 3432248 | A1 | | 1/2019 | |
| EP | 3748525 | A1 | | 12/2020 | |
| EP | 3748526 | A1 | | 12/2020 | |
| RU | 97119182 | A | | 9/1999 | |
| RU | 2686818 | C1 | | 4/2019 | |
| WO | 200008806 | A1 | | 2/2000 | |
| WO | 2008082587 | A1 | | 7/2008 | |
| WO | 2012004891 | A1 | | 1/2012 | |
| WO | 2013155912 | A1 | | 10/2013 | |
| WO | 2014135195 | A1 | | 9/2014 | |
| WO | 2018031856 | A1 | | 2/2018 | |
| WO | 2018050229 | A1 | | 3/2018 | |
| WO | WO-2019071926 | A1 | * | 4/2019 | .......... G06F 11/3039 |

OTHER PUBLICATIONS

Extended European Search Report for European Patent Application No. 19206982.1, mailed Feb. 10, 2020, 7 pages.

Office Action for European Patent Application No. 19206982.1, Mailed May 3, 2024, 5 pages.

Rajeev Kumar Sing, "Generating unique IDs in a distributed environment at high scale. I CalliCoder", Jul. 8, 2018, XP055564378, 15 pages, Retrieved from the Internet: URL:https//www.callicoder.com/distributed-uniqued-sequence-number-generator/.

\* cited by examiner

Geographically Distributed Entities

Central System

Geographically Distributed Entities

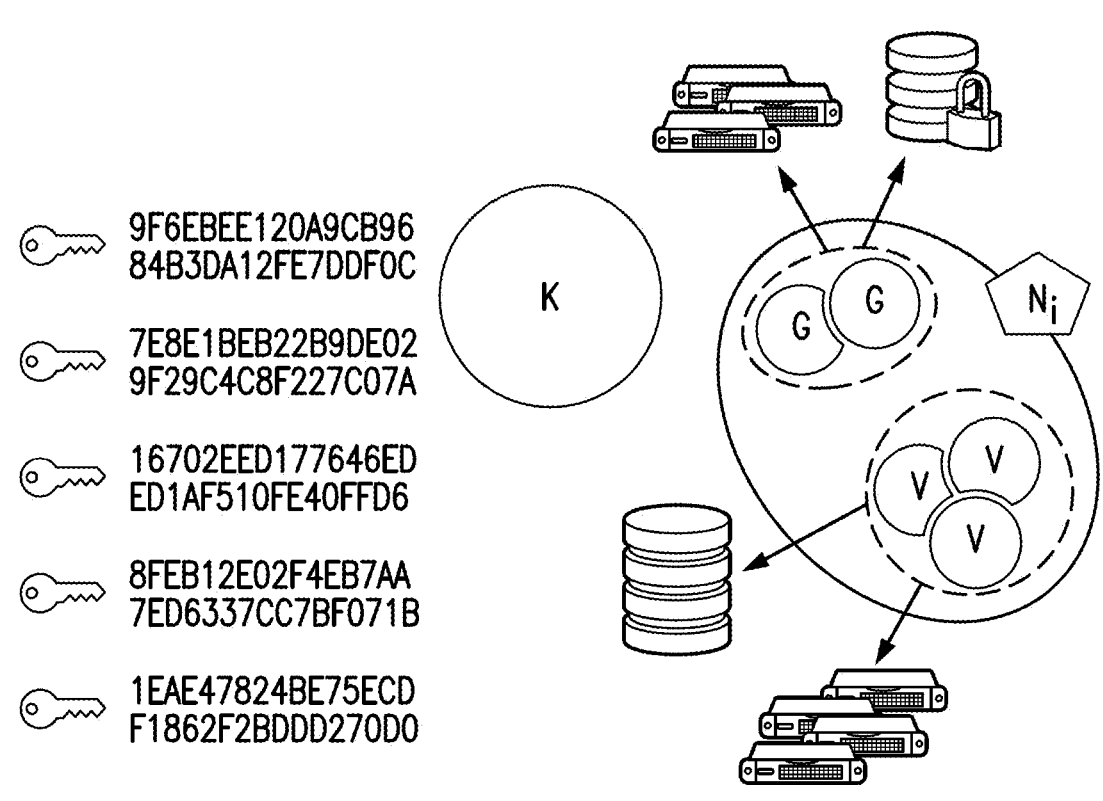
9F6EBEE120A9CB96
84B3DA12FE7DDF0C
7E8E1BEB22B9DE02
9F29C4C8F227C07A
16702EED177646ED
ED1AF510FE40FFD6
8FEB12E02F4EB7AA
7ED6337CC7BF071B
1EAE47824BE75ECD
F1862F2BDDD270D0
Key list "A" with 10 entries in *Keylds*
*Identifier* 0d51839f-a66a-4fb8-8395-e88e45b447cb
(0, 🔑), (1, 🔑), (2, 🔑), (3, 🔑), (4, 🔑),
(5, 🔑), (6, 🔑), (7, 🔑), (8, 🔑), (9, 🔑),
Key list "B" with 10 entries in *Keylds*
*Identifier* 515f3fea-337d-41ee-8681-b90af4d84071
(0, 🔑), (1, 🔑), (2, 🔑), (3, 🔑), (4, 🔑),
(5, 🔑), (6, 🔑), (7, 🔑), (8, 🔑), (9, 🔑),
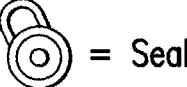 = Seal
FIG. 13

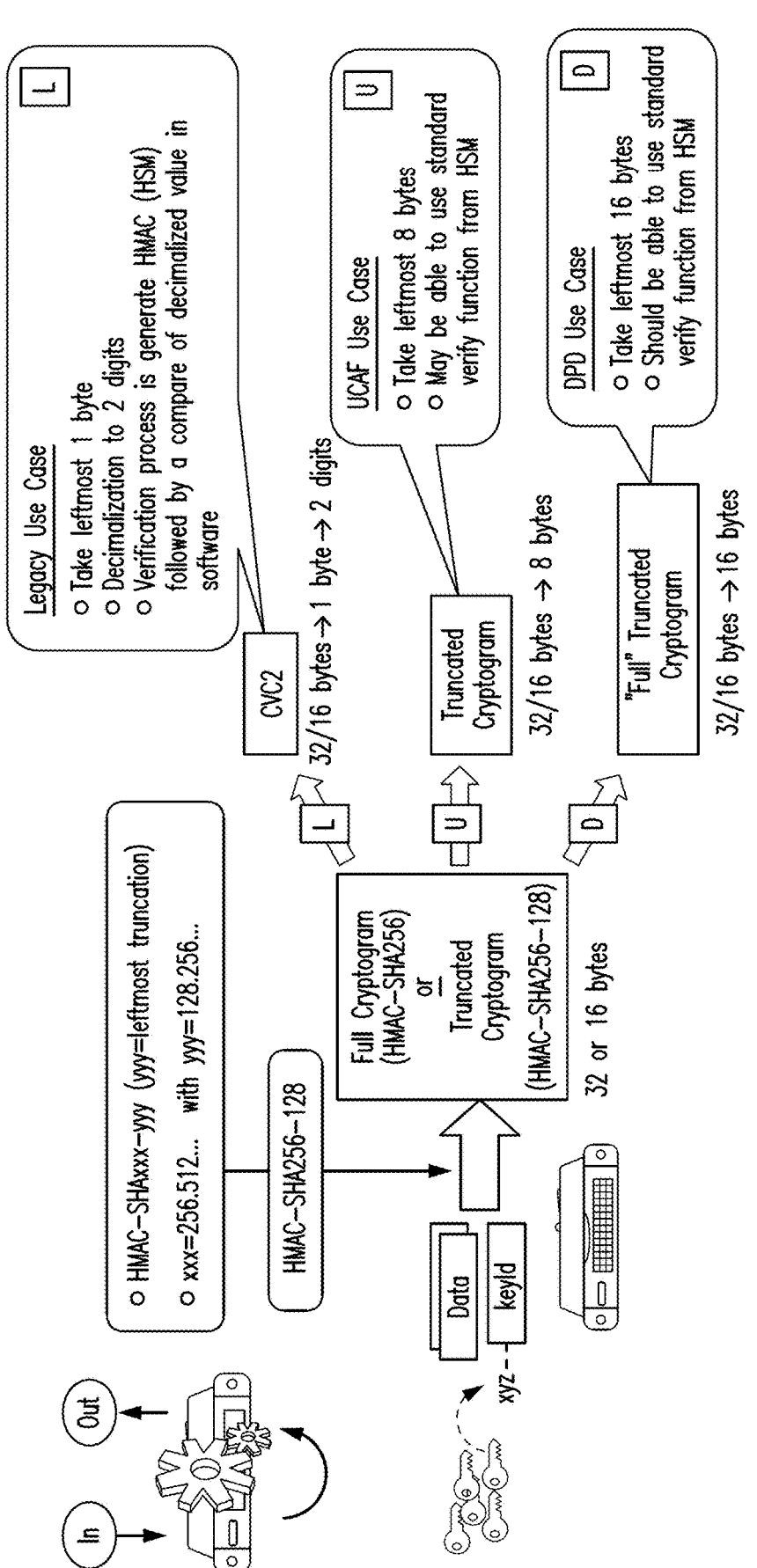

Legacy Use Case o Take leftmost 1 byte
o Decimalization to 2 digits
o Verification process is generate HMAC (HSM) followed by a compare of decimalized value in software

UCAF Use Case o Take leftmost 8 bytes
o May be able to use standard verify function from HSM

DPD Use Case o Take leftmost 16 bytes
o Should be able to use standard verify function from HSM

CVC2

32/16 bytes → 1 byte → 2 digits

Truncated Cryptogram

32/16 bytes → 8 bytes

"Full" Truncated Cryptogram

32/16 bytes → 16 bytes o HMAC-SHAxxx-yyy (yyy=leftmost truncation)

o xxx=256.512... with yyy=128.256...

HMAC-SHA256-128

Full Cryptogram (HMAC-SHA256)
or
Truncated Cryptogram (HMAC-SHA256-128)

32 or 16 bytes

Data keyId xyz - -

In → Out

FIG. 15

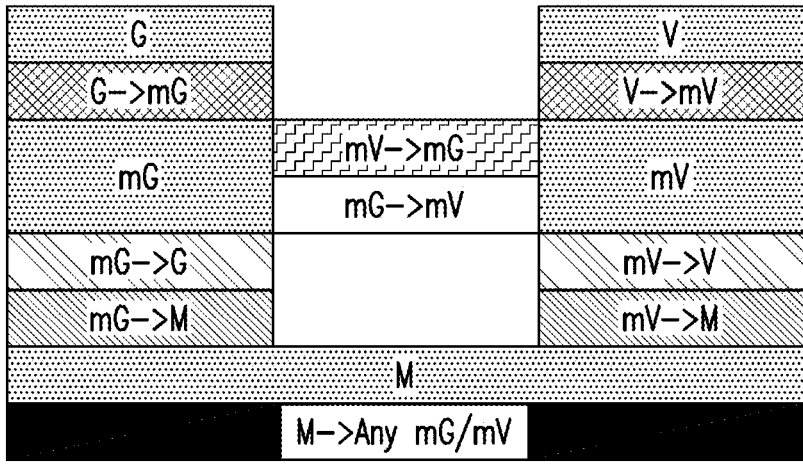

FIG. 20a

| | |
|---|---|
| Processing | Processing done by any component (G, V, mG, mV, M) |
| Monitoring | in-node monitoring (vertical: G-> mG or V->mV) |
| Reporting | in-node or inter-node reporting (horizontal: mV->mG) |
| Action (vertical) | in-node action (vertical: mG->G or mV->V) |
| Reaction (horizontal) | in-node or inter-node reaction (horizontal: mG -> mV) |
| Escalation | Escalation ("vertical" to Coordinated M: mG->M or mV->M) |
| Distributed Action | Distributed Action (Coordinated M->Any mG/mV) |

FIG. 20b

MONITORING IN DISTRIBUTED COMPUTING SYSTEM

CROSS-REFERENCE TO RELATED APPLICATIONS

The present application is a continuation of and claims the benefit of priority to U.S. application Ser. No. 17/088,079, filed on Nov. 3, 2020, which claims priority to European Patent Application No. 19206982.1 (filed on Nov. 4, 2019), which is hereby incorporated by reference in its entirety.

FIELD OF DISCLOSURE

The present disclosure relates to monitoring in a distributed computing system, in particular, a distributed computing system performing one or more secure processes.

BACKGROUND TO DISCLOSURE

There are multiple technical challenges with requiring a centralized system to provide services to a very large number of clients, particularly when these are widely geographically distributed. It is logical to consider distributing the system so that the relevant services can be provided by a set of geographically distributed servers, rather than one central server or data centre.

In practice, such decentralisation may use a cloud architecture, which will typically use a number of geographically distributed servers—or data centres—to deliver services to clients. The cloud architecture may be considered as comprising a number of nodes—when using a cloud architecture, a node may be an aggregation of a number of computers and may cover more than one data centre with "real-time" connectivity and data sharing within a given node.

Decentralisation may itself be problematic, particularly if it is necessary for services to be provided in such a way that provision of the service has consequences beyond the server providing the service and the client receiving it. If, for example, other clients (or other system nodes) need to refer back to the service providing node to check on whether, or how, the service has been provided, or if it is necessary for a central system to have knowledge of how the service has been provided or of expected operation of the distributed server node, then new bottlenecks may appear in place of the former bottleneck at the central server, the overall quantity of messaging in the system may increase, and network latency can become a serious issue.

This is particular serious when the service relates to security (so it is necessary to be confident that it has been securely performed across the whole system) and when it relates to provision of a service over a short time frame. Both issues apply to transaction systems—it is necessary for transactions to be authorised over short time periods, and it is necessary to ensure that they have been performed legitimately—but apply to other technical contexts as well.

Performing activities securely in a distributed environment of this kind is challenging, because there is potential for malicious parties to exploit the possibility that an action may be performed in one of several places in a number of ways. It is desirable to address this challenge, but without resorting to approaches that would significantly erode the benefits of using a distributed environment.

SUMMARY OF DISCLOSURE

In a first aspect, the disclosure provides a method of monitoring a service performed at a computing node, wherein the computing node is one of a plurality of computing nodes in a distributed computing system each adapted to perform at least one service for clients, wherein a monitoring process is adapted to monitor a service process performing the process, the method comprising the monitoring process: monitoring the service process for expected operation of the service; and providing monitoring information to a monitoring process for another service process.

Using such an approach involving peer-to-peer communication between monitoring processes, less monitoring information needs to be exchanged and the exchange of information can take place more rapidly. This allows an effective balance between practical processing requirements and security requirements.

In certain cases, the monitoring process provides the monitoring information directly after the service process is completed. In other cases, the monitoring process provides monitoring information after monitoring information is received from another service process. As is discussed below, embodiments are particularly relevant to complementary services, in which case one role may be taken for one service and the other for the other service.

In embodiments, the monitoring information is provided to a monitoring process in another computing node. In some embodiments, there is a plurality of service processes in the computing node, and the monitoring information is provided to a monitoring process in the computing node. In some cases, the monitoring information may be provided to a plurality of monitoring processes.

In embodiments, the monitoring process has a monitoring process database, wherein the monitoring process may update the monitoring process database on monitoring the service process.

In embodiments, the service processes comprise a first service process for performing a first service and a second service process for performing a second service, wherein the first service process and the second service process are complementary to each other. Embodiments of the disclosure are particularly relevant to provision of complementary services by the distributed network in this way. In some cases, the computing node may contain a plurality of service processes, and these may comprise first service processes, second service processes, or both first services and second service processes. This first service process may comprise generation of a credential and the second service process may comprise verification of a credential. A credential is here provided as a cryptographic proof, with verification as an establishment that the cryptographic proof is valid. This is particularly useful in the context of a payment system. In a payment system, a credential may be generated on behalf of a payment device user to indicate proof that they have authorised a payment to a merchant using a payment device. Verification is then required on behalf of the merchant or the merchant's acquiring bank to determine that the transaction is legitimate and has been authorised by the payment device user.

In one such case, the service process may be a second service process, and the method comprise providing monitoring information to a monitoring process of a first service process that generated the credential. Here, the monitoring process may also receive a monitoring information response from the monitoring process from the first service process that generated the credential. After receiving the monitoring information response, the monitoring process may update the service process. This may be used to indicate a number of different situations. The monitoring information response may indicate that the credential was not valid. This could be because the credential was never generated. This may result from a guessing attack by a party asking for a verifying service—this may, for example, be a merchant (or one of a coalition of merchants) trying to obtain payment for a bogus transaction by generating a false proof of payment. Alternatively, the monitoring information response may indicate that the credential is not available for legitimate use—this may be because the credential has already been used, and in the payment case a rogue user may be trying to perform the same payment twice.

In another such case, the service process may be a first service process, and the method may comprise providing monitoring information to a monitoring process for a second service process that verified the credential. The monitoring information may then be provided as a monitoring information response in response to verification monitoring information received from the monitoring process for the second service process that verified the credential. Here, on receiving the verification monitoring information, the monitoring process may determine whether the credential has already been used, and if so, indicates this in the monitoring information. On receiving the verification monitoring information, the monitoring process may determine whether the credential is available for legitimate use, and if not, indicate this in the monitoring information.

As discussed in more detail below, this structure prevents a number of potential system abuses. It also addresses failures, such as data corruption which causes a credential to be identified wrongly. It also can be used to establish proper system use over an appropriate period, such as the period of validity of cryptographic keys used in the service processes.

In embodiments, the monitoring process is also adapted to provide an update message to update the service process that it monitors. In addition to having a peer-to-peer "horizontal" path between monitoring services, there is then a "vertical" path between the monitoring process and the service process itself. Typically, the monitoring process provides the update message after providing the monitoring information. The service process may have an associated service process database, wherein on receiving an update message from the monitoring process the service process updates the service process database.

In embodiments, the monitoring process is also adapted to provide an escalation message to, or receive an action message from, a coordinated monitoring process associated with multiple service processes. The monitoring process may provide the escalation message after providing the monitoring information. After providing the escalation message, the monitoring process may receive an action message from the coordinated monitoring process to make an update. On receiving such an action message, the monitoring process may update the service process. This approach is particularly useful in cases where the impact is more extensive than between two related complementary services.

In a second aspect, the disclosure provides a method of monitoring services performed in a distributed computing system, wherein the distributed computing system comprises a plurality of computing nodes each adapted to perform at least one service for clients, wherein the service is performed by a service process having an associated monitoring process, wherein the method is performed by a coordinated monitoring service, the method comprising: receiving an escalation message from one of the monitoring processes; determining from the escalation message whether action is required at one or more service processes in one or more computing nodes; and if action is required, sending an action message to the monitoring process for the affected service processes. The monitoring process can then update its service process if required.

These service processes may comprise a first service process for performing a first service and a second service process for performing a second service, with the first service and the second service are complementary to each other. The first service process may comprise generation of a credential and the second service process may comprise verification of a credential. Here, the action message may indicate to a plurality of second service monitoring processes that a credential has already been used. The action message may be used to update a plurality of service processes, via their monitoring processes, that an identified user of the distributed computing system is no longer allowed to use one or more of the services.

In a third aspect, the disclosure provides a computing node adapted to perform at least one service, wherein the computing node is one of a plurality of computing nodes in a distributed computing system each adapted to perform at least one service for clients, wherein a monitoring process is adapted to monitor a service process performing the process, the computing node comprising: a service process adapted to perform the service in response to a client request; and a monitoring process adapted to monitor the service process on expected operation of the service and to provide monitoring information to a monitoring process for another service process.

The monitoring process may be adapted to provide the monitoring information directly after the service process is completed. The monitoring process may alternatively be adapted to provide monitoring information after monitoring information is received from another service process.

This monitoring information may be provided to a monitoring process in another computing node. In some cases, the computing node may comprise a plurality of service processes, and further comprises a monitoring process for each service process. Such a monitoring process may be adapted to provide monitoring information to a monitoring process in the computing node. The monitoring information may be provided to a plurality of monitoring processes.

The computing node may further comprise a monitoring process database associated with the monitoring process, wherein the monitoring process is adapted to update the monitoring process database on monitoring the service process.

In embodiments, service processes may comprise a first service process for performing a first service and a second service process for performing a second service, wherein the first service process and the second service process are complementary to each other. A computing node may contain a plurality of service processes, and these may comprise first service processes, second service processes, or both first services and second service processes. The first service process may comprise generation of a credential and the second service process comprises verification of a credential.

Where the service process is a second service process, the monitoring process may be adapted to provide monitoring information to a monitoring process of a first service process that generated the credential. Such a monitoring process may also be adapted to receive a monitoring information response from the monitoring process from the first service process that generated the credential.

Where the service process is a first service process, the monitoring process may provide monitoring information to a monitoring process for a second service process that verified the credential. Such a monitoring process may also be adapted to provide a monitoring information response in response to verification monitoring information received from the monitoring process for the second service process that verified the credential.

The monitoring process may also be adapted to provide an update message to update the service process that it monitors. Such a monitoring process may be adapted to provide the update message after providing the monitoring information. The computing node comprises a service process database associated with the service process, wherein the service process is adapted to update the service process database on receiving an update message from the monitoring process.

The monitoring process may also be adapted to provide an escalation message to, or receive an action message from, a coordinated monitoring process associated with multiple service processes. Such a monitoring process may be adapted to provide the escalation message after providing the monitoring information. After providing the escalation message, the monitoring process may also be adapted to receive an action message from the coordinated monitoring process to make an update. On receiving the action message, the monitoring process may also be adapted to update the service process.

In a fourth aspect, the disclosure provides a distributed computing system for providing services to clients, the system comprising a plurality of computing nodes as identified in the third aspect of the disclosure, wherein each computing node is adapted to perform at least one service for clients.

DESCRIPTION OF SPECIFIC EMBODIMENTS

Specific embodiments of the disclosure are now described, by way of example, with reference to the accompanying drawings, of which:

Figure 8:
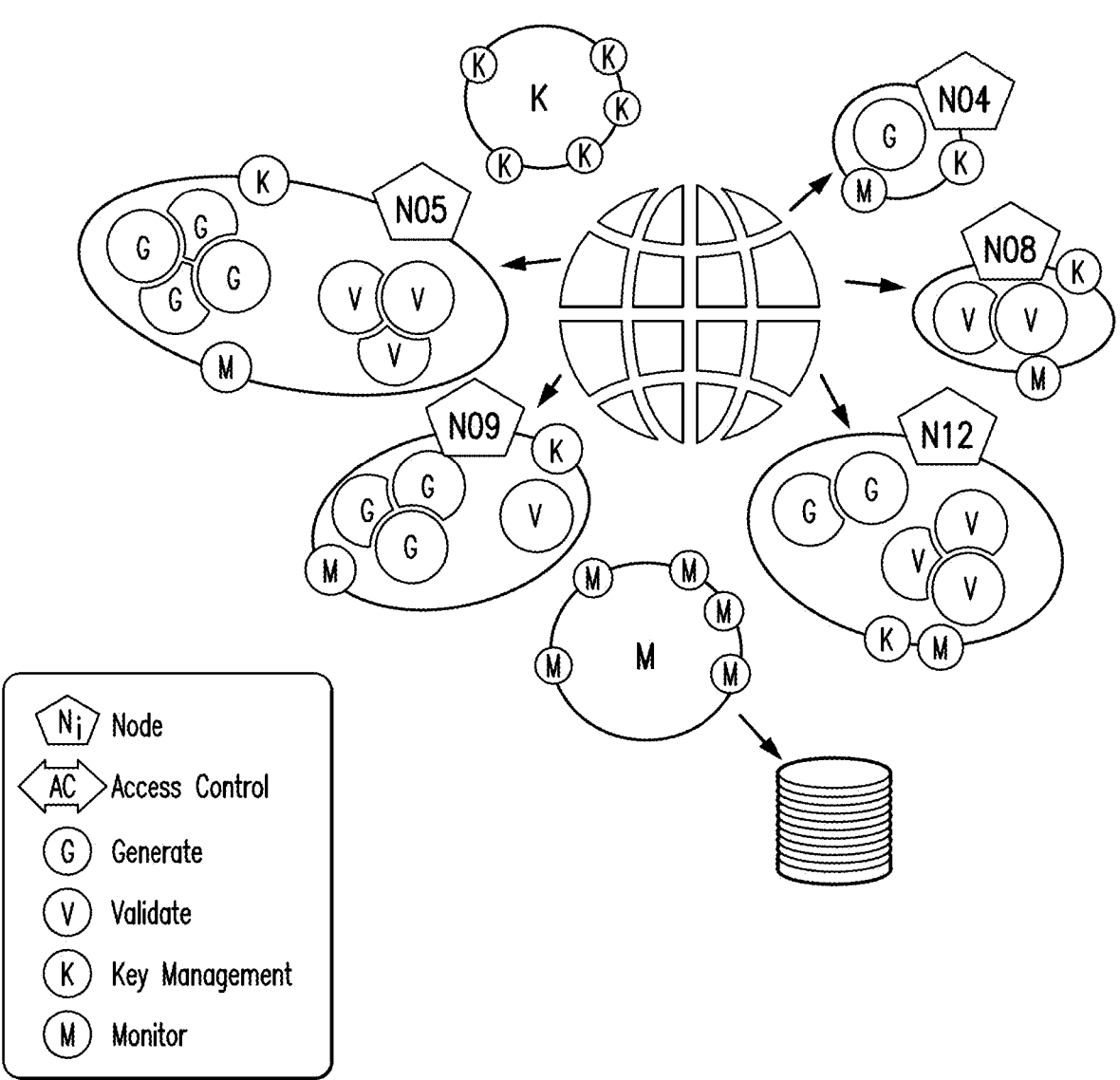
FIG. 8 illustrates schematically an arrangement for a distributed system for digital enablement of transactions.
Figure 9:
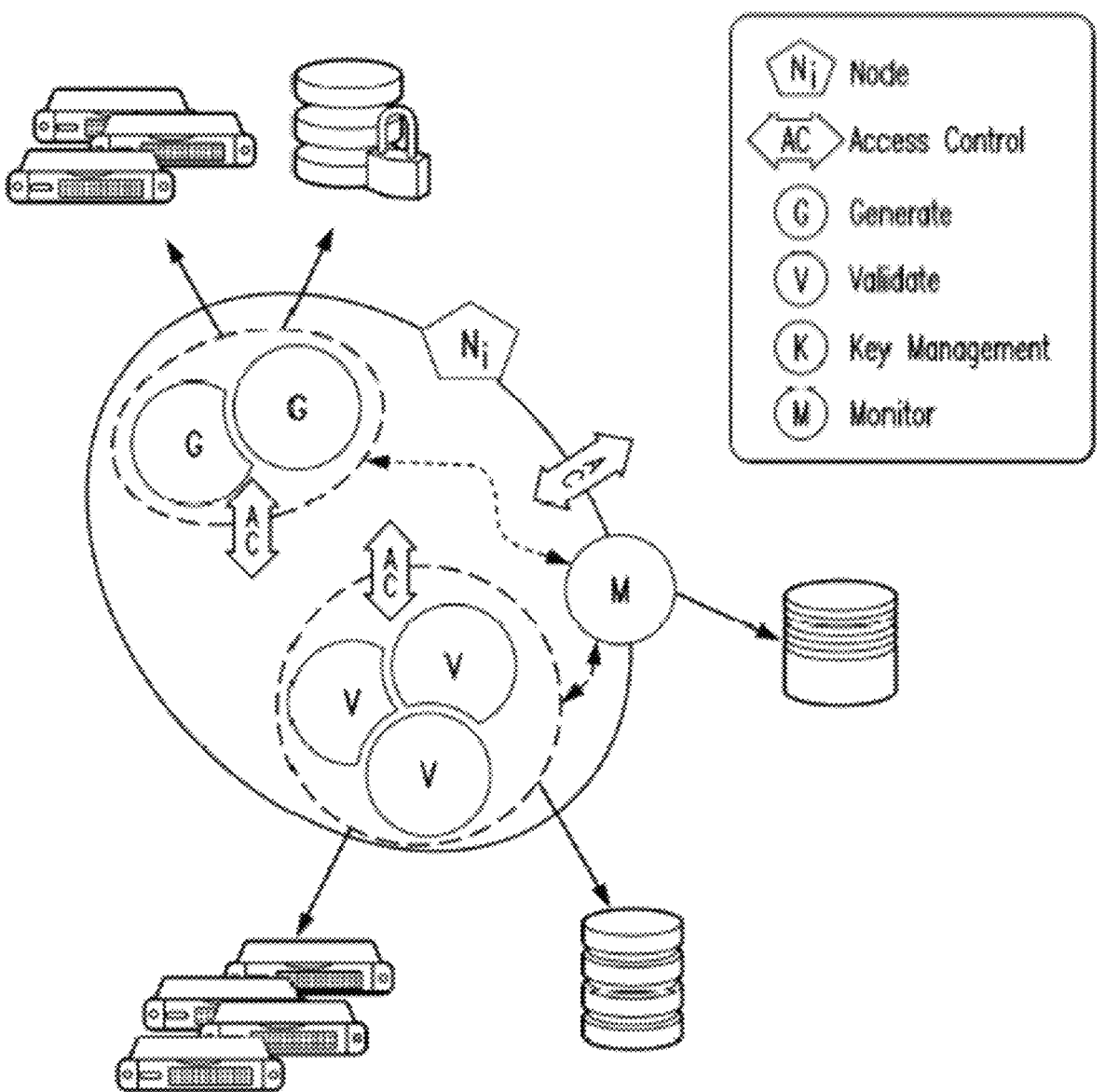
FIG. 9 illustrates a computing node of the arrangement of FIG. 8 in more detail.
Figure 10:
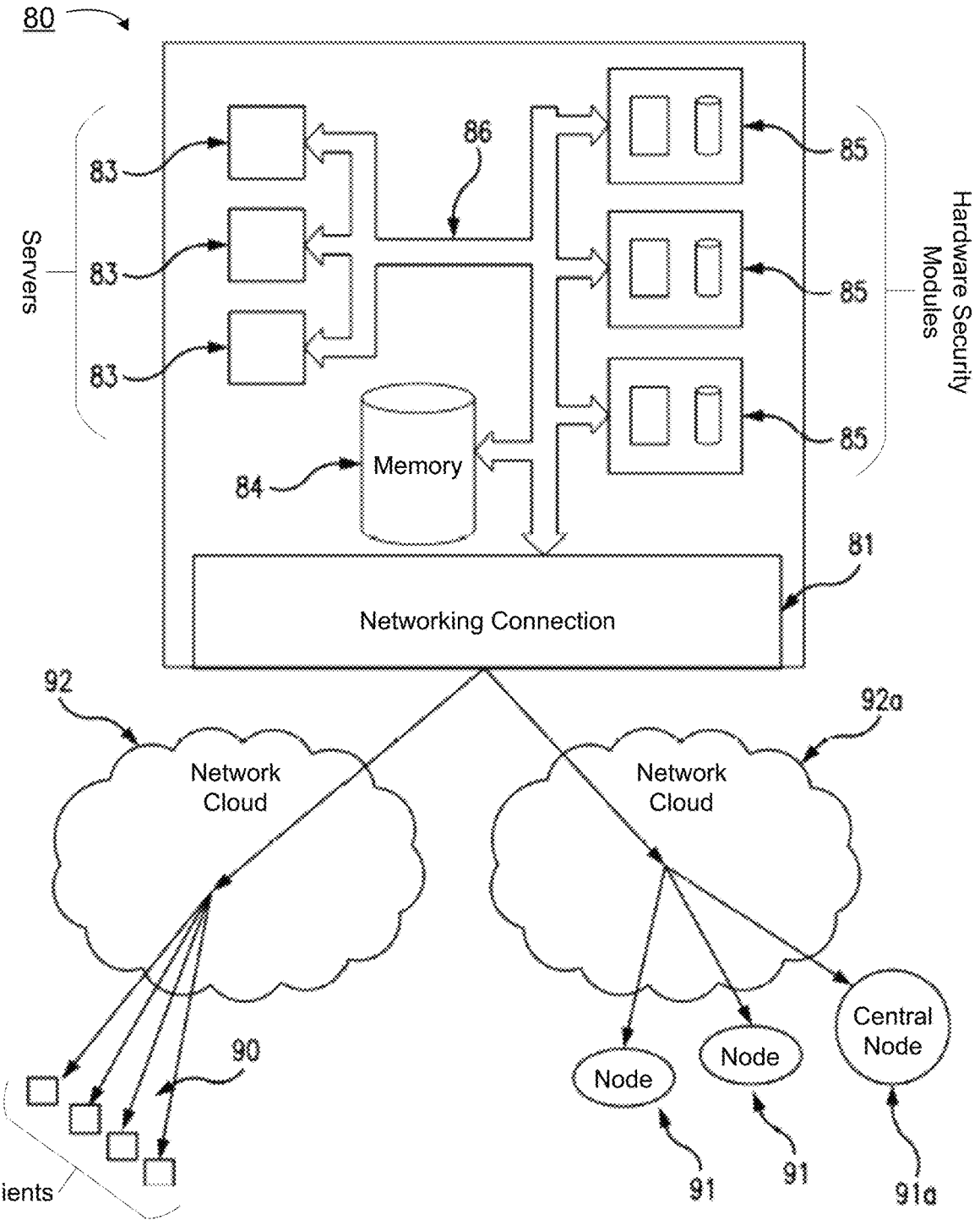
FIG. 10 illustrates elements within the computing node of FIG. 9.
Figure 11:
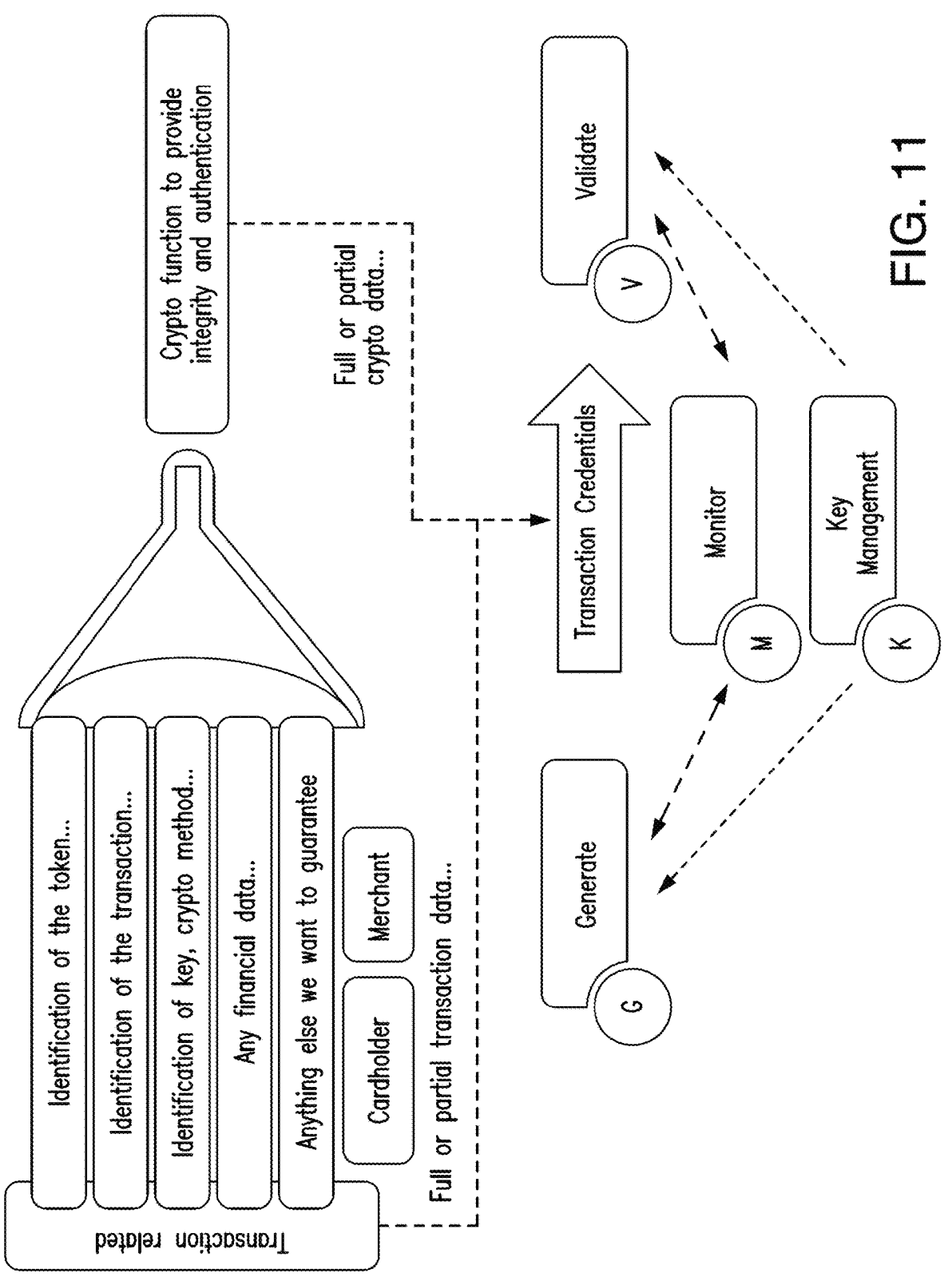
Figure 12:
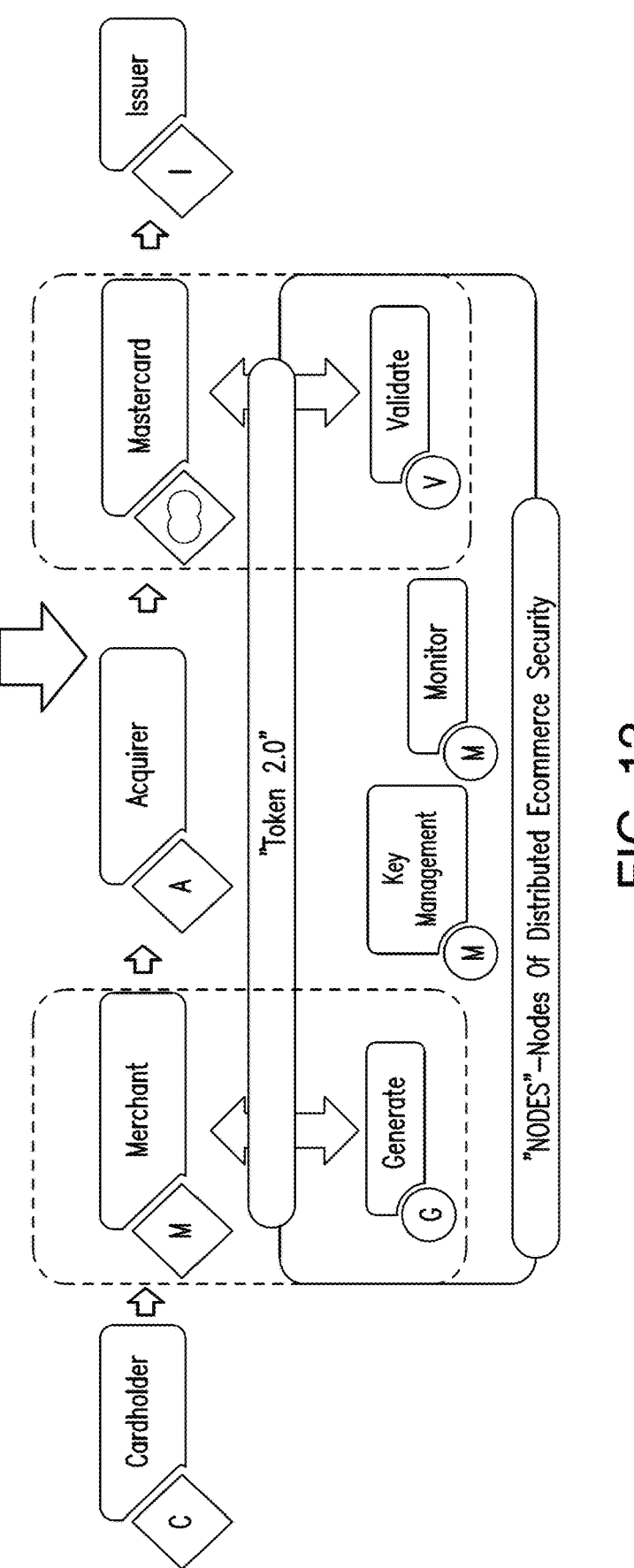
Figure 14:
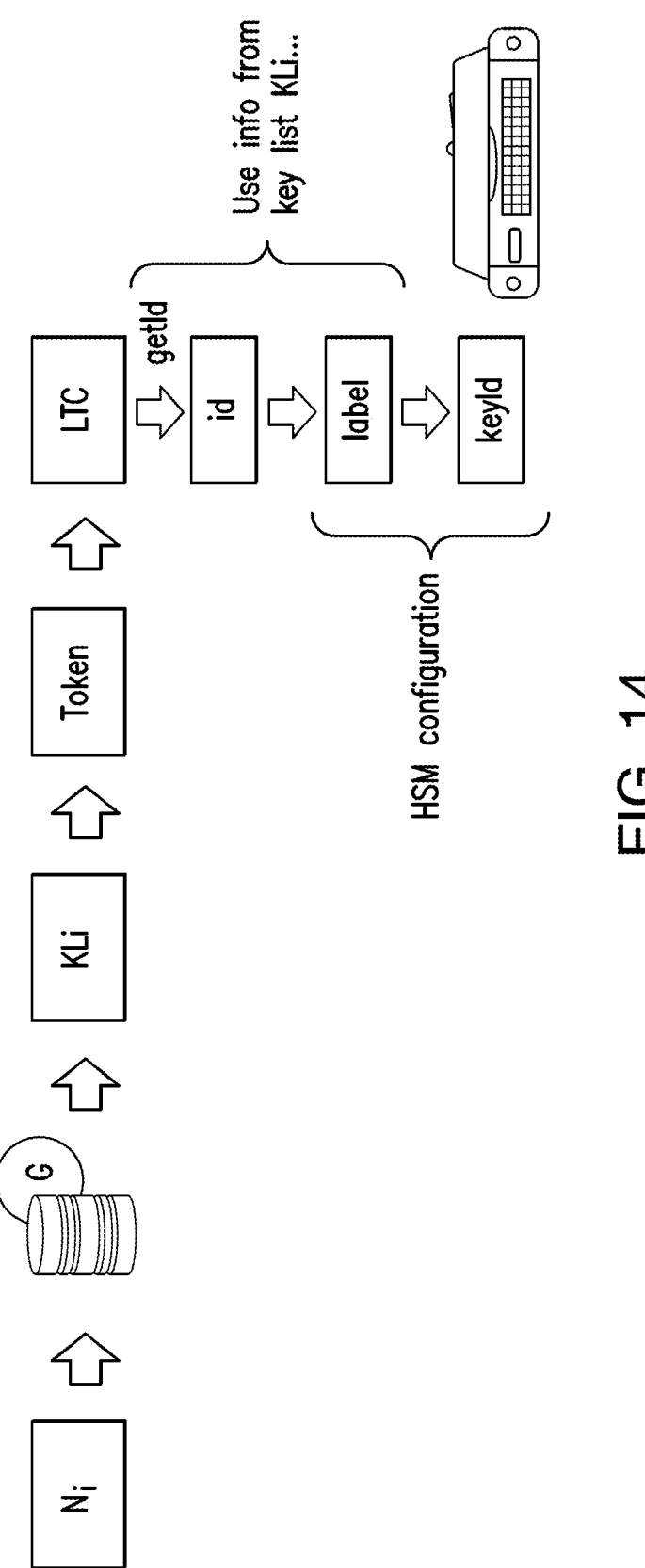
Figure 16:
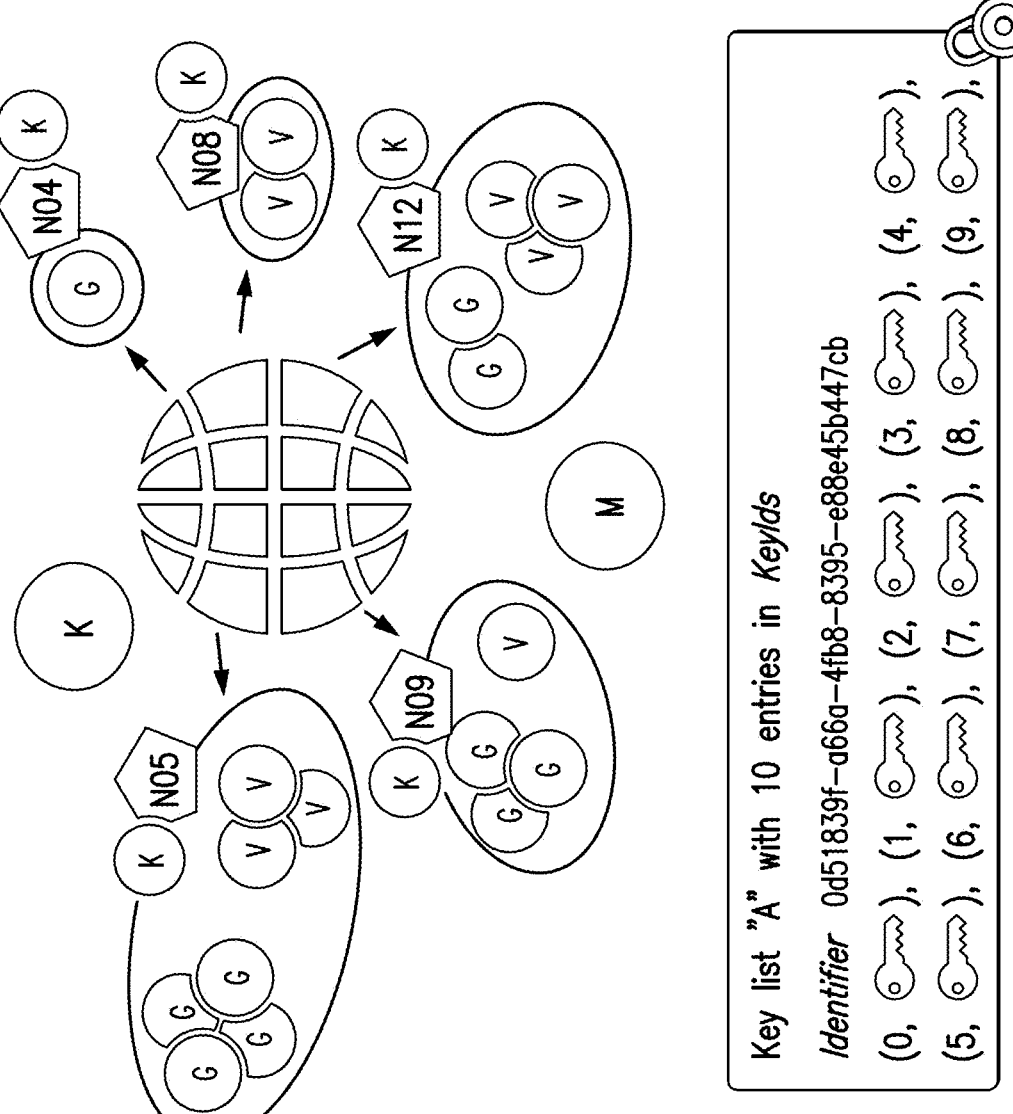
Figure 17:
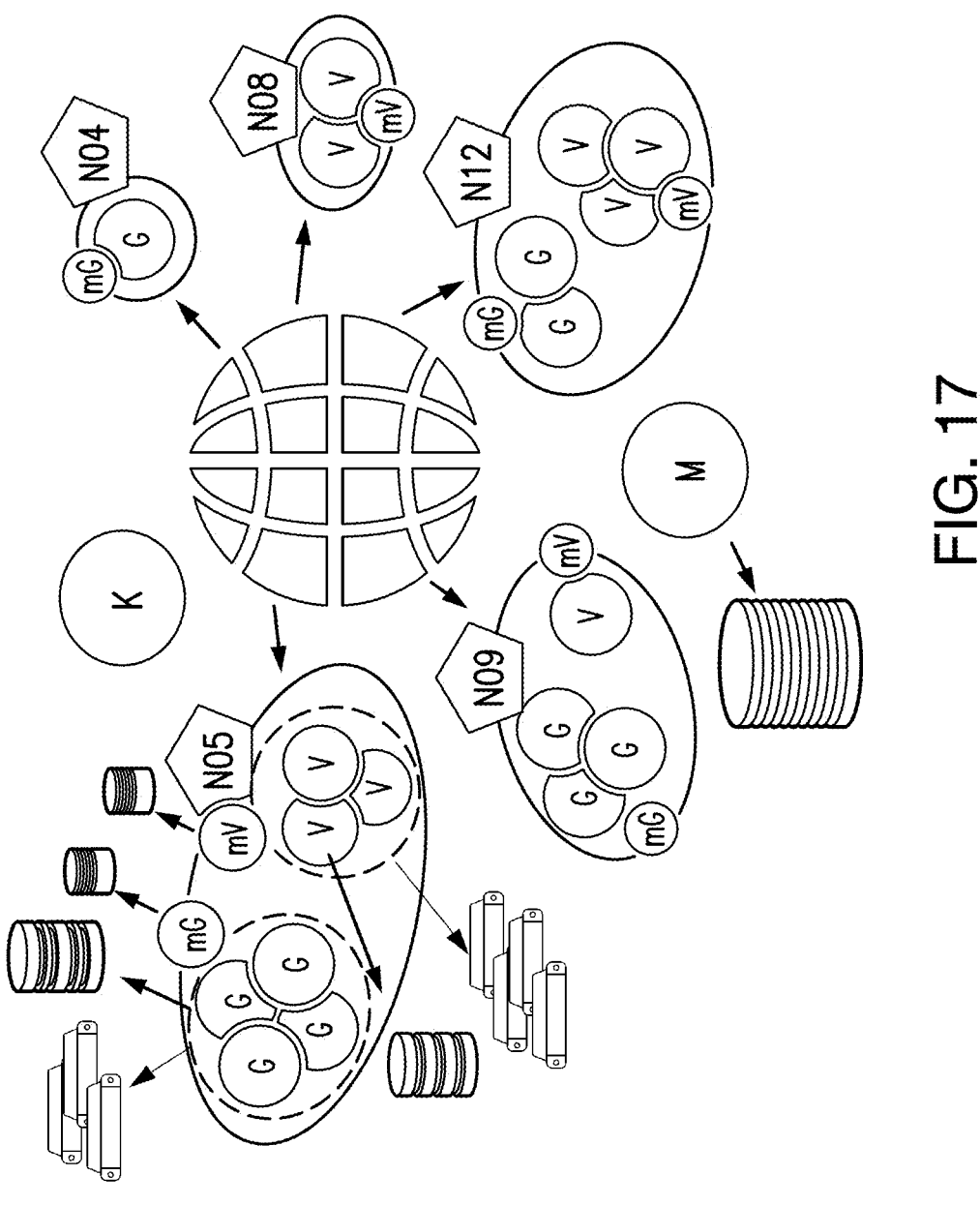
Figure 18:
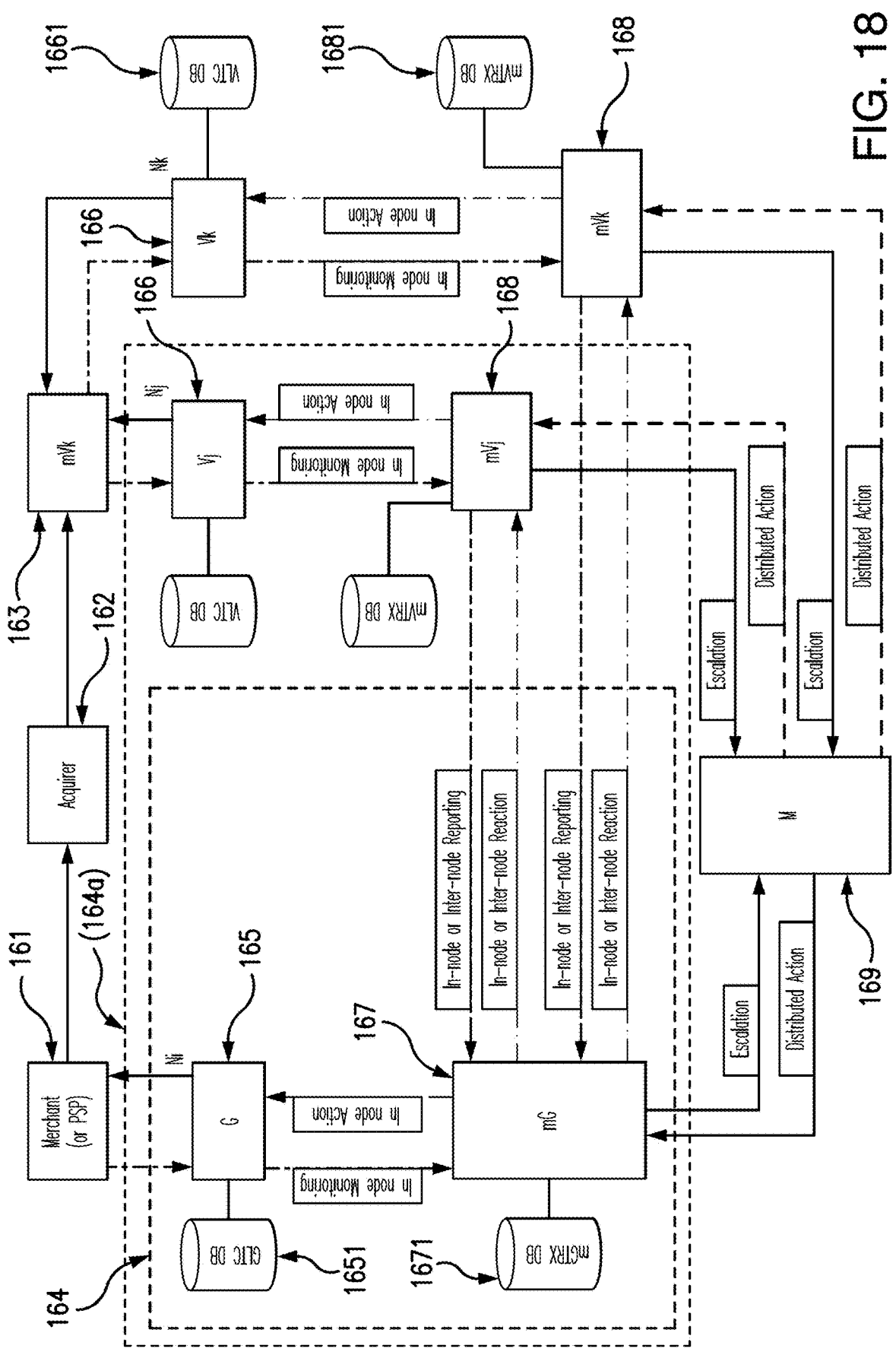
Figure 19:
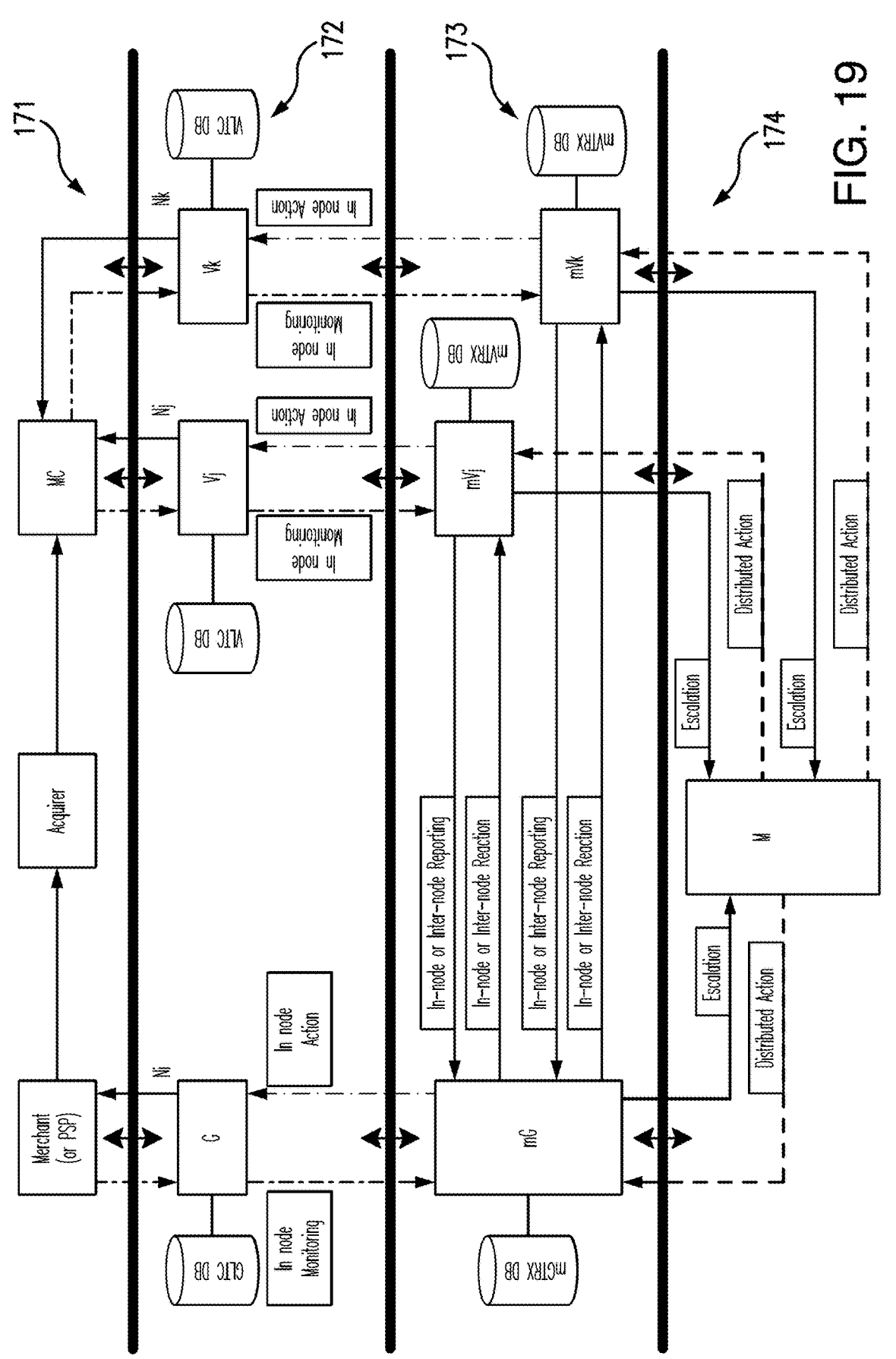
Figure 21A:
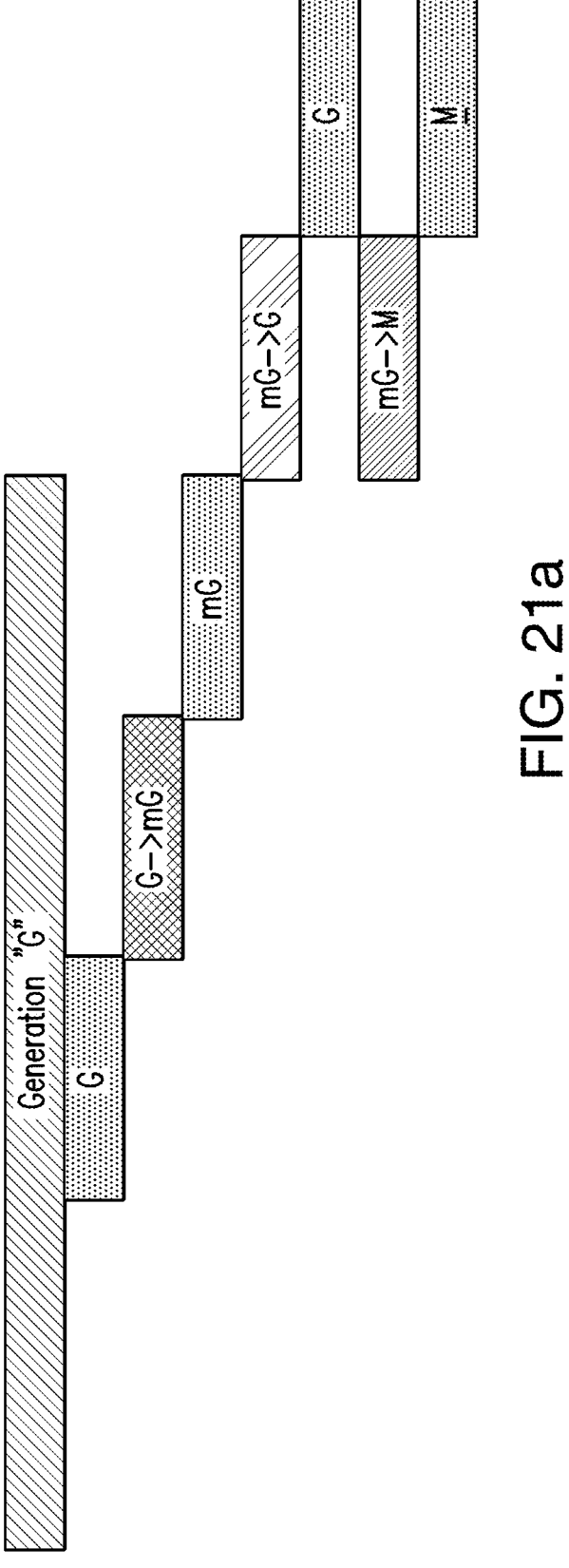
Figure 21B:
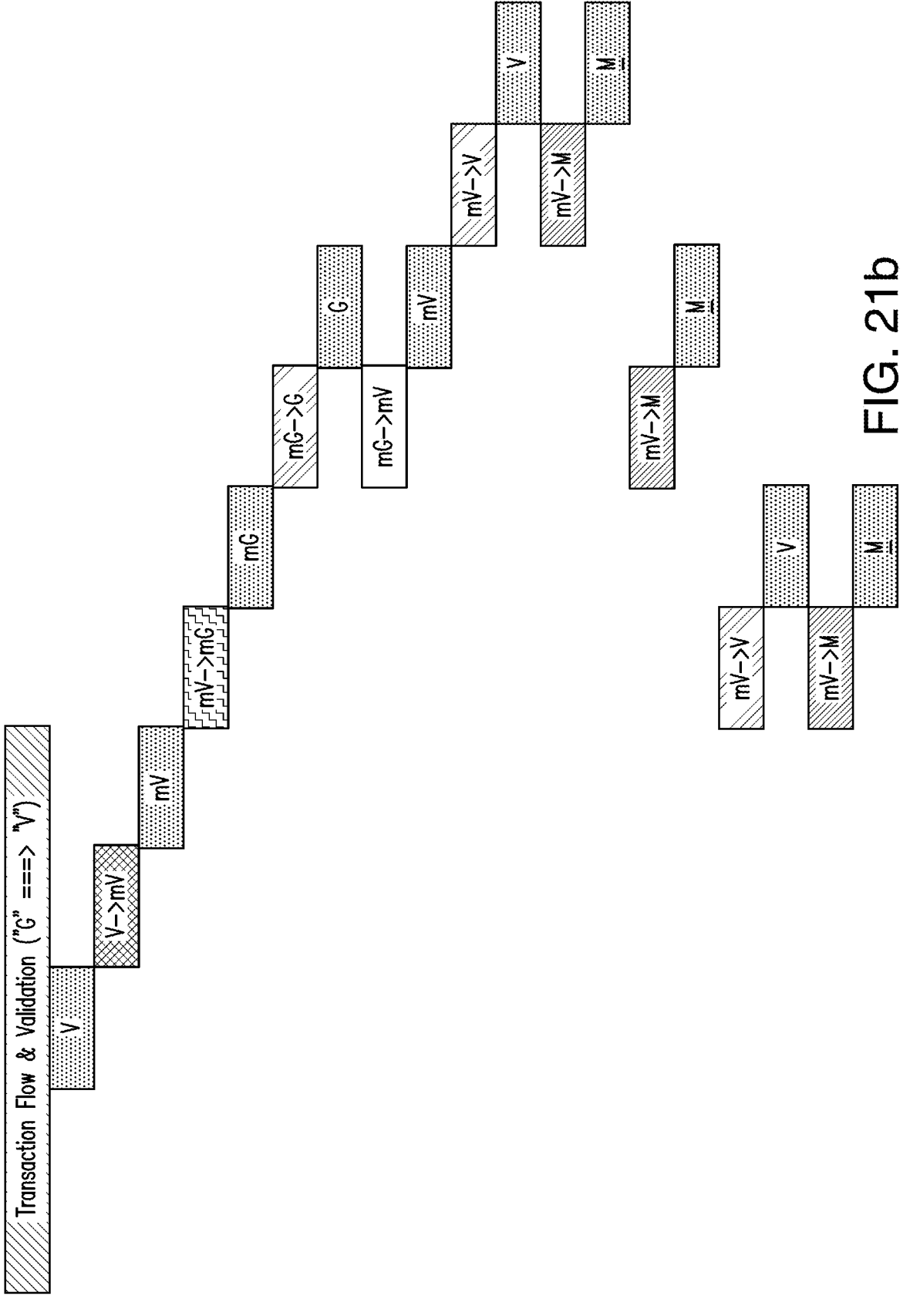
Figure 21C:
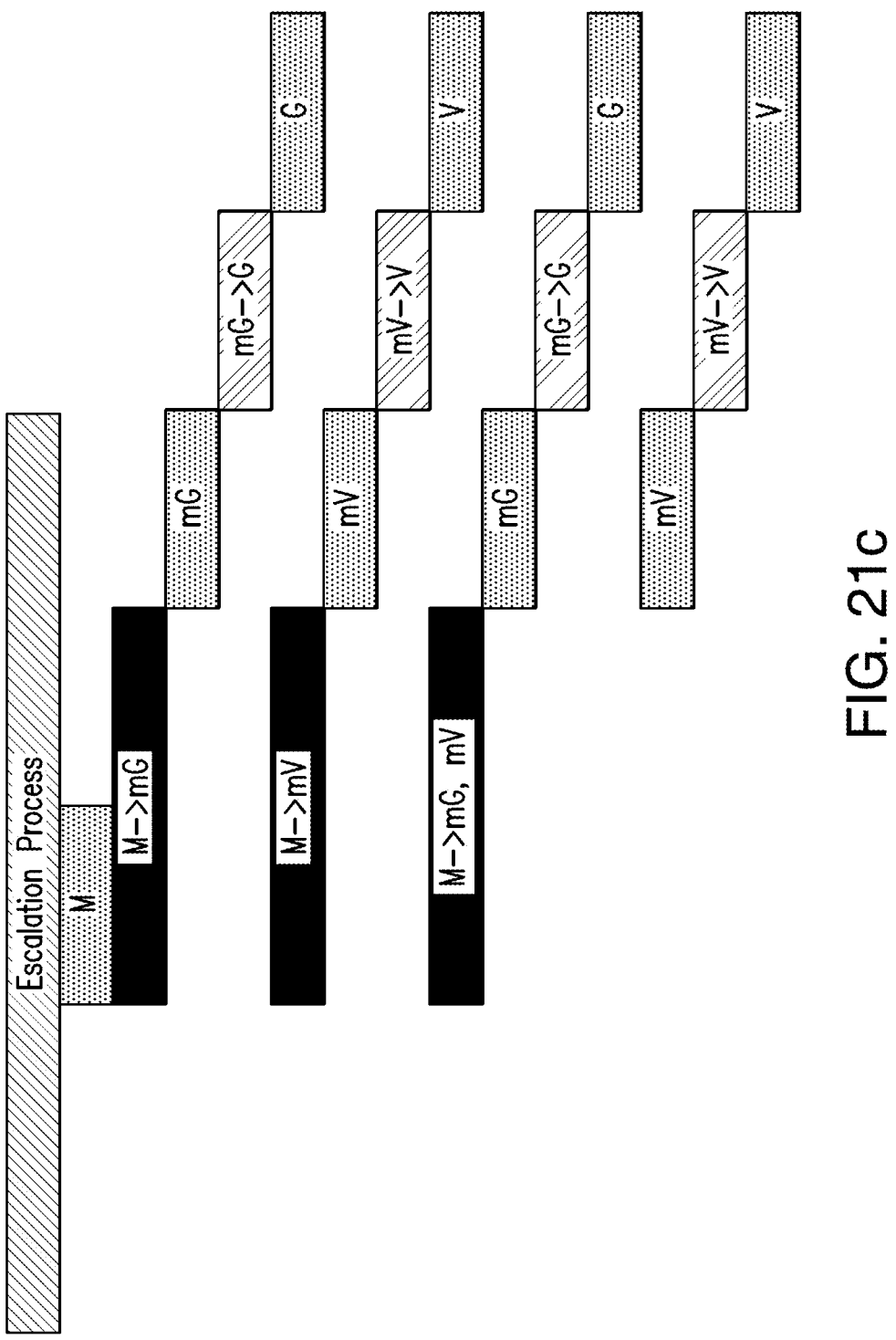
Figure 22:
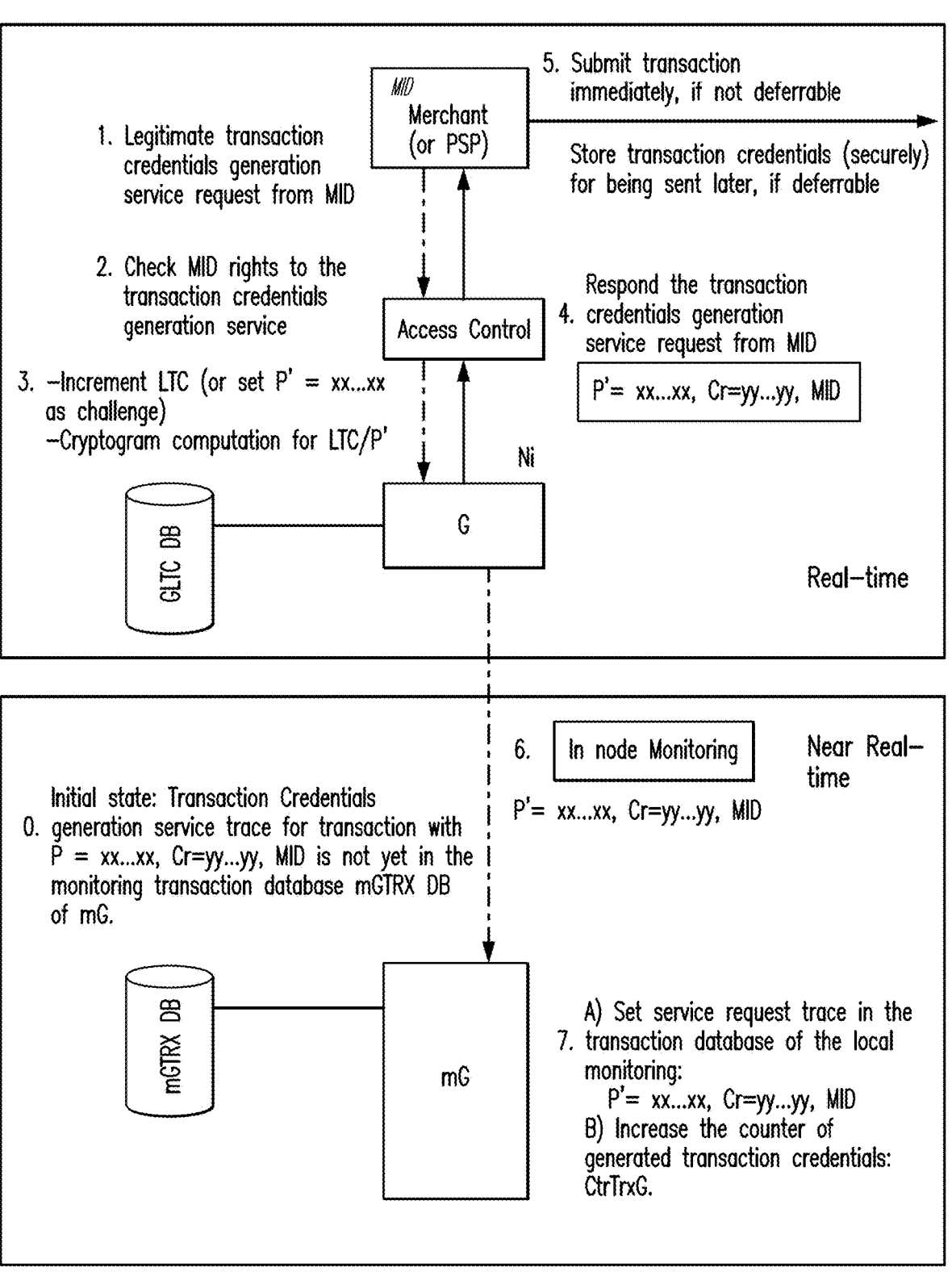
Figure 23:
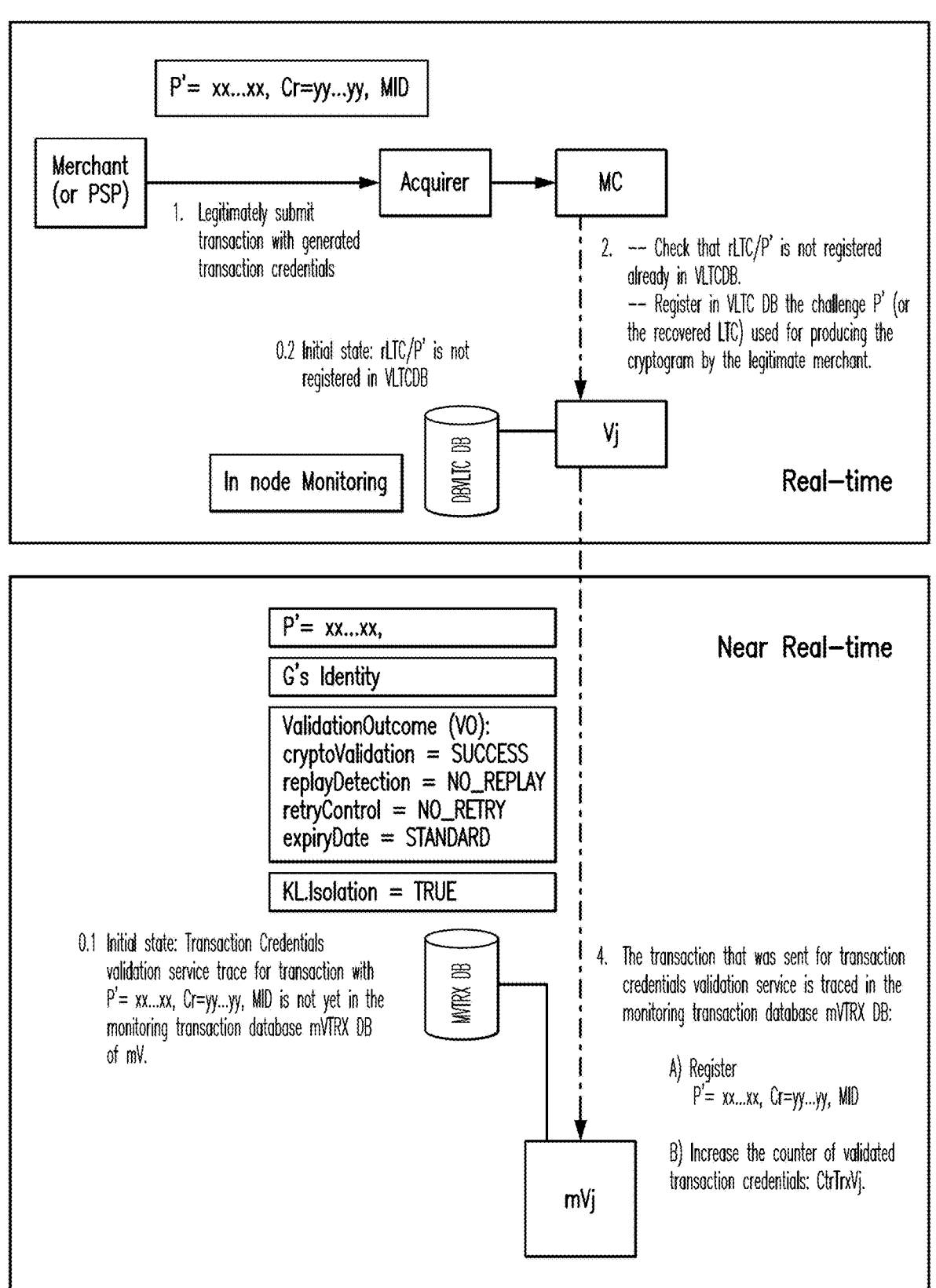
Figure 24:
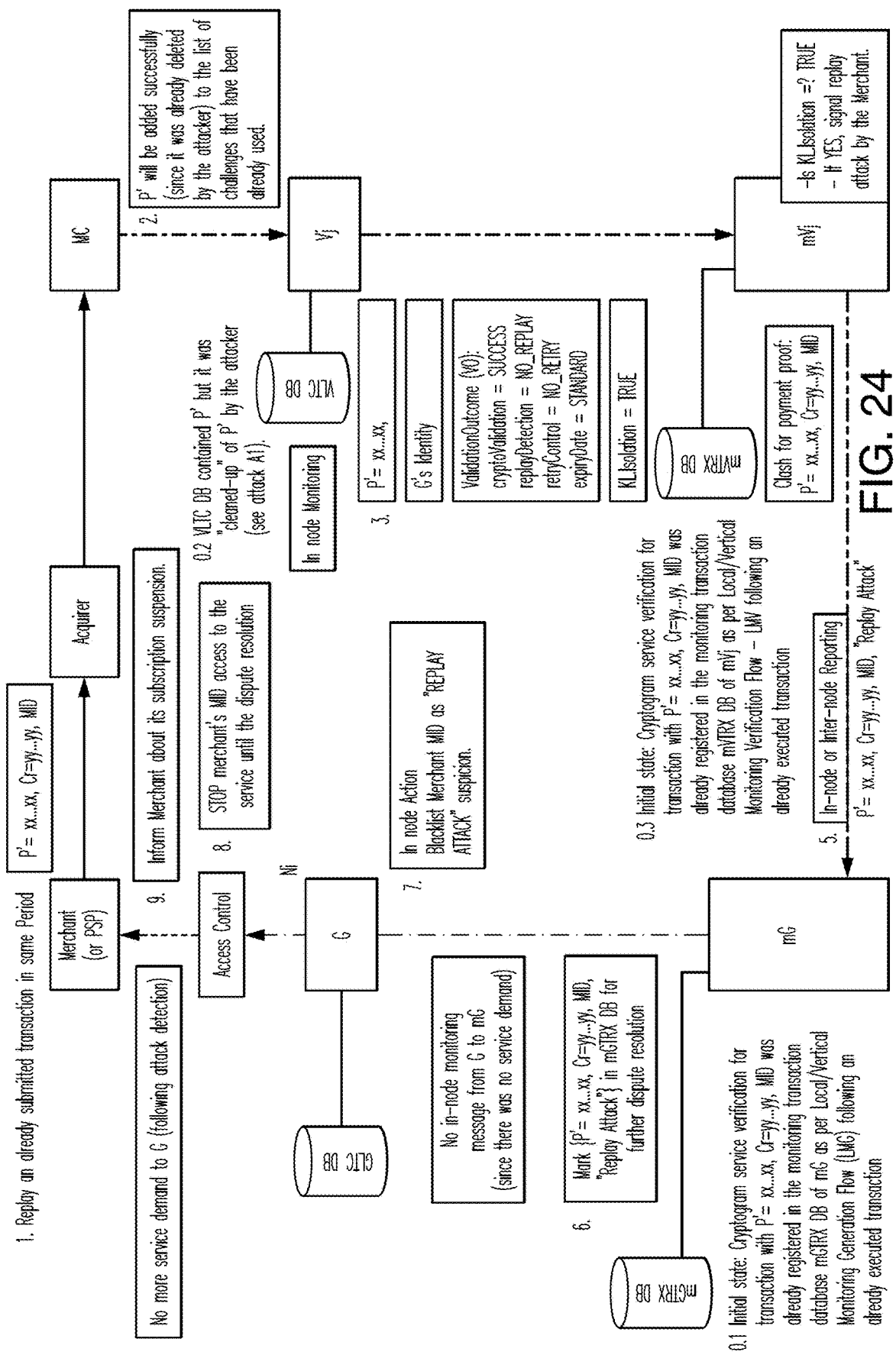
Figure 25:
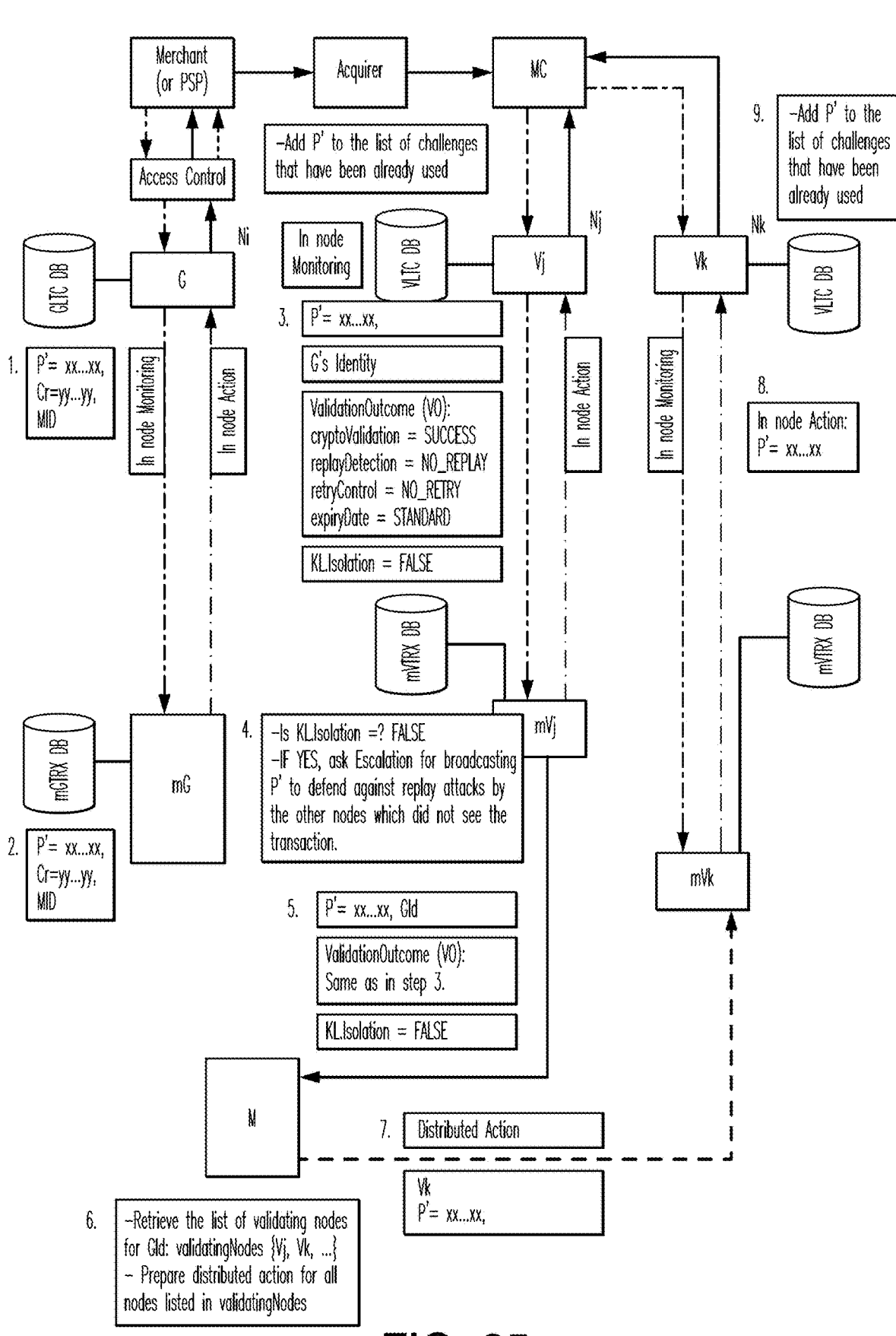
Figure 26:
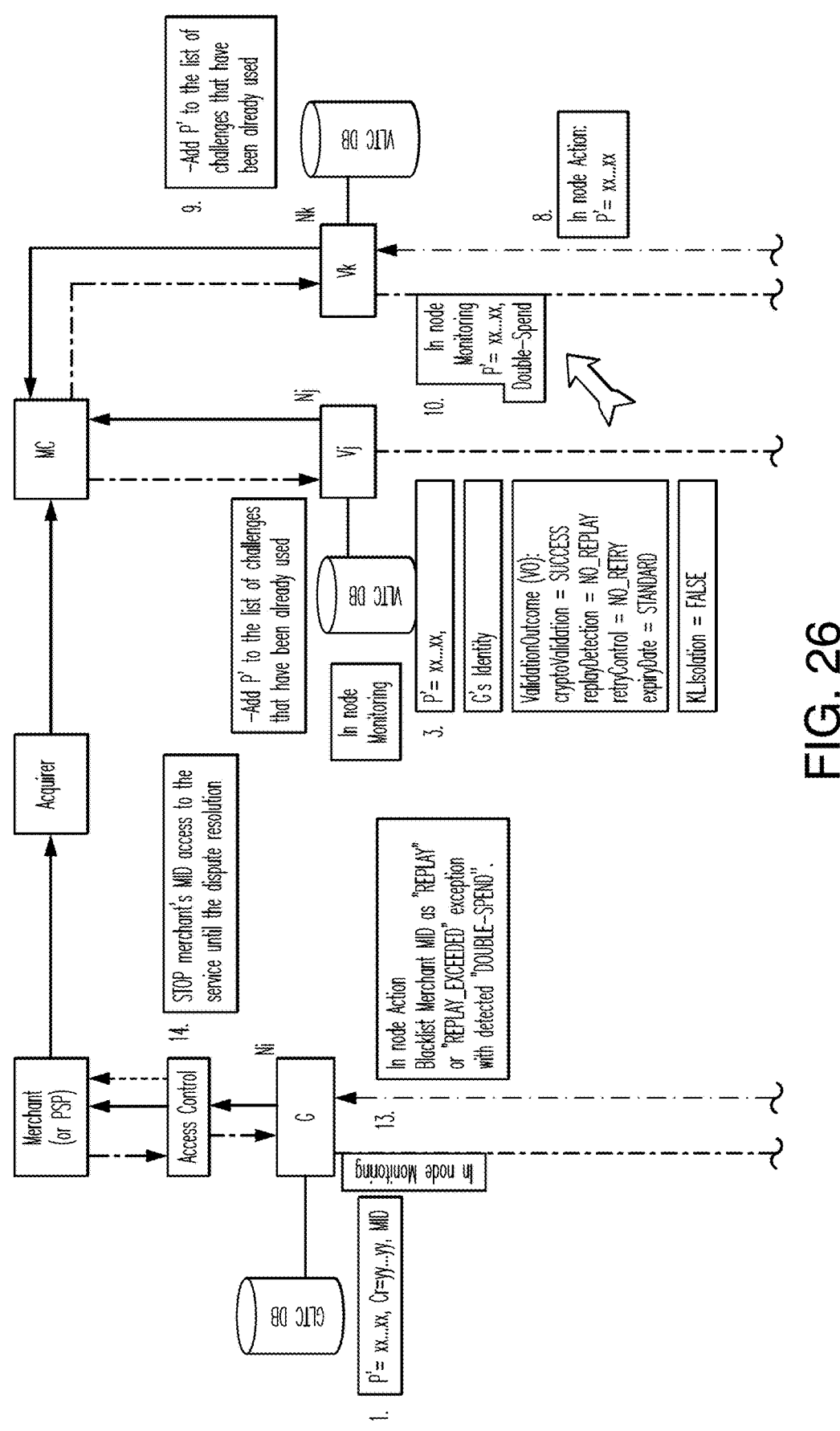
Figure 26:
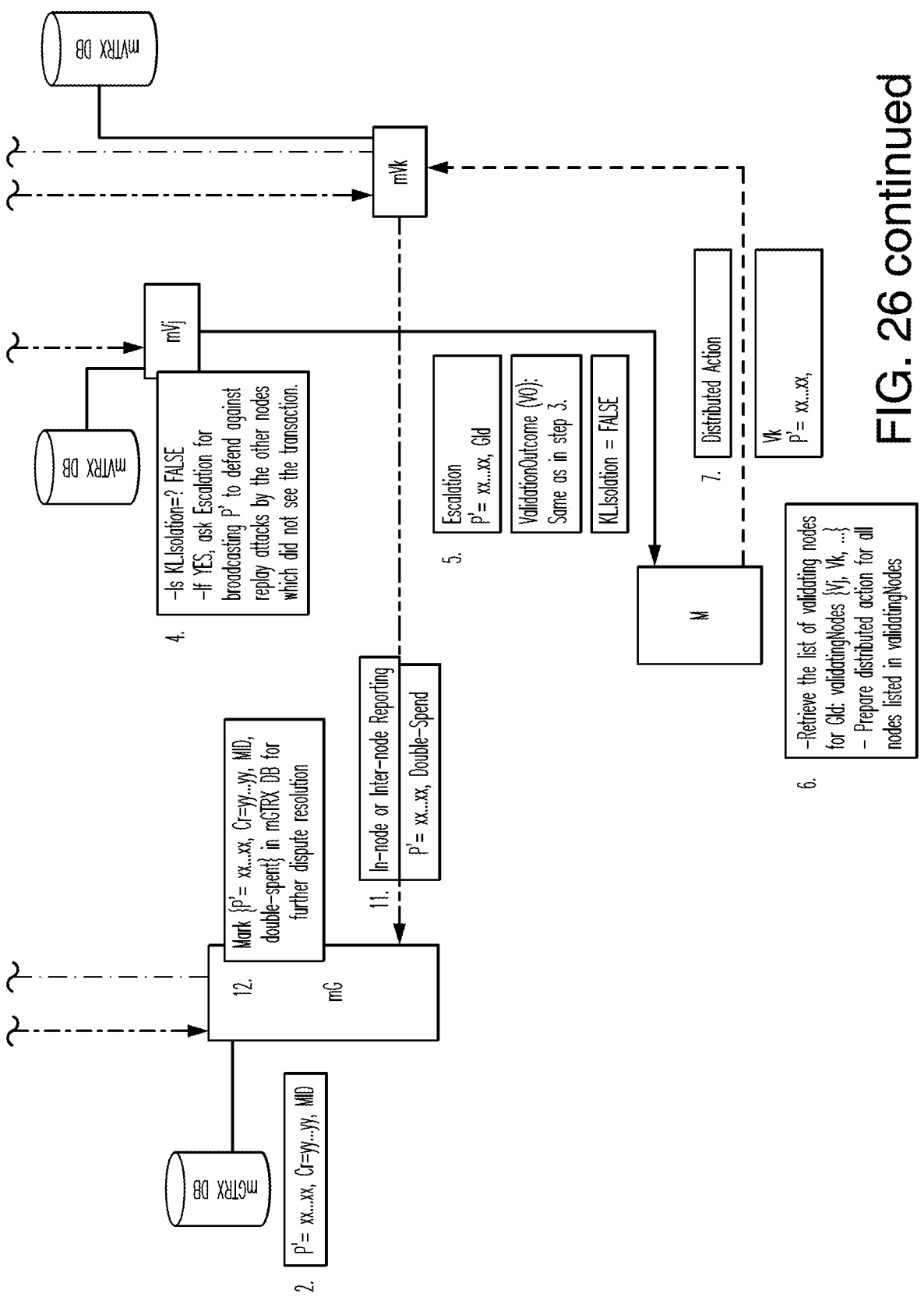
Figure 27:
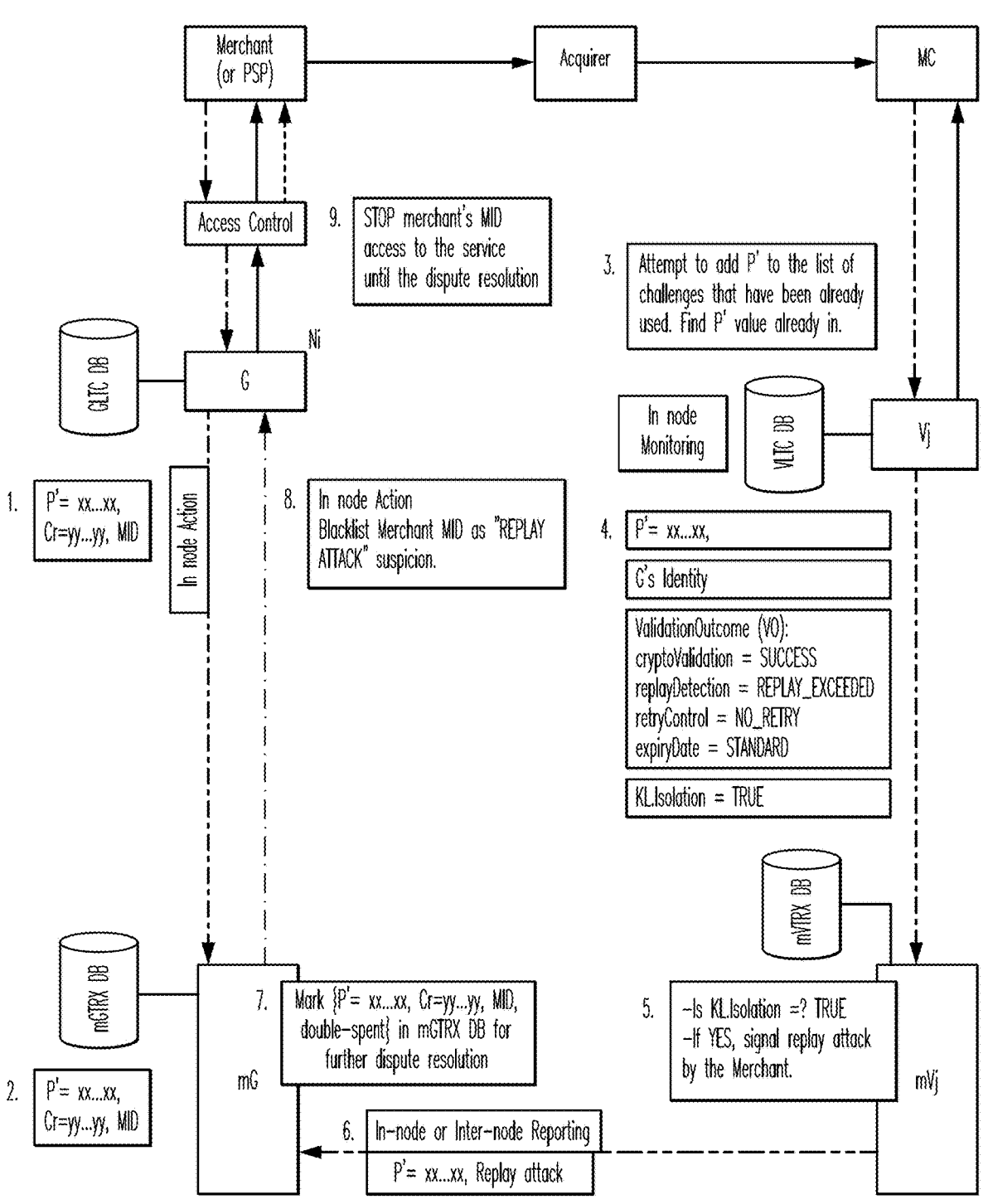
Figure 28:
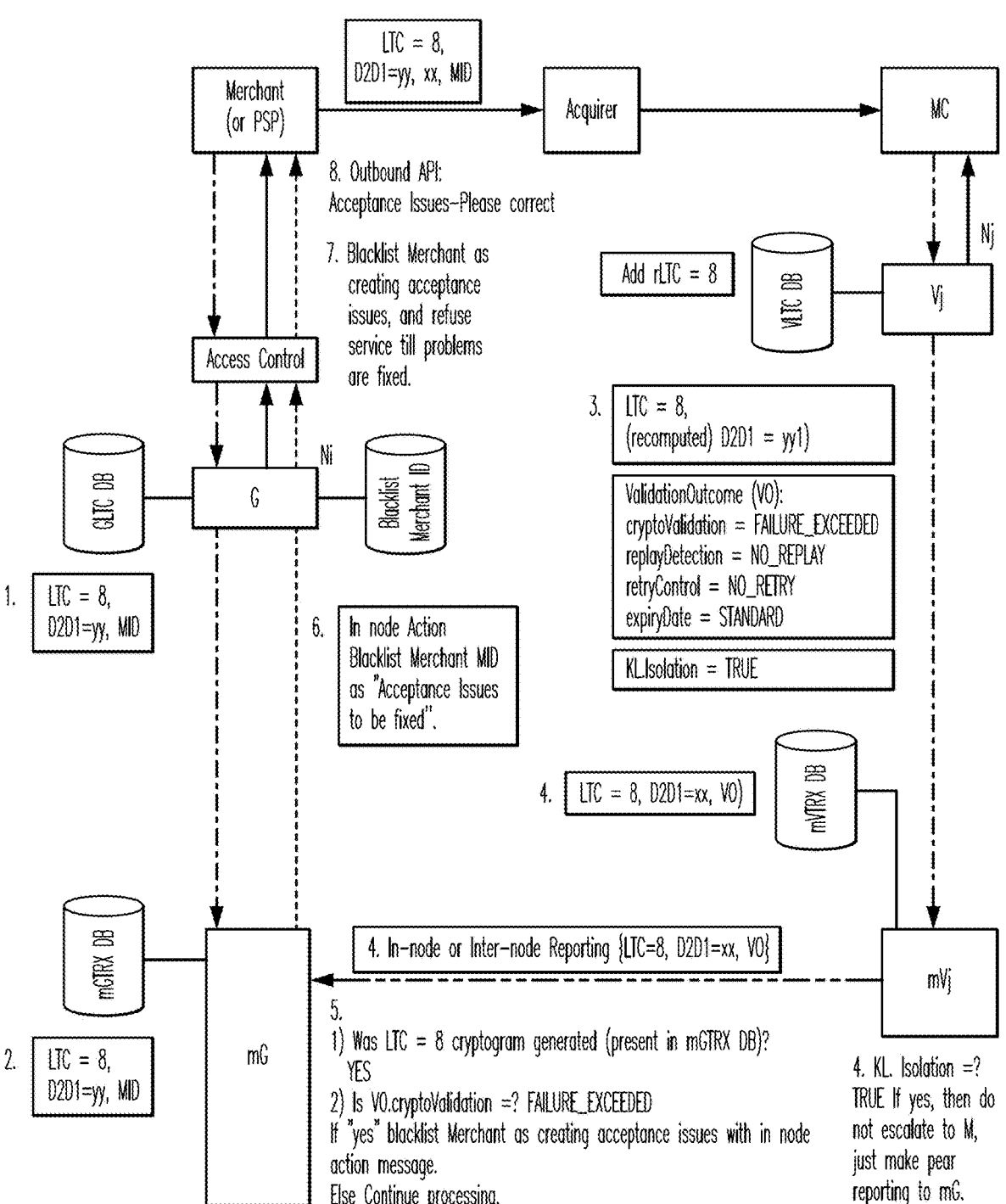
Figure 29:
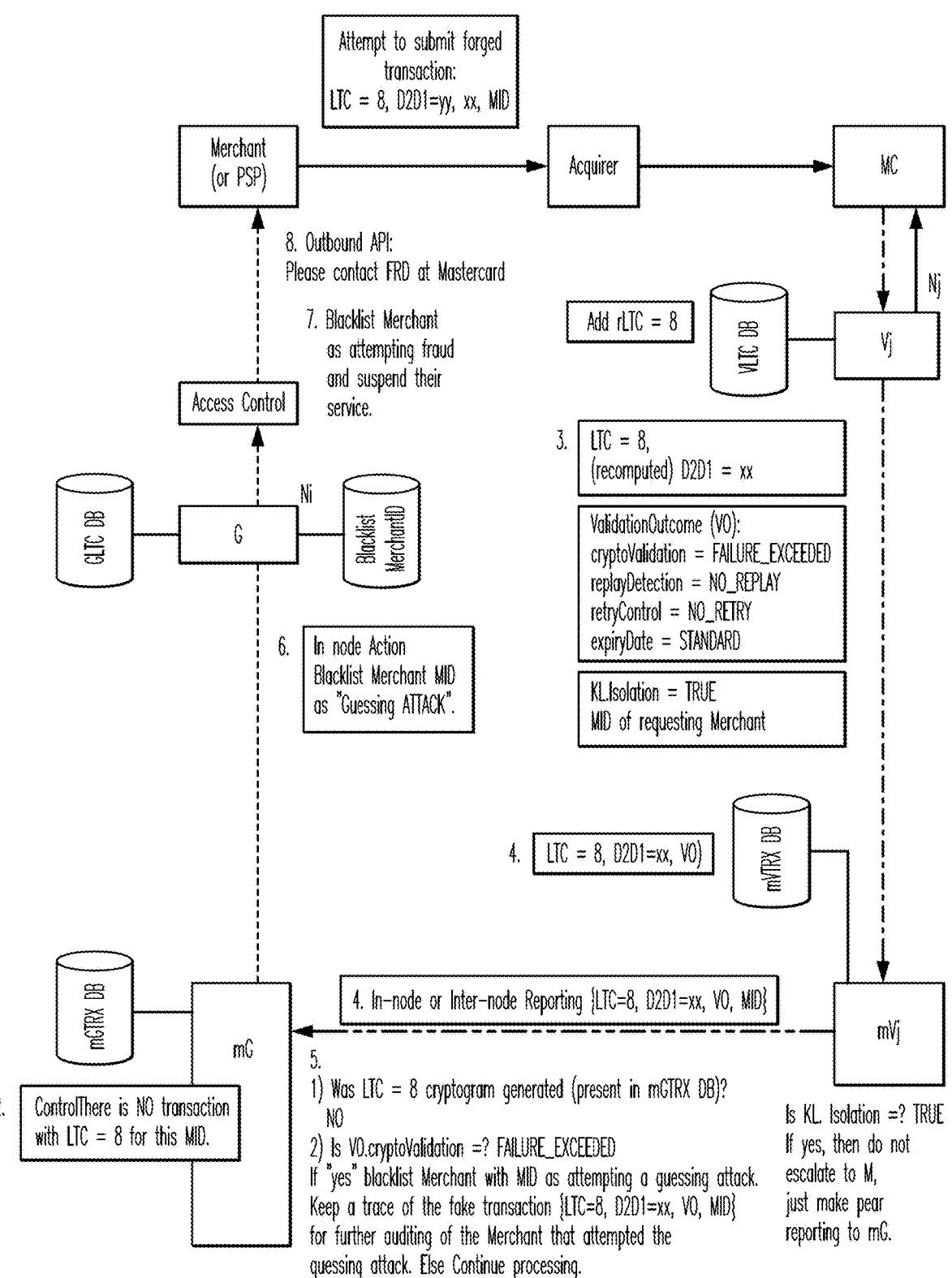
Figure 30:
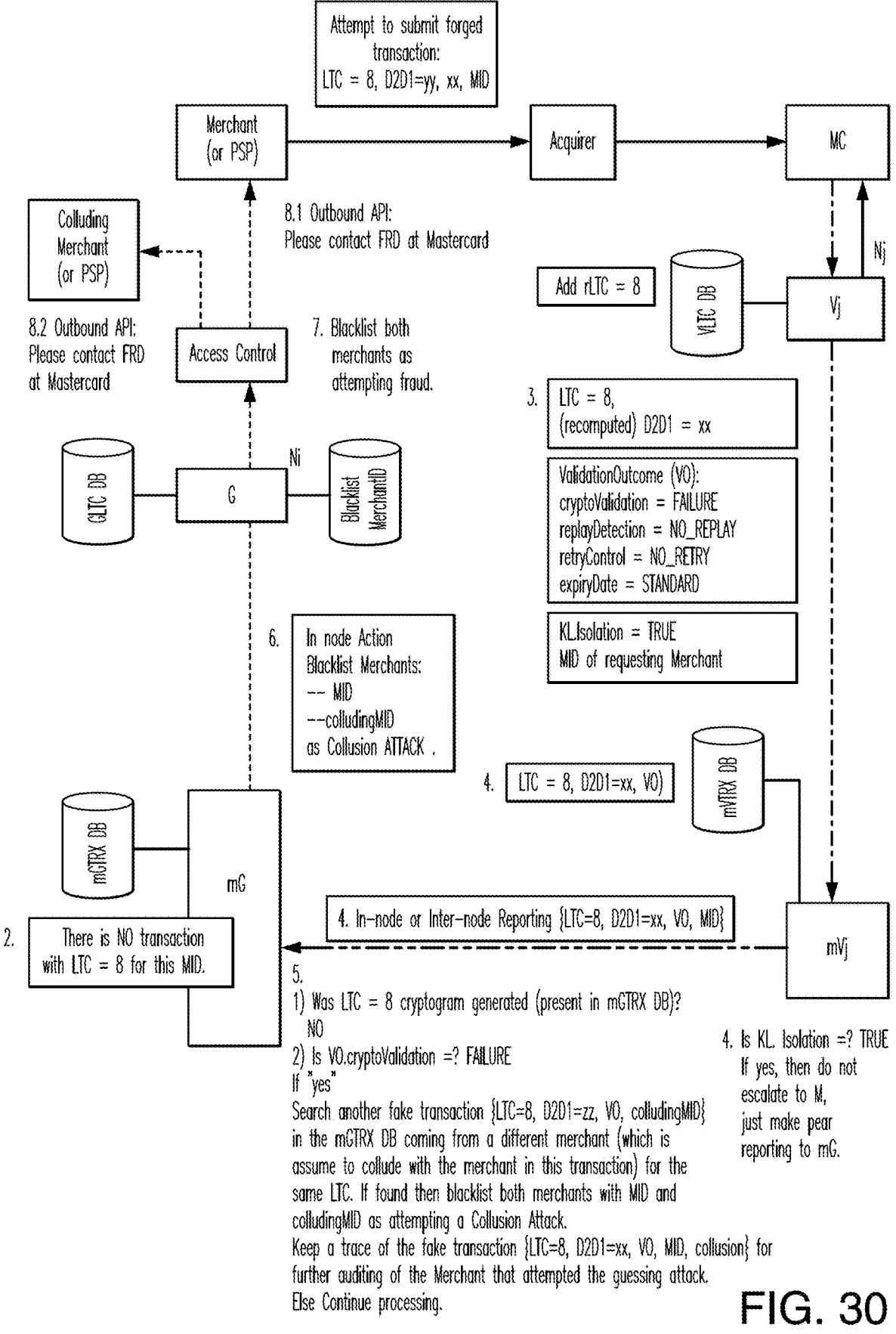
Figure 31:
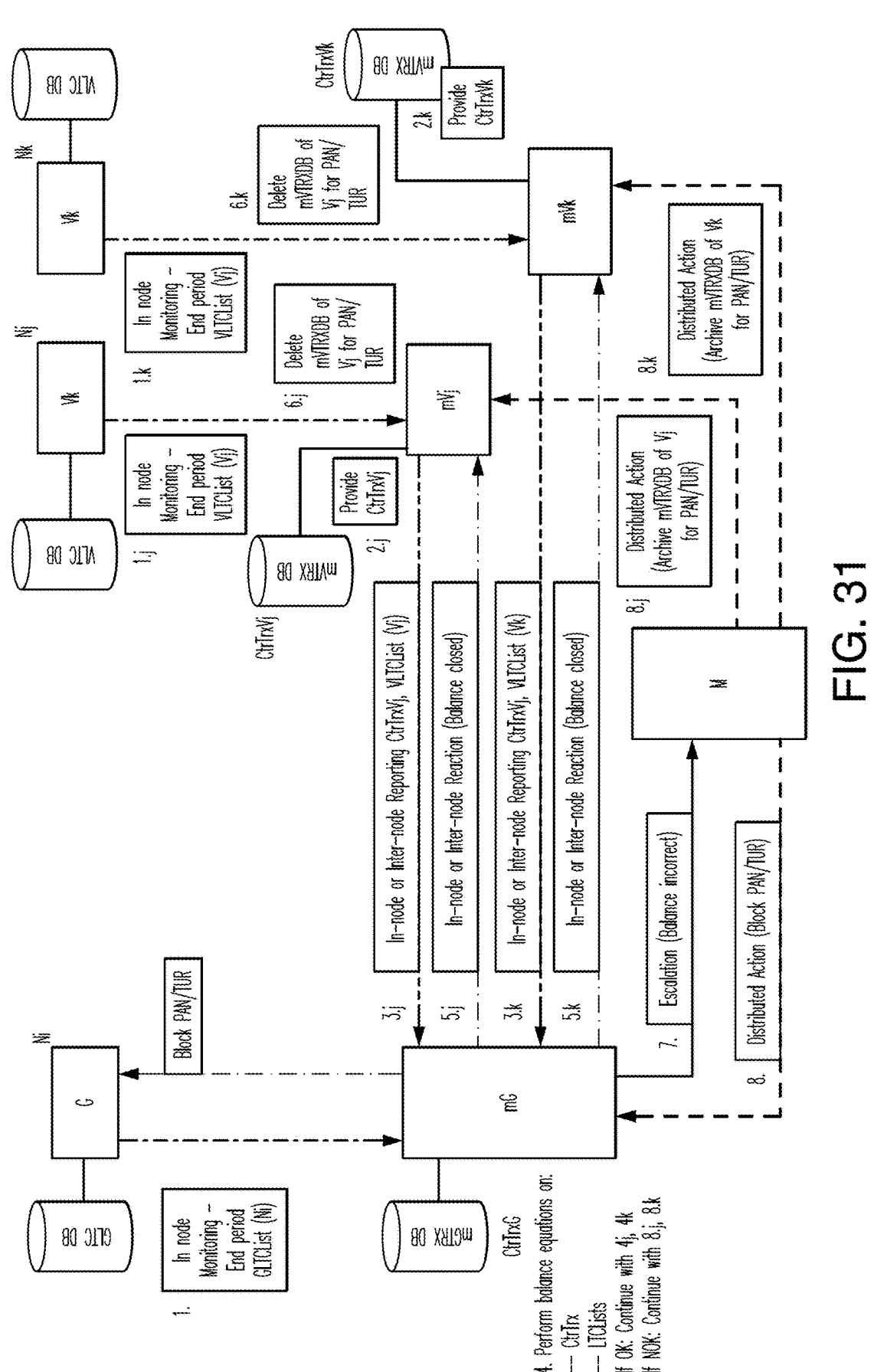

FIG. 11 indicates transaction flow in relation to operations performed by the node of FIG. 9;

FIG. 12 indicates use of tokenisation in an embodiment of the arrangement of FIGS. 9 to 11;

FIG. 13 indicates an approach to key management used in embodiments of the disclosure;

FIG. 14 illustrates an exemplary approach to transaction identification;

FIG. 15 illustrates an exemplary set of cryptographic mechanisms for use for digitised transactions in embodiments of the disclosure;

FIG. 16 illustrates a global model of key management with individual modes managed as shown in FIG. 13;

FIG. 17 illustrates a global model of monitoring associated with the key management model of FIGS. 13 and 16;

FIG. 18 shows elements of a monitoring system according to an embodiment of the disclosure for use with a distributed system such as that shown in FIG. 8;

FIG. 19 shows the monitoring system of FIG. 18 shown as a multi-layer model;

FIG. 20a is a block flow diagram indicating monitoring-related communication involving two nodes in the arrangement of FIG. 18, and FIG. 20b illustrates the various action types shown in FIG. 20a;

FIG. 21a shows an interaction flow for the generation service G in the arrangement of FIG. 20a and FIG. 21b shows an interaction flow for the validation service V in the arrangement of FIG. 20a, whereas FIG. 21c shows an interaction flow in response to a distributed action from the coordinated monitoring service M;

FIG. 22 illustrates transaction and monitoring flows for the generation service G;

FIG. 23 illustrates transaction and monitoring flows for the validation service V;

FIG. 24 shows a monitoring flow detecting a replay attack;

FIG. 25 shows a monitoring flow preventing a replay attack involving multiple nodes;

FIG. 26 shows a reaction flow to indicate that a double-spend fraud has been attempted;

FIG. 27 indicates the use of the monitoring system to detect and communicate replay fraud;

FIGS. 28 to 30 relate to the use of the monitoring system to detect and signal different types of guessing attacks; with FIG. 28 relating to a guessing error; FIG. 29 relating to a guessing attempt made by a single Merchant (or PSP); and FIG. 30 relating to a guessing attempt made by a coalition of dishonest Merchants (or PSPs); and FIG. 31 shows a further monitoring process to be carried out at the end of a period.

Figure 1:
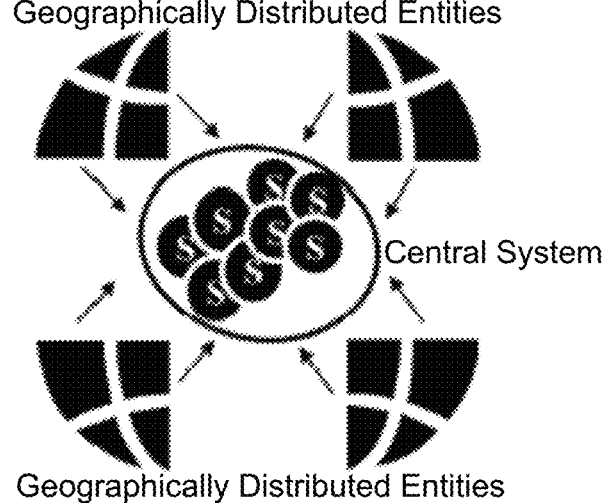
FIG. 1 shows multiple clients interacting with a central server.
Figure 2:
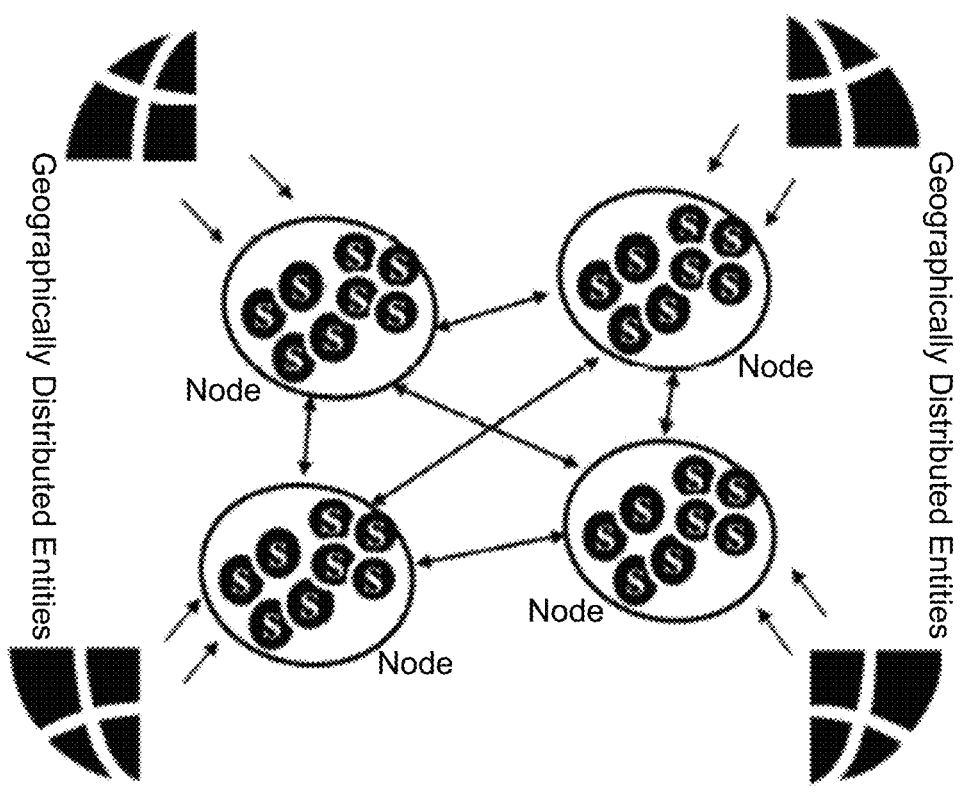
FIG. 2 shows multiple clients interacting with a distributed computing architecture providing the same services as the central server of FIG. 1.
Figure 3:
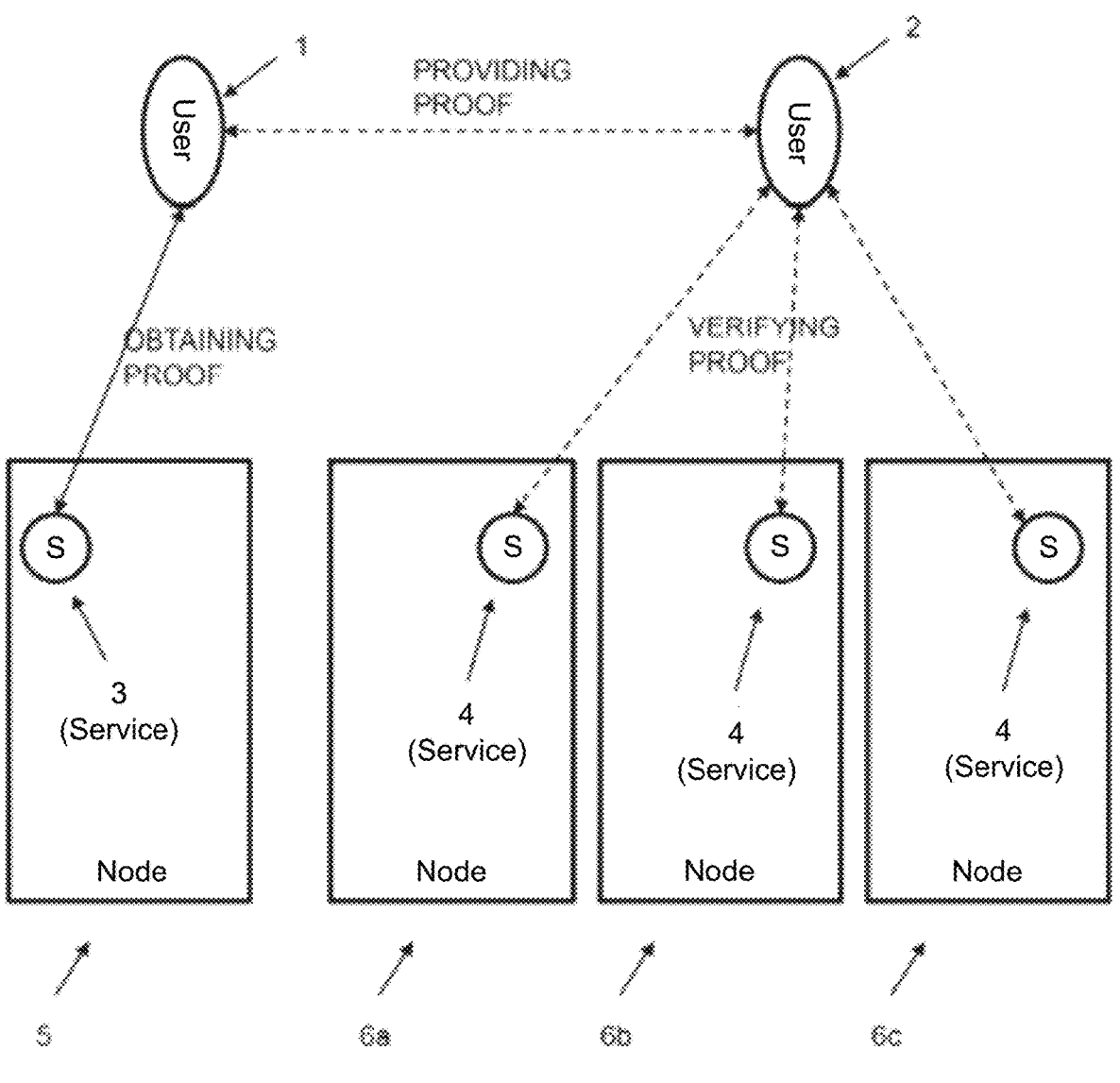
FIG. 3 shows operation of a distributed system such as that shown in FIG. 2 where distributed nodes create and verify proofs.

In general terms, the problem addressed by the disclosure is illustrated in FIGS. 1 to 3. FIG. 1 shows a central system performing functions in response to requests from a very large number of geographically distributed entities. This places intense demand on the central system in relation to processing capability, storage and messaging, and will typically lead to significant load on the system overall because of bottlenecks and messaging requirements. This is in addition to the problem of network latency resulting from travel time when a request is coming from a geographically distant requester communicating with a centralized system.

FIG. 2 shows an alternative arrangement in which the role of the central system is replicated so that the same functions are performed by a distributed set of nodes, each with the capability to perform some or all of the functions provided by the central system. Individual nodes should see a significantly lower demand than the central system, and as entities should be able to interact with a more local node than the central system, there is potential to reduce network latency. However, as discussed above in general terms, and below with specific relevance to a transaction processing system, there are significant technical challenges in achieving this benefit—in particular, there would for straightforward replication be a need to distribute all the same information to all the nodes replicating the centralized system, generally making the overall position worse rather than better.

There are particular difficulties where it is necessary for a second user of the system to be satisfied that an action taken by a first user of the system was legitimate. In the FIG. 1 case, this is relatively straightforward—as the service is performed centrally and the central system has all information, then if users trust the central system this is typically not problematic. In the FIG. 2 case, the first user may have been interacting with one node and the second user may be interacting with another node, in which case the same level of confidence cannot be achieved unless all necessary information is held in common between all the nodes, suitably synchronized, which would defeat the point of disaggregation when replicating a centralized system. If the product of the first service performed by the first user is valuable information—such as the proof of a payment made by the first user to be used by a second user in completing a transaction—then risks of system failure or compromise by, for example, use of a proof at multiple nodes by multiple second users to complete a relevant transaction, need to be addressed.

Generally, this situation is shown in FIG. 3. A first user 1 requests execution of a first service 3—in this case, the creation of a proof of an event such as a payment from a particular account—and a second user 2 requests verification of the proof of this event, for example to determine that a payment is validly made, from a second service 4. The first user 1 has invoked the first service 3 at a first node 5. The second user will typically not have a choice of where to invoke the second service 4—this may be a matter of geography or other administrative factors—and in particular may not be able to invoke the second service 4 at the first node 5 (though this may be a possibility). In practice, the second service 4 will be invoked at a further node 6a, 6b, 6c that has sufficient information to achieve the verification process. Typically, this will involve access to a common set of cryptographic keys together with the minimal set of information required to regenerate the proof or otherwise determine that the proof is correct—as discussed below, in embodiments a limited set of keys may be used. Situations in which such a proof, or an object claiming to be such a proof, is presented to one or more second services at one or more nodes need to be addressed for such a system to function reliably and securely.

Figure 4:
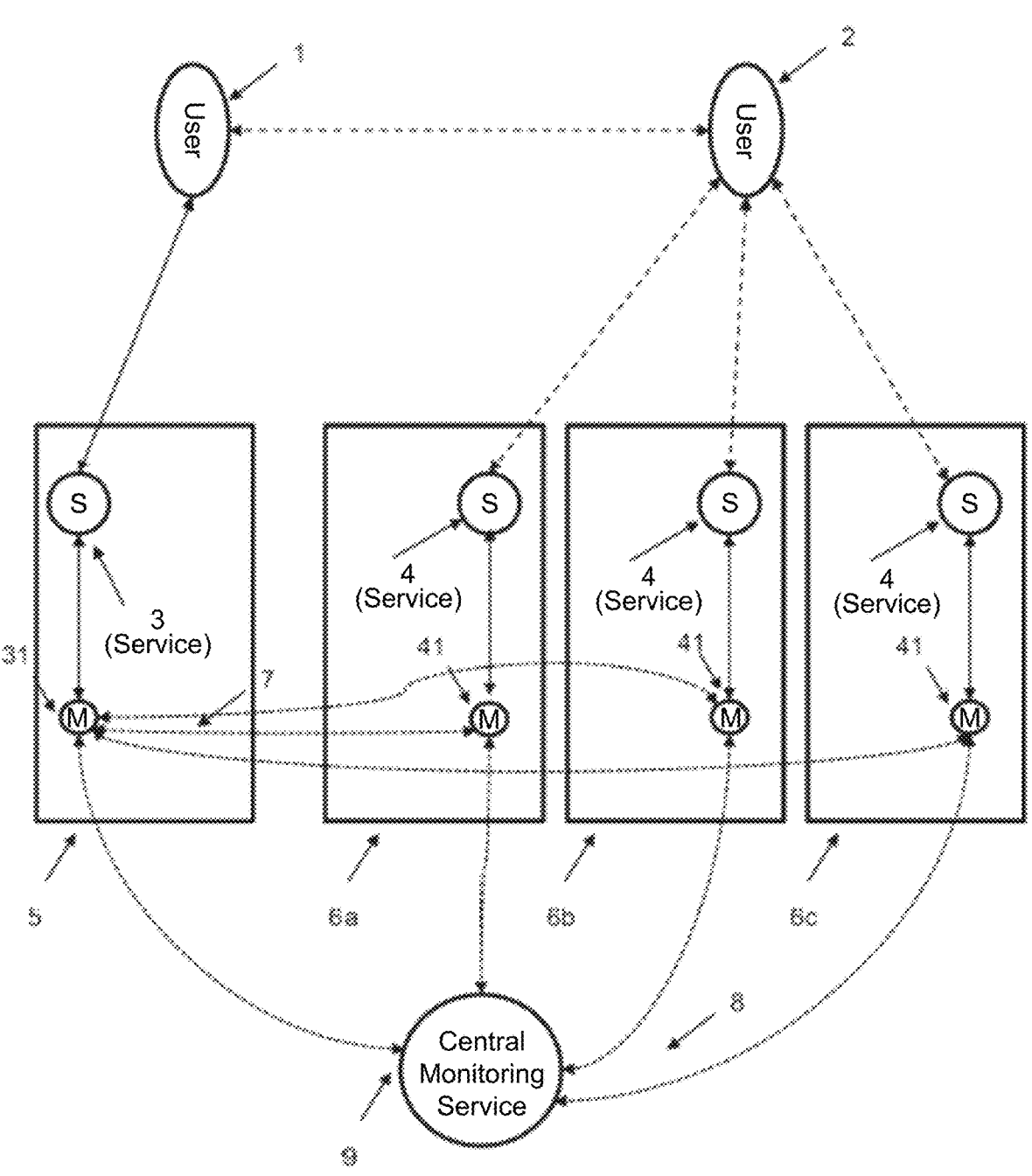
FIG. 4 shows an approach to monitoring in the arrangement of FIG. 3 according to embodiments of the disclosure

The present disclosure teaches how these situations can be addressed by an appropriate system of monitoring. A system of monitoring according to embodiments of the disclosure is shown in FIG. 4, which extends the arrangement of FIG. 3 by inclusion of a monitoring system. In this system, each service in a node, such as first service 3 and second service 4, has an associated monitoring service (such as first service monitoring service 31 and second service monitoring service 41) that interacts directly with its associated service using suitable messaging, performing monitoring at the time that the service is performed and providing information, including information received from elsewhere in the distributed system, that is needed by the associated service for correct current or future service delivery.

Each monitoring service has at least two further communication paths. One is a peer to peer (horizontal) communication path 7 for communicating with monitoring services in other nodes using inter-node messages so that information immediately identifiable as relevant to other services are transmitted to the monitoring services for those services. It should be noted that while this peer to peer (horizontal) communication path is shown as an inter-node path, it can effectively also operate within a single node if multiple services are provided within that node (i.e., if processes 4 and 41 would run in node 5 next to the processes 3 and 31)—in this case the peer to peer (horizontal) communication path between 41 and 31 is provided as an intra-node message or path. The terms intra-node and in-node may be used interchangeably here to refer to a message sent within the same physical or logical node, though the term in-node will be used generally below. This pathway is particularly effective for direct communication between monitoring services for a second service verifying a proof and a first service that has created the proof.

The second communication path is a path 8 between each local monitoring service 31, 41 and a coordinated monitoring service—which may be provided as a central monitoring service 9, for example. This is useful to support an escalation process for evaluating potential errors or threats that are not determinable directly by a local monitoring service, and for communicating actions to affected nodes, or services in nodes, when such issues have been detected when a distributed reaction is required in order to address the threat and mitigate the associated residual security risk.

The arrangement shown here has a third communication path used for vertical communication between the services 3, 4 and their monitoring processes 31, 41. This is here used for messaging between the service 3, 4 and its monitoring process 31, 41 for monitoring of service expected operation. In the arrangements described here, messaging is used for this purpose, though in other architectures it is conceivable that monitoring may be achieved by measurement without an explicit messaging step. However, this third communication path is also valuable for provision of information back to the service 3, 4 from the monitoring process 31, 41

This architecture is effective to allow both the first service and the second service to take place without delay while allowing effective monitoring using peer-to-peer interaction between monitoring processes to exchange a first type of information and a remote coordinated monitoring system to receive a second type of information. The first type of information can be used to provide rapid updates that can address, for example, coordinated attacks, whereas the second type of information can be used to ensure sufficient knowledge of events across the system to prevent other types of attack developing. This approach supports effective monitoring across the distributed system, but with information exchanges limited to those necessary to maintain an effective and secure system.

The timing of messaging within the extended system is highly significant. There are three timing types used for messaging: real time; near real time; and post-service. Real time messaging is immediate. Near real time messaging may not be immediate—real time messaging is prioritised over it—but it is rapid and may complete during a related extended system event, and such that monitoring information may be received during use of multiple second services in parallel. Post-transaction messaging is less urgent and is used for reconciliation and system changes to remove identified vulnerabilities.

Here, messaging and processing involved in provision of services to users takes place in real time, enabling such services to be full real time processes. Local monitoring and associated communication such as messaging peer to peer between monitoring services take place typically in near real time, so the speed of service provision is not affected but so that response is sufficiently rapid to address threats on a sufficiently short timescale. Typically, such near real time communication is sufficiently rapid that it will take place in the same time frame as the associated broader process in which the second service is used, and often before the completion of such a process, rendering this approach effective against attacks or problems occurring at multiple points in the system. Coordinated monitoring and other communications involving the coordinated monitoring service typically do not need to be immediate and can be carried out after the completion of the associated service. This approach therefore allows for effective response to threats in a distributed system of service provision without compromising the operation of service provision itself.

This issue is particularly relevant to transaction processing systems, and in particular to systems for handling digital transactions. The number of digital transactions is increasing extremely rapidly, and it is necessary for them to execute reliably and rapidly.

Support of these transactions can use transaction processing systems developed for device-based payments using payment cards and use the protocols of such payment systems, but in practice such transactions have a different character from device-based transactions. This is discussed below, first by reference to the general elements of a transaction processing system, and then by a more detailed discussion of the infrastructure used to support digital transactions.

Figure 5:
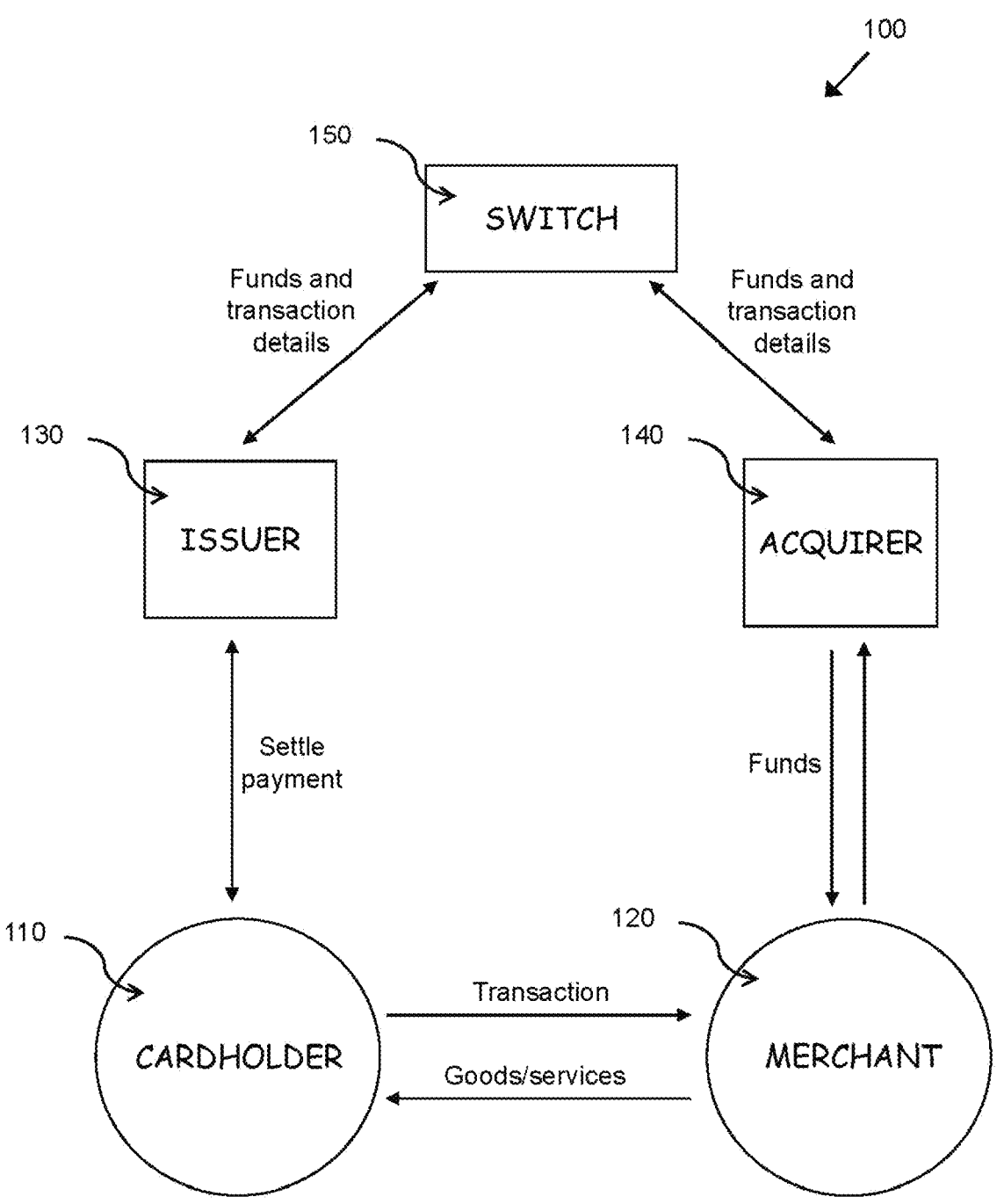
FIG. 5 shows schematically a distributed transaction architecture using a four-party model.

FIG. 5 is a block diagram of a typical four-party model or four-party payment transaction scheme. The diagram illustrates the entities present in the model and the interactions occurring between entities operating in a card scheme.

Normally, card schemes—payment networks linked to payment cards—are based on one of two models: a three-party model or a four-party model (adopted by the present applicant). For the purposes of this document, the four-party model is described in further detail below.

The four-party model may be used as a basis for the transaction network. For each transaction, the model comprises four entity types: cardholder 110, merchant 120, issuer 130 and acquirer 140. In this model, the cardholder 110 purchases goods or services from the merchant 120. The issuer 130 is the bank or any other financial institution that issued the card to the cardholder 110. The acquirer 140 provides services for card processing to the merchant 120.

The model also comprises a central switch 150—interactions between the issuer 130 and the acquirer 140 are routed via the switch 150. The switch 150 enables a merchant 120 associated with one particular bank acquirer 140 to accept payment transactions from a cardholder 110 associated with a different bank issuer 130.

A typical transaction between the entities in the four-party model can be divided into two main stages: authorisation and settlement. The cardholder 110 initiates a purchase of a good or service from the merchant 120 using their card. Details of the card and the transaction are sent to the issuer 130 via the acquirer 140 and the switch 150 to authorise the transaction. The cardholder 110 may have provided verification information in the transaction, and in some circumstances may be required to undergo an additional verification process to verify their identity (such as 3-D Secure in the case of an online transaction). Once the additional verification process is complete the transaction is authorised.

On completion of the transaction between the cardholder 110 and the merchant 120, the transaction details are submitted by the merchant 120 to the acquirer 140 for settlement.

The transaction details are then routed to the relevant issuer 130 by the acquirer 140 via the switch 150. Upon receipt of these transaction details, the issuer 130 provides the settlement funds to the switch 150, which in turn forwards these funds to the merchant 120 via the acquirer 140.

Separately, the issuer 130 and the cardholder 110 settle the payment amount between them. In return, a service fee is paid to the acquirer 140 by the merchant 120 for each transaction, and an interchange fee is paid to the issuer 130 by the acquirer 140 in return for the settlement of funds.

In practical implementations of a four-party system model, the roles of a specific party may involve multiple elements acting together. This is typically the case in implementations that have developed beyond a contact-based interaction between a customer card and a merchant terminal to digital implementations using proxy or virtual cards on user computing devices such as a smart phone.

Figure 6:
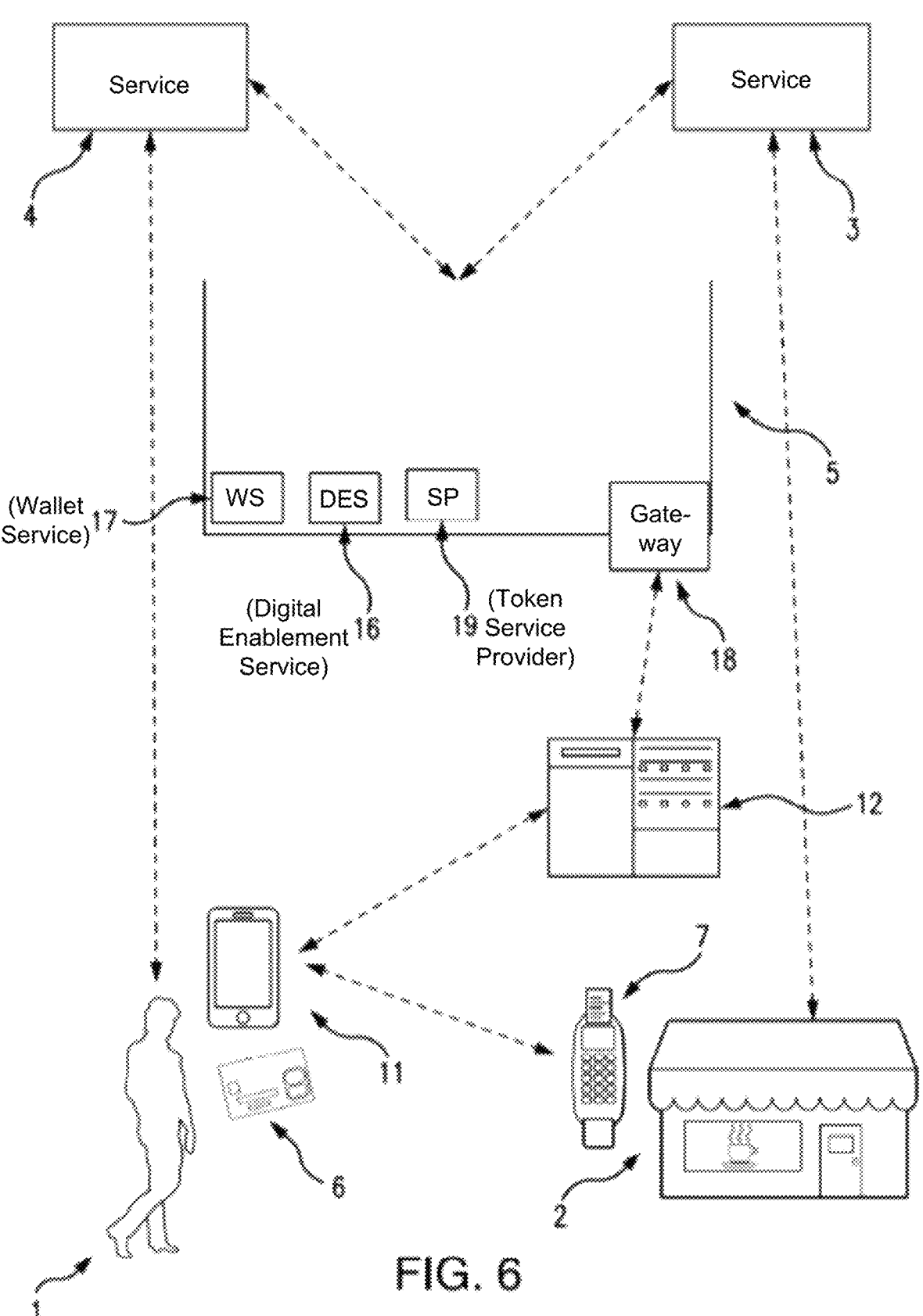
FIG. 6 illustrates elements of a complex distributed system adapted to implement the transaction architecture of FIG. 5.

FIG. 6 shows an architecture according to an embodiment of the disclosure appropriate for interaction between a cardholder and a merchant. This Figure shows a general-purpose architecture for reference but shows in particular elements of an architecture used when a cardholder carries out an online transaction with a merchant server.

For a conventional transaction, a cardholder will use their payment card 6—or a mobile computing device such as smartphone 11 adapted for use as a contactless payment device—to transact with a POS terminal 7 of a merchant 2. However, in embodiments relevant to the present disclosure, the cardholder will use his or her computing device—which may be any or all of a cellular telephone handset, a tablet, a laptop, a static personal computer or any other suitable computing device (here cellular telephone handset or smartphone 11 is shown)—and other computing devices such as a smart watch or other wearable device may also be used)—to act either as a proxy for a physical payment card 6 or as a virtual payment card operating only in a digital domain. The smartphone 11 may achieve this with a mobile payment application and a digital wallet, as described below. The smart phone 11 can use this to transact with a merchant POS terminal 7 using NFC or another contactless technology, or to make a payment in association with its wallet service as discussed below. However, online transactions with a merchant are of particular interest in connection with embodiments of the disclosure, rather than contact or contactless transactions with a merchant POS terminal 7. To make an online transaction, the smartphone 11 may also be able to interact with a merchant server 12 representing the merchant 2 over any appropriate network connection, such as the public internet—the connection to the merchant may be provided by an app or application on the computing device.

The transaction scheme infrastructure (transaction infrastructure) 5 here provides not only the computing infrastructure necessary to operate the card scheme and provide routing of transactions and other messaging to parties such as the acquirer 3 and the issuer 4, but also a wallet service 17 to support a digital wallet on the cardholder computing device, and an internet gateway 18 to accept internet based transactions for processing by the transaction infrastructure. In other embodiments, the wallet service 17 may be provided similarly by a third party with an appropriate trust relationship with the transaction scheme provider. To support tokenisation, a token service provider 19 is present (again, this is shown as part of transaction infrastructure 5 but may be provided by a third party with appropriate trust relationships), and the transaction scheme infrastructure provides a digital enablement service 16 to support the performance of tokenised digital transactions, and to interact with other elements of the system to allow transactions to be performed correctly—this digital enablement service may include other elements, such as token service provision.

For a tokenised transaction, the transaction is validated in the transaction scheme by mapping the cardholder token to their card PAN, checking the status of the token (to ensure that it is in date and otherwise valid) and any customer verification approach used. This allows the issuer to authorise the transaction in the normal manner.

Figure 7:
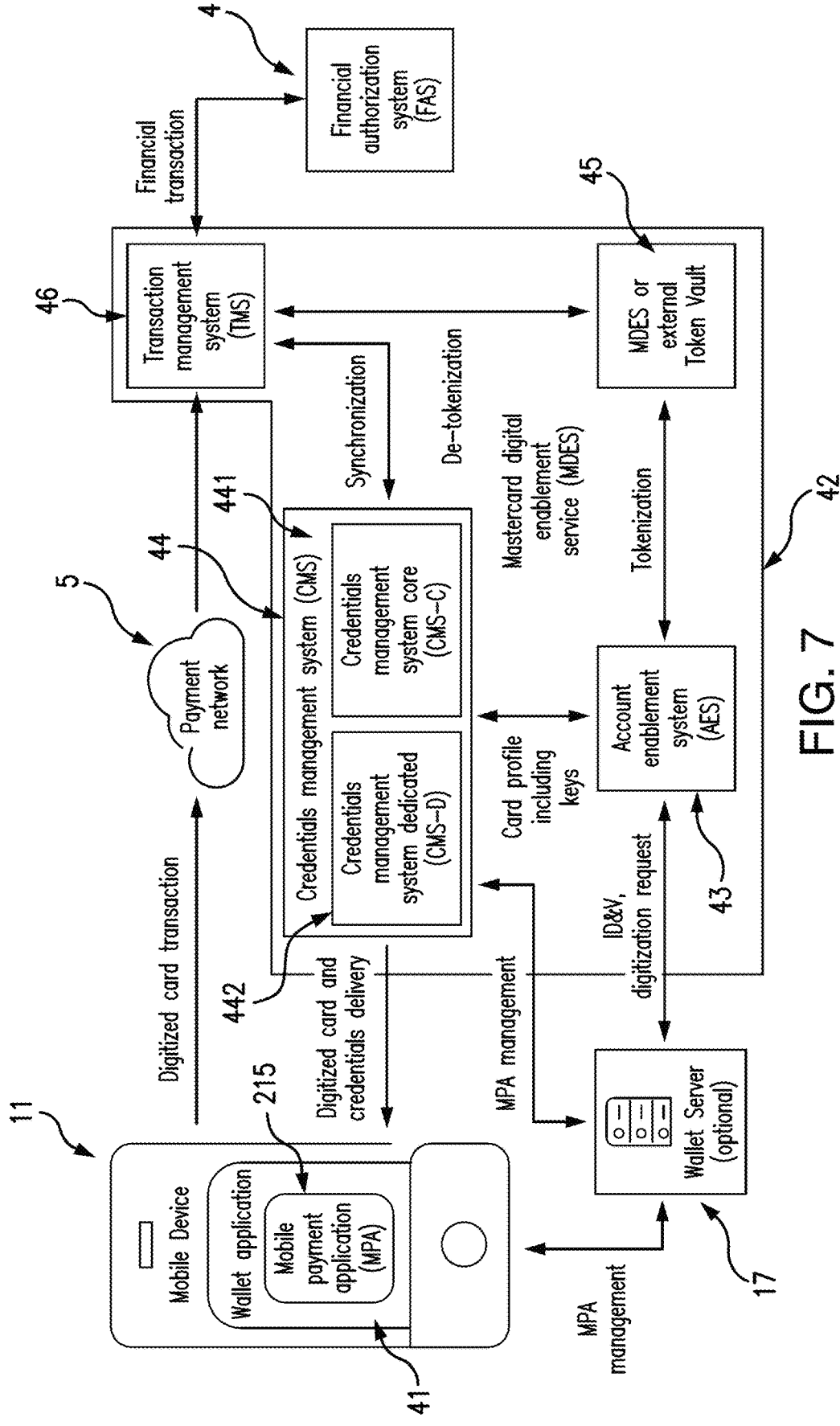
FIG. 7 shows schematically an exemplary system for enabling digital transactions in the transaction architecture of FIGS. 5 and 6.

FIG. 7 shows elements of a transaction infrastructure to support digitised payments from a mobile device in more detail. This Figure shows as a specific example the applicant's Mastercard CloudBased Payment (MCBP) architecture—this is exemplary rather than specific to the disclosure, and illustrates how the architecture is used to support a mobile payment application 215 on a mobile device (such as smartphone 11)—here the mobile payment application 215 is shown as contained within a wallet application or digital wallet 41. Such a digital wallet 41 may communicate with a wallet server 17 to allow management of the mobile payment application, and it also can be used to request digitization of a payment card 6 to be used by the mobile device 11.

The Mastercard Digital Enablement Service (MDES) 42 performs a variety of functions to support mobile payments and digitized transactions. As indicated above, the MDES 42 is exemplary only—other embodiments may use digitisation, tokenisation and provisioning services associated with other transaction processing infrastructures, for example. The wallet server 17 is not a part of the MDES 42—and need not be present, for example if the mobile payment application 215 is not embedded within a digital wallet 41—but acts as an interface between the mobile device 11 and the MDES 42. The MDES 42 also mediates tokenised transactions so that they can be processed through the transaction scheme as for conventional card transactions. The following functional elements shown within the MDES 42: the Account Enablement System (AES) 43, the Credentials Management System (CMS) 44, the Token Vault 45, and the Transaction Management System (TMS) 46. These will be described briefly below.

The Account Enablement System (AES) 43 is used in card digitisation and user establishment. It will interact with the mobile payment application (here through the wallet server 17) for card digitisation requests, and it will populate the Token Vault 45 on tokenisation and will interact with the CMS 44 to establish a card profile with associated keys for digital use of the card.

The Credentials Management System (CMS) 44 supports management of cardholder credentials and is a key system within the MDES 42. The core system 441 manages synchronisation with the transaction system as a whole through interaction with the TMS 46 and manages the channel to the AES 43. The dedicated system 442 provides delivery of necessary elements to the mobile payment application such as the digitized card and credentials and keys in the form needed for use. This system may also interact with the wallet server 17 for management of the mobile payment application.

The Token Vault 45—which is shown here as within the MDES 42, but which may be a separate element under separate control—is the repository for token information including the correspondence between a token and the associated card. In processing tokenised transactions, the MDES 42 will reference the Token Vault 45, and tokenisation of a card will result in creation of a new entry in the Token Vault 45.

Transaction Management System (TMS) 46 is used when processing tokenised transactions. If a transaction is identified by the transaction scheme as being tokenised, it is routed to the TMS 46 which detokenises the transaction by using the Token Vault 45. The detokenised transaction is then routed to the issuer (here represented by Financial Authorisation System 47) for authorisation in the conventional manner. The TMS 46 also interacts with the CMS 44 to ensure synchronisation in relation to the cardholder account and credentials.

Embodiments of the disclosure are directed to enabling aspects of a system for the performance of a digitized transaction as shown in FIG. 7—and in particular the management of credentials—to be decentralized. This is done by replacing a central node with a decentralized set of nodes each capable of credential management, as is shown in FIGS. 8 to 10.

FIG. 8 shows a decentralised system of computing nodes Nx, each capable of both generating G and validating V credentials. These credentials can be valid across the whole system (unless restricted to some nodes as result of on-soil regulation or the like), and in this case are associated with transactions for a set of users (clients) whose transactions are routed to that node, typically through geographic proximity. Nodes provide credential generation G and credential validation V as services to clients, and they need to be able to generate the credentials securely and validate them securely while they are valid at least. In the architecture shown, credentials are not stored—they are generated on request and validated on the fly. As FIGS. 8 and 9 show, in addition to credential generation and validation, key management K and monitoring M can be considered as services both locally at a node and across the system, and access control AC will typically be required to allow access to a service. These aspects will all be described in more detail below.

Elements of a suitable computing node are shown in FIG. 10. The node 80 comprises at least one networking connection 81 to allow communication to clients 90 and other nodes 91 as well as (in this example) a central node 91a. Communication is shown here as being through separate networks to each set of other parties—through a first network cloud 92 for connection to clients, and a second network cloud 92a for connection to other nodes within the distributed system. This reflects that these networks may be physically different, or that they may have different security requirements and protocols.

The node 80 contains a plurality of conventional servers 83 (which will contain their own processors and memories—not shown—along with other components as would normally be found in a server) and a memory 84 containing a central database. Also comprised within the node 80 are a plurality of hardware security modules 85 (HSMs), adapted to hold cryptographic material in the form of keys needed to perform cryptographic functions and to perform cryptographic functions securely. Here elements within the node 80 are shown communicating by means of a bus 86. While the node 80 in this case is represented as a single data centre, this is not required—the "bus" may be, for example, comprise a dedicated network connection between a group of related data centres that allows them to provide a real-time response such that they will appear to other entities communicating with the node to be part of an integrated whole.

Existing procedures for credential management in payment systems are centralized—any request to create or validate credentials results in a query to a centralized system. For a payment system implementing EMV standards, credentials are generated using keys derived according to a hierarchical process. Issuer Master Keys (IMK) are associated with a specific range of tokens, and keys for use for credentials are derived hierarchically (Card Master Keys—CMK—from IMK, and then Session Keys—SK—from CMK). This approach is used for devices, such as physical cards, but is also used for digital transactions. The number of digital transactions is increasing extremely rapidly, as opposed to device-based interactions where the growth is more consistent with resources.

In the digital ecosystem, while there is very rapidly increasing demand, there is also generally a more secure environment, as the interaction is typically between merchant systems (or payment service providers) and the transaction system over secure pathways between well-identified participants. There are thus interactions that may require multiple cryptographic operations for security in a device context that can be streamlined when delivering services in a server context when exposing API to access the services while keeping all the assets secure in a constrained environment including key management and cryptographic operations.

While it may appear desirable to scale a transaction system for performing digital EMV transactions by using a set of distributed servers to generate and validate credentials, it is found that this approach does not scale. The overall level of key generation would not be changed, but the amount of messaging within the system would be very greatly increased, as an extremely large number of tokens would need to be managed and replicated. Processing would be demanding and also extremely expensive, as existing EMV key generation approaches require customised rather than off-the-shelf Hardware Security Modules (HSMs), and data storage and particularly network latency would become impossible to manage problems.

This distributed approach is supported by replacing the binding of a token to a specific hierarchically derived key, allowing instead the first available key from a stack of keys to be allocated to a tokenized transaction. This approach, using flexible and dynamic key management, allows for a scalable solution. Monitoring can be carried out in such a way as to ensure that the distributed architecture is secure without requiring the transmission or replication of large quantities of sensitive information. This approach can also be carried out in a standard HSM using fully FIPS compliant processes—for example, DES and 3DES need not be used. This approach is described in more detail below.

At present, the device security model is also used by the present applicant for fully digital transactions. This security model involves Issuer Master Keys (IMKs) being stored in the transaction system HSMs and used to derive Card Master Keys (CMKs) from the relevant IMK and a card PAN (Primary Account Number). These CMKs are then stored in a device (typically a Secure Element or substitute technology). When using software-based solutions to generate transaction credentials using a mobile device, a Session Key (SK) is generated using the relevant CMK and an ATC (Application Transaction Counter) for the card/device—this is currently generated by the Credentials Management System (CMS) as shown in FIG. 7. At present, all tokens, even for fully digital transactions, are bound to this IMK/CMK/SK derivation. This also applies for transaction credentials generated by server through API exposed by the transaction system for remote payment transactions.

This approach requires a very heavy management load for keys, which is not appropriate for fully digital transactions, as is discussed below with reference to FIGS. 11 and 12. Generation of SKs, and hence Application Cryptograms (AC—a standard mechanism in EMV transactions) requires multiple cryptographic operations, not all of which can be carried out by a conventional off the shelf HSM, so bespoke HSMs are required. Massive distribution of keys across the system is required so that performance of a transaction can be supported wherever it occurs, and ATC management is complex.

It would be desirable to use standard HSMs, avoid massive key replication while having keys directly available for use, and to be able to provide a solution that limits the number of HSMs overall (as these typically support only a few thousand keys).

Much of this security is to provide assurance by appropriate prevention mechanisms even if there is the possibility of compromise at a system endpoint (for example, at the cardholder device). Aside from this, security has a limited role, as shown in FIG. 11. The main purpose of the cryptographic function is to provide a guarantee—this covers both integrity of the data and authentication. The transaction related data protected by a cryptographic data includes identification of a transaction and the associated token, along with an indication of any cryptographic processes used and any relevant financial data (along with any other aspect of the transaction that needs to be guaranteed). This is represented by a transaction credential—this needs to be generated G and subsequently validated V, with these processes being monitored M to ensure overall system integrity and supported by a key management system K of some kind. The present disclosure relates to an approach to monitoring which is effective to address the consequences of erroneous or malicious action by appropriate detection, messaging and reaction—as will be described, this largely takes place separately from the actual performance of a transaction.

In the case of a fully digital transaction, these processes take place in a constrained environment where endpoint security is not an issue in the same way as with devices. As can be seen from FIG. 12, in this domain the token does not reach either of the endpoints of the conventional transaction management system—the cardholder or the issuer. Instead, it operates across a merchant system or a payment service provider (PSP) and transaction scheme provider.

This approach allows for decentralisation of the credential system from a complex central server into a number of nodes providing services. These nodes will typically be geographically distributed but may extend over a number of data centres (for example, by use of a cloud infrastructure to achieve data sharing within a node). These nodes provide services—in relation to credentials, a generation service G and a validation service V—with defined rules for access control to the services. The merchant or PSP communicates with the generation service G to obtain credentials, which are then used in a standard authorisation process carried out over the payment network of the payment system, with the validating service V being called upon where necessary to validate the credential. These services have access to the computing infrastructure (HSMs, databases) of a node. Monitoring M and key management K services are also provided—these may be centrally organised or comprise a mix of central and local functionality.

Access control to services can be provided in an essentially conventional manner. A general set of controls can be defined for a node, with the possibility of local modification—for example, to meet local regulatory or other specific security requirements. This approach makes it easy to implement localised policies, for example, by constraining all traffic for a particular country to a particular set of nodes, or by taking other region- or market-specific actions. Access control can be performed at more than one level (for example, for individual services, but also for a node), and there may be specific rules or checks for specific service types. Access control is potentially very granular and may provide specific solutions in a versatile way—for example, it could be used to allow a given merchant to perform a maximum number of transaction credential generation operations during a defined time for a given token.

The key management mechanism shown in FIG. 13 illustrates how a limited number of keys can be allocated to a node while providing a deterministic process in order to pick a key to generate credentials. The same process can be used by a validation entity to determine the key that was used by the generator so that it can validate any cryptographic material that is part of the credentials submitted for validation.

For each node, the generation G and validation V services have access to a pool of HSMs. The HSMs contain keys that are each uniquely identified by a set of key identifiers (KeyId). KeyId may be a label, a value, an explicitly unique value such as a UUID, or anything else with appropriate properties. These KeyIds are stored in uniquely identified (Identifier) key lists—these key lists provide a list of relationships between an identifier (Id) and a stored key (KeyId). The identifiers (Id) are what will be determined by the deterministic process in order to establish what key is to be used, as will be described further below.

The integrity of each key list is guaranteed using a seal (Seal)—if the key lists are provisioned from a central location, this may be applied by a trusted party associated with that central location. Several other distribution models can be supported using for example a trusted party being a local functionality instead of a central location. A node will typically have a number of key lists available, but with only one active for generating credentials (G) at a given time—it will however generally be necessary for the validation service (V) to be able to access any key list that may be associated with a credential that is still valid. Key rotation in this approach is extremely straightforward—it may simply involve replacement of the active key list with another key list. It is however very straightforward to tell which KeyId is needed to validate a credential—it will be determined fully by the node identifier and the reference of the key list. That information is part of the credential and is used as input to the deterministic process to pick a key from a list of keys.

FIG. 13 illustrates an exemplary arrangement for Node Ni, which has two generation services G able to generate credentials associated with transactions. At any given point in time, these services G will be required to use a given key list—say Key List A in the first instance. This uses the yellow and blue keys, so these keys must be loaded in the HSMs used by the generation services G. After the expiry of a period of time, the key rotation process may for example mandate the use of Key List B—this uses yellow and blue keys, but also the green key, so the green key must be loaded in the relevant HSMs if not already present. The specific key to be used is selected from the key list by a deterministic process—this will typically give a different result after key rotation, but this is not inevitably the case (for example, Id=3 or Id=6 would give the blue key before or after rotation). While the generation services G do not need Key List A after key rotation, the validation services V still do—they require access to any key list that relates to a potentially valid credential. The validation services V must be able to establish exactly which key was used to generate a credential by the generation services G in order to validate a credential.

The transaction related data to be protected cryptographically includes identification of the token associated with the transaction, but also identification of the transaction itself.

For this, some kind of transaction identifier is required. At each node, the credential generation and validation services have access to a local database which can be used to manage such data. To ensure that transactions are managed effectively across the system, any generation of transaction credentials for a given token should be associated with a unique transaction identifier for each transaction. This may be a UUID or any appropriate identifier structure (such as a concatenation of an n bit node identifier, an e bit epoch time, and a c bit local counter).

The size of data to be carried in transaction credentials could however be reduced to a few digits by use of a local transaction counter. This could simply be stored in the local database of a node and the local (rather than a global) value incremented when a local generation service G generates new transaction credentials for a token, a process shown in general terms in FIG. 14.

An exemplary process for identifying a key to use for a transaction will now be described with reference to FIG. 13. As indicated, at any given time a generation service G has access to a set of keys in local HSMs and uses keys in accordance with its currently active key list. This key list is itself uniquely identified (by Identifier) and contains a list of entries which correspond to relationships between an identifier (Id) and a stored key, represented by KeyId. In the case of Key List A, there are ten entries, and each Id is a single integer.

There will be a deterministic process associated with a key list to determine which key will be associated with a given transaction. It need not be the same deterministic process for every key list, but it needs to be used consistently for that key list so that both generation and validation services will achieve the same result. To provide this association, the deterministic process should operate on information identifying the transaction, such as some kind of transaction identifier—in this case, the local transaction counter (LTC) is a particularly effective choice as this is conveniently available and easy to process.

There are many choices available for a function, but the simplest choice is a MOD operation—for example here, Id=LTC MOD 10 would be appropriate to provide a deterministic result which could point to any of the available values of Id. Any validation service V with access to the transaction counter value in transaction data (or any counter derived from that value) can then determine the logical key identifier that was used by the generation service G that generated the credential and access the correct stored key without any trial and error mechanism. Associating the deterministic process function (referred to below as keyList-.GetIdFunction) to the attributes of a key list in this way allows a scalable solution that can accept any number of logical key identifiers for a given key list.

The HSM cryptographic function should be appropriate to ensure data integrity and authentication through credential generation and validation. The cryptographic function operates on the chosen transaction data, using the key, and provides an output which does not expose the key. Various alternative cryptographic functions could be used—HMAC is a particularly effective choice with several options regarding the hashing function, but CMAC, CBC MAC are among possible alternatives not even talking about solutions using asymmetric cryptography. The cryptographic function used should be specified in the key list (as keyList.CryptoFunction) and is also driven by the capabilities of the HSMs used for generation and validation. On-soil regulations, cryptographic material export or other security considerations may lead to the choice of specific cryptographic functions.

Within the transaction data, there should be information representative of the application cryptogram generated during the transaction process. This may be a reduced form of the cryptogram—for example, in legacy EMV transactions this may be provided as the CVC2 field. This is significant as a validation service V must be able to access all the data used by a generation service G to generate a cryptogram—this will include the following:

dynamic information carried as part of the transaction flow;

shared information from one of the following:

replicated processes (such as management of the key lists);

system parameters for particular use cases.

Standard approaches for difference use cases—legacy transaction, UCAF and DPD field transactions—are discussed further below. Legacy transaction use cases provide a solution when the Merchant and/or the PSP are only able to manage PAN, Expiry Date and CVC2 as part of the transaction flow, and do not have access to more recent developments. The UCAF use case aims to leverage the more recently introduced Universal Cardholder Authentication Field to carry more data as part of the transaction flow. The DPD use case covers the introduction of Digital Payment Data, a container able to carry all the data needed as part of the transaction flow.

A full set of cryptographic mechanisms is shown in FIG. 15. Key management is discussed with reference to FIG. 16. There are two aspects to key management in this model: management of the keys themselves, including their generation and delivery to the HSMs associated with the nodes, and management of the key lists, including their generation, distribution, activation and deactivation. The key lists are sensitive assets while keys are considered as secret assets—the key lists define the keys to be used for generation and validation of cryptograms. Keys require end to end security with secure transport of the keys using wrapping/unwrapping techniques when loading the keys in HSMs. Their use should not be compromised by the key lists in case an attacker would like to change the content of a key list in order to alter the key selection process. The integrity of key lists is guaranteed by the seals—a seal is provided for a key list by the generating party or an associated trusted party, will involve a suitable cryptographic process (such as HMAC with an appropriate dedicated key or using for example a digital signature generated using asymmetric algorithms such as RSA, ECC, SM2 . . . ), and has the effect that any relevant part of the system can have confidence that the key list was generated by an appropriate party and has not been modified. In addition, the key list seals can be used in the generation and validation of cryptograms to secure the credentials.

Different control models are possible. There may be centralized control, with a central service generating keys and key lists, and distributing these to the different nodes. There however also may be localised control if dedicated processes are required at a particular node. This may in particular apply if there are specific requirements for a particular country—for example, on-soil regulations or restrictions on export of cryptographic material. This may also apply if there is a proprietary mechanism needed for HMS management—for example, with a particular cloud service provider. This need not be node-limited—it could apply to regional control with a central service within a region (this may be particularly appropriate where there is a specific security model for a particular country to meet local legal requirements). There may also be a hybrid or composite model, in which some key and key list provisioning is central, whereas some is local—there may also be a distributed model in which distributed peers together assume the role of a central service.

Monitoring is shown in general terms in FIG. 17 Here, monitoring is complementary to security actions taken directly in a service to prevent fraud or misuse (such as the basic purpose of the service—generation of a credential using a cryptogram with subsequent verification). Such monitoring aims to detect security anomalies associated with a transaction—it can then trigger appropriate reaction mechanisms to contain any security risk and identify any attacker. In principle, this may have both local and central aspects. It is found that a hybrid approach is particularly effective in order both to provide effective detection of any issue and to produce reaction effective to counter risks associated with a fully distributed architecture.

There are three types of issue to be addressed by monitoring in such a system: integrity of the distributed system; generation of transaction credentials; and validation of transaction credentials. As transaction credentials may be generated or validated anywhere, it is important to have effective monitoring across the whole distributed system. An exemplary risk is that of misuse by an attacker of genuine transaction credentials generated by a generation service G in a node, in particular by an attempt to validate in multiple validation services in other nodes—this would be an issue if a validation service V did not have effective visibility of actions taken by validation services V in other nodes of the distributed system.

While monitoring is important to maintain the integrity of the system, it is also important to limit the amount of messaging that results to ensure that the system is scalable and will not be overloaded by the monitoring process. It is therefore desirable for messaging out of nodes to be limited to that genuinely necessary to address threats and for nodes to store information locally to allow effective use of the results of monitoring.

A method and architecture for monitoring in accordance with these principles will now be described in more detail. After describing the architecture as a whole, the use of this architecture for monitoring different event types will be described. After this, the use of monitoring in detection and prevention of different attacks will also be described.

A monitoring architecture will now be described with reference to FIGS. 18 and 19, with interactions between system elements described in later sections. The description defines system elements and their actions such that the skilled person will be able to implement them, without unnecessary constraints on messaging or information storage—it provides a full description of the functional needs and core principles related to monitoring according to embodiments of the disclosure.

In the remainder of the document, elements most properly labelled [G], [V], [m] and [M] are referred to for convenience as G, V, mG or mV and M. This also applies to [k] and [K]. For example, G1, V2 . . . means "G in node 1, V in node 2 . . . ." The same notation is used when referring to Vj or Vk, with Vj the validation process in node Nj and Vk the validation process in node Nk. Any G, mG, V, mV . . . can have several instances for a given node. This applies to M, or any other entity.

In addition to monitoring activities related to management of transaction credentials (generation and validation), audit activities in order to guarantee the integrity of the system should be considered—these will cover among others access control, the communication layers between the entities involved and the management of HSMs (Hardware Security Modules). Such audit activities may however be carried out in an essentially conventional way and are not discussed in further detail here.

FIG. 18 shows a monitoring architecture used in embodiments of the disclosure. At the top level are shown the conventional transaction system elements engaging with the process of generation and validating credentials for a transaction—the merchant (or payment service provider in the case of online transactions) 161, the acquirer 162 and the transaction scheme provider 163. The next level relates to the distributed nodes, and it relates to the basic processes of the node 164—generation services G 165 and validation services V 166—here, multiple validation services are shown, indicating that the credentials generated by a generation service G may be validated by a variety of validation services Vj, Vk. In this case, node 164 contains only a generation service and the validation services are in other nodes (not explicitly identified). An alternative node (164a) is also shown in shading as an alternative possibility—in this case there is both a generation service G and a validation service V in the same node. A generation service G has access to a local database 1651 and a validation service has access to a local database 1661. Also within the node 164 are local monitoring services mG 167 with local database 1671 for monitoring generation services 165 and local monitoring services mV 168 with local database 1681 for monitoring validation services 166. As can be seen, there are interactions and messaging between local monitoring services and the services that they are monitoring, but also between services—here, messaging (typically internode messaging) between local generation service monitoring mG and local validation service monitoring mV is shown. A further level is needed if the global monitoring service M 169 is required—typically this is the result of some kind of escalation. The global monitoring service 169 is able to communicate with both types of local monitoring service 167, 168. If an action needs to be cascaded to each node (represented as a distributed action in FIG. 18), messages may originate from the global monitoring service M and be cascaded to each generation service G and validation service V through their local monitoring services mG and mV.

It should be noted that this architecture is a specific example of a more general architecture for monitoring of service processes that may be carried out in one of a number of nodes of a distributed computing system. As will be described, this architecture is effective to allow the service process—in this specific architecture, both the credential generation process and the credential validation process are service processes, each carried out for a client—to take place without delay while allowing effective monitoring using peer-to-peer interaction between monitoring processes to exchange a first type of information and a remote coordinated monitoring system to receive a second type of information. The first type of information can be used to provide rapid updates that can address, for example, coordinated attacks, whereas the second type of information can be used to ensure sufficient knowledge of events across the system to prevent other types of attack developing.

FIG. 19 shows this arrangement with the levels explicitly marked. The top level 171 involves only conventional transaction scheme entities. The second level 172 and the third level both exist within nodes—the second level 172 is a service layer and the third level 173 is a monitoring layer. The fourth layer 174 is constituted by the global monitoring service and messaging associated with this service.

The entities and interactions shown in FIGS. 18 and 19 will now be described in more detail.

Key management is explicitly not shown in FIGS. 18 and 19, but the principles underlying key management are provided here for completeness. Monitoring of key management activities is considered as a specific process associated with system audit. Key management monitoring provides assurance that cryptographic materials are ready to be used, and that they are properly wiped or archived (using escrow services) when no longer required to support transaction credentials generation and validation. Key management monitoring also addresses the management of key lists through creation, distribution, activation and deactivation.

Generally, both local monitoring (mG and mV) and central or coordinated monitoring (M) will be aware of key management activity but will be separate from key management monitoring. In the arrangement shown, the local monitoring processes will not access the HSMs containing transaction keys, and so these processes will not be able to call on HSM cryptographic processes (and so will not be able to generate or validate credentials on an ad hoc basis). Coordinated monitoring M may in embodiments be able to do this, preferably through specific interfaces determined by the key management process.

A validation process V operating in node Nj can validate transaction credentials from a given set of generation processes G operating in that node and other nodes {Ni, Nj, Nk . . . }. As discussed above, each generation process G—from which transaction credentials can be validated by a validation process V—has an associated key list (KLi, KLs, KLref . . . ) which is shared with validation processes V where KLi is the key list identifier, KLs is the key list seal and KLref is the key list reference.

From FIG. 18, it can be seen that the following "vertical" process interactions exist within a node:

G interacts with a local monitoring generation process (mG).

V interacts with a local monitoring validation process (mV).

As can also be seen from FIG. 18, there are also "horizontal" process interactions. Such interactions may be established between a local monitoring validation process mVj, located in node Nj, and:

A local monitoring generation process mGj in the same node Nj.

Any local monitoring generation process mGi, mGk . . . (in nodes Ni, Nk . . . ), for which mVj has access to the key list of each mGx, x=i, k . . . .

FIG. 18 shows the same interactions for mVk, located in node Nk. This peer to peer communication between monitoring processes allows rapid communication of significant information between monitoring processes (and so between associated service processes through the vertical communication between monitoring processes and service processes) without impacting the services themselves, as will be described further below.

Any local monitoring process mG/mV, whether it is associated with a G or a V process within a certain node—can interact with a coordinated monitoring process M. This coordinated monitoring process M is typically not directly linked to a node, but rather bridges between the local monitoring processes of multiple nodes. It also provides an eventual reaction manager which can be used to target one, several or all the nodes to make necessary changes (for example, to adapt the system to respond to a known threat).

Such monitoring processes (local or coordinated) may need to store for a while some sensitive data such as cryptograms or input for transaction credentials generation and/or validation.

As can be seen, there are a variety of message types that can be used by the different entities.

Credential generation and validation services (G/V) can communicate with associated monitoring processes (mG/mV) within the same node using a pair of vertical in-node messages as follows:

G/V calls the local monitoring mG/mV, respectively, through an in-node Monitoring message.

mG/mV may require an action from G/V, respectively, with an in-node Action message.

The two local monitoring processes mV and mG within the same node can communicate with each other using a pair of horizontal in-node messages as follows:

mV calls mG through an in-node Reporting message.

mG may require a reaction from mV with an in-node Reaction message.

Two local monitoring processes mV and mG situated in two different nodes may communicate with inter-node messages, namely:

mV calls mG through an inter-node Reporting message.

mG may determine a reaction on mV, with an inter-node Reaction message.

Under certain conditions, a local monitoring generation process (mG) or a local monitoring validation process (mV) in any node may call the coordinated monitoring process (M) through an Escalation message. Following a risk management decision, M can trigger Distributed Action message(s) to one or more local monitoring processes (mG/mV) in any node to make the system fully aware of a necessary change.

The timing of messaging within the extended system is highly significant within the system described. There are three timing types used for messaging: real time; near real time; and post-transaction. Real time messaging is immediate. Near real time messaging may not be immediate—real time messaging is prioritised over it—but it is rapid and will typically complete during a related extended system event, such as the authorisation of a transaction. Post-transaction messaging is less urgent and is used for reconciliation and system changes to remove identified vulnerabilities. In the embodiment described, the timing used for specific messages is as follows:

G/V manage in real-time:

Pseudo-random P' freshness, where

P=(KLi, KLs), (RF, C), LTC, UN, UUID . . .

P'=(RF, C), LTC, UN, UUID . . . where P' represents P without the (KLi, KLs) information Generation/validation of cryptograms (as part of transaction credentials generation/validation).

Option to defer cryptogram validation based on Risk Based Analysis (RBA) principles.

In-node Monitoring messages (using P' as needed) are sent in real-time from G to mG and from V to mV, with the local monitoring processes (mG/mV) expected to have access to KLi and KLs information.

Inter-node Reporting messages are sent near in real-time from mVs to mG to trigger the aggregate processing of pseudo-random P' values.

Requirement for an immediate horizontal action placed on the mV caller with an inter-node Reaction message sent in near real-time from mG to mV, following a Reporting message initiated by mV.

In-node Monitoring messages are processed in near real-time by the destination local monitoring processes, with appropriate updating of databases and sending of in-node Action messages to the vertical caller in near real-time.

Coordinated monitoring process (M) takes place post-transaction based on Escalation messages triggered by one or several of the local monitoring processes (mG/mV). Again, the coordinating monitoring process (M) is expected to have access to KLi and KLs information.

Coordinated monitoring (M) is able to send Distributed Actions to one or more of the local monitoring processes (mG/mV) in case of major threats.

As can be seen with respect to FIGS. 18 and 19, messaging between, within and from the first and second layers (main transaction scheme entities and generation and validation services) are generally sent in real time, enabling generation and validation to be full real time processes. Local monitoring and other communication within the third layer take place typically near real time, so the speed of transactions is not affected but so that response is sufficiently rapid to address threats on a sufficiently short timescale. Typically such near real time communication is sufficiently rapid that it will take place in the same time frame as the associated transaction system process—here, this will typically be authorisation of a transaction—often before the completion of such a process, rendering this approach effective against attacks or problems occurring at multiple points in the system. Coordinated monitoring and other communications involving the fourth layer do not need to be immediate and can be carried out post-transaction.

Interaction between entities involved in monitoring will now be described with reference to different system events. Firstly, the basic case of generation of a credential by a generation service G and validation by a validation service V (in the same node or a different node) will be discussed. Both generation service G and validation service V may report to the coordinated monitoring service M.

The main transaction system events are that G performs cryptogram generation as payment proof of a transaction. G then delivers transaction credentials to the party that has requested them (merchant or PSP). These transaction credentials are provided to V as part of the transaction flow (received over the payment network from the acquirer). V will validate the cryptogram and decide whether it validates the transaction credentials or not. These actions may be embedded in other layers of transactional activity, but these are not relevant to the present disclosure.

The main monitoring flows are shown in FIGS. 20a and 20b—these are complementary to the main service flows based on cryptogram generation/verification as described above. FIG. 20a illustrates actions with vertical flows within a processing node (and to the node's client and the coordinated monitoring service) and horizontal flows between processing nodes, whereas FIG. 20b provides a key to the types of action shown. In general, the monitoring flow is based on the detection of a security anomaly and the triggering of appropriate actions with vertical flows within a processing node (and to the node's client and the coordinated monitoring service) and horizontal flows between the processing nodes for anomaly Reporting and a security-maintaining Reaction to it. In addition to Processing performed by any component (as described in the two above paragraphs), vertical processes include Monitoring (by the monitoring service associated with a generation or validation service) and Escalation to the coordinated monitoring service M which may provide Distributed Actions to multiple nodes, with individual services responding to these by provision of Actions from the monitoring service to its associated service. Horizontally, there will be inter-service (which may be in-node or inter-node) Reporting, typically on a validation operation, and inter-service Reaction (which may be in response to Reporting).

Besides this basic functional interaction, both G and V are also involved in a complementary monitoring process to increase the trust in the decision of the distributed system.

Monitoring Activities by G are as follows:

1 G generates transaction credentials following a request (from a merchant or PSP).

2 G→mG: After returning transaction credentials to the requestor, G uses an in-node Monitoring message to inform its local monitoring generation process (mG).

3 mG processes received information—this may come from two different sources
   a) (Vertical) G→mG, concerning the outcome of the transaction credentials generation service by G.
   b) (Horizontal) mV→mG: mV performs reporting of the outcome of the transaction credentials validation service by V—this may be either in-node or inter-node reporting depending on the validation service V that performs the validation.

4 mG processing may lead to sending one or several of the following messages:
   a) (Horizontal) mG→mV: this will typically be in response to a message received from mV about the validation process and involves mG informing mV of a Reaction that may be needed to change some part of the status/result of the validation process. Again, this may be in-node or inter-node depending on the location of the relevant validation service V.
   b) (Vertical up) mG→G: mG may require G in the same node to perform an in-node Action to make changes to the transaction credentials generation service status and to data in corresponding databases.
   c) (Vertical down) mG→M: mG may determine that it needs to make an escalation to the coordinated monitoring process (M).

5 M may make a confirmation/correction decision in connection with the performed transaction credentials validation in response to an escalation message and will then perform a process to correct the behaviour of any of the G/V/mG/mV processes through Distributed Action messages sent to mG/mV.

Monitoring Activities by V

1 V receives transaction credentials generated by G and validates them as part of transaction processing.

2 V→mV: V sends an in-node Monitoring message to inform its local monitoring validation process (mV).

3 mV processes received information—this may come from two different sources:
   a) (Vertical) V→mV, concerning the outcome of the transaction credentials validation service by V.
   b) (Horizontal) mG→mV, relating to any Reaction required by the monitoring generation processing (mG). This may be an in-node or inter-node message, depending on the relative locations of G and V.

4 mV processing may lead to sending one of the following messages:
   a) (Horizontal) mV→mG: mV sends a Reporting message to mG, allowing mG to make decisions based on validation process information. Again, this may be an inter-node or in-node message depending on the locations of G and V.
   b) (Vertical up) mV→V: mV may require V in the same node to perform an in-node Action to make changes to the transaction credentials validation service status and to data in corresponding databases.
   c) (Vertical down) mV→M: mV may determine that it needs to make an escalation to the coordinated monitoring process (M).

5 M may make a confirmation/correction decision in connection with the performed transaction credentials validation in response to an escalation message, and will then perform a process to correct the behaviour of any of the G/V/mG/mV processes through Distributed Action messages sent to mG/mV.

These basic principles apply to more complex use cases. The next to consider is the flow when there are two different validation services—here, V1 and V2—to be considered. Both V1 and V2 are able to validate the credentials generated by G, as both V1 and V2 have access to the key list used by G. In this use case, G generates transaction credentials that can be validated by multiple validation services, the validation services V not interacting with each other directly but each exchanging horizontal Reporting and Reaction messages with G.

In this use case, the processing and messaging provided by the validation services V1 and V2 is exactly as provided by the validation service V in the original example. The process at the monitoring generation service mG will be subtly different from before. mG needs to consolidate responses from non-interacting monitoring validation services mV1 and mV2. An effect of this consolidation, in particular in relation to reporting of the ranges of pseudo-random numbers (P') seen by each validating entity V1 and V2, is to allow mG to determine whether any of these pseudo-random numbers has been used by more than one validator, which is an indication of potential fraud. Such a detection could be escalated to the coordinated monitoring service M and Distributed Action messages could be sent to mG, mV1 and mV2 to allow a determination of how processing should be stopped or controlled to prevent potential fraud.

The next complex use case involves two generation services G1 and G2 and a single validation service V validating transaction credentials from both generation services.

The two generation services G1 and G2 do not communicate with each other, and each uses a different key list. V must therefore have knowledge of both key lists and use the appropriate key list depending on the generation service that generated a given credential.

In this case both mG1 and mG2 will act exactly as the generation monitoring service mG in the original example. The monitoring situation for the validation service is different, however. Validation monitoring service mV must be able to send both in-node and inter-node Reporting messages to each relevant generation monitoring service, and also receive Reaction messages from both generation monitoring services. Since G1 and G2 are using different key lists, the transaction credential generation action performed by one G (G1 or G2) is completely independent of the transaction credential generation action performed by the other G, and as a result their corresponding lists of pseudo-random numbers (P') and local transaction counters (LTC) are completely independent of each other.

In this case, detection of malicious action needs to be addressed by the coordinated monitoring service M. The coordinated monitoring service M can instruct a Distributed Action to both mG1 and mG2 if a malicious behaviour identified in a transaction with credentials generated by one service and validated by V may have consequences for validation by V of credentials generated by the other generation service. This is a practical concern, since an attacker that succeeded in an attack relating to a particular card or token (PAN/TUR) in, say, a (V↔G1) interaction would be likely to use it for a (V↔G2) interaction as well. Use of M is effective to stop malicious processing affecting both generation services (G1 and G2) in a case where one of them was compromised.

These two complex cases can be combined in considering flows with two generation services (here G1 and G2) and two validation services (here V1 and V3). In this case, coordinated monitoring M is necessary to provide actions to support all of the parties. If an appropriate issue is detected and escalated, M can determine a set of Distributed Actions for mG1, mG2, mV1, mV3 such that any malicious behaviour discovered in any (Vy↔Gx) interaction is immediately communicated to any other impacted parties to contain the attack.

The flow of interactions will be described in more detail below, considering first of all the basic case shown in FIG. 20a. Interaction flows for the generation service G and the validation service V are shown in FIGS. 21a and 21b respectively. These flows show sequencing in time of the different interactions along with an indication of the processing logic at each step, but without a full description of each message (this is not necessary for this discussion, as the skilled person would be able to provide an implementation of messaging based on this discussion without undue effort). It should be noted that in certain situations the normal flow may be suspended, and that the content provided in messaging may vary (for example, it may be restricted to key details at times of very heavy system load). It should be noted that a basic principle here is to separate the monitoring flows from the transaction flows as much as possible, with mG and mV providing the only points of interaction with their associated services in relation to monitoring, both for making monitoring actions that are processed in flows entirely separated from the transaction flow, and for communicating necessary actions to the associated service from other nodes or from the coordinated monitoring service M.

FIG. 21a shows the interaction flow for the generation service G, with the broader generation process considered to extend across actual credential generation by G followed by G sending a vertically down in-node monitoring message (G→mG) with the result of the cryptographic service activity and a complete trace of execution to its local generation monitoring (mG) process. mG stores this trace—including transaction related information—and updates the status in its databases. mG also processes this information, and this may trigger two different vertical interactions.

A vertically up interaction to the processing node G (mG→G) may take place. This may involve notifying G whether or not the transaction is completed (G does not wait for any response from mG in delivering transaction credentials to its client) or may involve a corrective action, such as suspending a token, or blocking a merchant (or PSP) that triggered the cryptographic service request if malicious activity is suspected. G ends this interaction flow with completing the processing required by mG.

A vertically down interaction (mG→M) if Escalation to coordinated monitoring M is required. This may simply be an indication of completion, but it may also prompt coordinated monitoring M to carry out further investigation of a suspicious situation. In such cases M will act on the basis of consolidated information as described further below.

FIG. 21b shows the interaction flow for the validation service V validating a credential generated by the generation service G. As previously, the monitoring actions do not disturb the transaction flow—the validation action takes place first, followed by sending a vertically down in-node monitoring message (V→mV) to its local monitoring validation (mV) process. This contains information relating to validation of a cryptogram as shown in Table 1 below.

TABLE 1

Information reported by validation service V when validating a cryptogram

| Field | Value | Description | Use Case | | | |
|---|---|---|---|---|---|---|
| | | | L | U | D1 | D2 |
| cryptoValidation | SUCCESS | Crypto validation is successful | X | X | X | X |
| | FAILURE | Crypto validation failed | X | X | X | X |
| | FAILURE_ EXCEEDED | Crypto validation failed and limit is exceeded | X | X | X | X |
| replayDetection | NO_REPLAY | No replay detected during crypto validation | X | X | X | X |
| | REPLAY | Replay detected during crypto validation | X | X | X | X |
| | REPLAY_ EXCEEDED | Replay detected during crypto validation and limit is exceeded | X | X | X | X |
| retryControl | NO_RETRY | No retry used during crypto validation | X | — | — | — |
| | RETRY | Retry used during crypto validation | X | — | — | — |
| | RETRY_ EXCEEDED | Retry used during crypto validation and limit is exceeded | X | — | — | — |

TABLE 1-continued

Information reported by validation service V when validating a cryptogram

| | | | Use Case | | | |
|---|---|---|---|---|---|---|
| Field | Value | Description | L | U | D1 | D2 |
| expiryDate | STANDARD[1] | Validation done using standard reference time to process expiry date | X | — | — | — |
| | SPECIAL | Validation done using special mechanism to process expiry date | X | — | — | — |

[1]In case the value is not set (for example in case of a validation not performed the first day of the month), STANDARD is the default value for expiryDate.

This information relates to cryptographic validation and LTC management—other checks may be made during the validation process, but these are not directly relevant to this disclosure and are not discussed further here.

The processing performed by nV may result in three different interaction streams:

Horizontal interaction: nV sends an in-node or inter-node Reporting message (mV→mG) to the counterpart local monitoring generation (mG) process in the node that performed the cryptographic service G. This interaction and associated processing are described in greater detail below. mV is able to identify the relevant mG using node identification in transaction data. By contrast, mG is not aware of which validation services V are able to validate transaction credentials generated by G, so mG relies on coordinated monitoring M to access all the mVs, while mG can react to a reporting message from a given mV.

Vertically-up interaction: mV sends an in-node Action message (mV→V) to its own cryptographic validation service V in order to correct or adjust the result of the validation as a final "Continue Processing/Decline". V may perform this correcting/adjusting process and send the final result to the issuer.

Vertically-down interaction: mV sends an escalation message (mV→M) to the coordinated monitoring (M) if the transaction credential validation result is such as to require other participants in the system to be informed of the processing outcome. In such cases M will act on the basis of consolidated information as described further below.

Horizontal interactions will now be considered in more detail. Generation service monitoring mG receives an in-node or inter-node Reporting message, and processes the information received and evaluates risk. Three further interaction streams may result, with communication with the following system elements:

G-G is informed with an in-node Action (mG→G) indicating whether or not the cryptographic service should continue to be provided for the concerned Token, or whether such services should be suspended. The same in-node action message can communicate other "extended" actions to G, such as suspension of access to the transaction credentials generation service for a merchant (or PSP).

mV-mV is informed with an in-node or inter-node Reaction message (mG→mV) which may be used to support a final decision "Continue Processing/Decline" for the transaction credentials. mV continues with the same vertically-up interaction with V (mV→V), and the vertically-down interaction with M as described above (mV→M).

M-M is informed with an Escalation message, which M consolidates with other information and determines whether further action is needed.

After receiving escalation messages from either mG, mV or both, an escalation process is performed by coordinated monitoring service M. This may result in three further interaction streams, involving M sending Distributed Action messages to:

Local monitoring generation (mG) process only: M→mG

Local monitoring validation (mV) process only: M→mV

Both mG and mV: M→mG, mV

In their turn, the local monitoring processes perform their analysis and may determine three further interaction streams, sending in-node action messages to G only, to V only, or to both—this flow is shown in FIG. 21c.

The approach described above with reference to FIGS. 21a and 21b can be applied straightforwardly to the more complex use cases described above (one G two Vs, two Gs one V, two Gs two Vs) in accordance with the transaction flows described there.

The separation between real-time processing and near-real-time monitoring can be seen from FIGS. 22 and 23, which illustrate transaction and monitoring flows for the generation service G and the validation service V.

FIG. 22 presents the transaction and monitoring flow for a successfully completed transaction credentials generation service action requested by a legitimate merchant (or PSP). This case covers an entirely vertical flow between G and mG without any escalation to the coordinated monitoring process M.

The credential generation actions take place in real time. At initialization of the flow, in such a case there will be no trace of transaction credentials service generation in the Transaction Database of mG (mGTRX DB) for a transaction with P'=xx . . . xx, Cr=yy . . . yy, MID where P' is a challenge, Cr the cryptogram and MID (or PSP) a merchant identifier. Credential generation actions are as follows:

1. The merchant (or PSP) is identified using MID, which is then established to be a valid subscriber to the transaction credentials generation service, and sends a service request to the G process in the node that is nearest to him (here assumed to be Ni). This service request should contain PAN/TUR information. Here PAN designates Primary Account Number—the normal primary identifier for a transaction card. In the case of a tokenised digital transaction, the more logical reference is to a token rather than to a card. For this context the term TUR (Token Unique Reference) is used as a unique identifier of a token.

2. After the access control mechanism of the node verifies the rights of the MID to the service, access is granted and the service request passes to G.

3. Depending on the acceptance mode, G will generate a fresh challenge $P'=xx \ldots xx$ (using the next LTC value) and will compute the corresponding cryptogram (Cr) for the acceptance conditions (e.g. amount, time/date): $Cr=yy \ldots yy$. Acceptance modes may include here Legacy (L), UCAF (U) and DPD (D1 and D2), with DPD mode having Option #1 and Option #2 available.

4. The generation process will respond to the transaction credentials service request with a triple ($P'=xx \ldots xx$, $Cr=yy \ldots yy$, MID). Note that the MID can be provided in the response where a PSP is handling more than one merchant, each of them using their own MID.

5. After receiving transaction credentials, the merchant (or PSP) will forward them immediately to the acquirer, if the transaction is not deferrable (a direct purchase) or it will store them to send later if the transaction is deferrable (such as a payment for transportation services where the transaction is established on booking).

By contrast, the monitoring actions take place in near real time, after the generation service G has provided credentials, and monitoring actions are as follows:

6. G informs, in near real-time, its local monitoring process mG about the completion of the transaction credentials generation service with an in-node monitoring message that sends the triple ($P'=xx \ldots xx$, $Cr=yy \ldots yy$, MID).

7. The local monitoring process mG receives this trace of the current service execution and checks it against all the records already gathered for that PAN/TUR within that node during a Period (this is the lifespan of a key list), with (KLi, KLs) as parameters of the current key list. If such a record is not present, it will store it as a new record in the mGTRX DB. mG will also keep in mGTRX DB a counter for instances of execution of the transaction credentials generation service, denoted CtrTrxG. This counter will be incremented with any successful reporting of a transaction credentials generation service execution. This counter can be used to support the End of Period Balance Monitoring Flow—EoPBALANCE (discussed with reference to FIG. 31 further below).

The position is broadly similar for the validation service V. FIG. 23 presents the transaction and monitoring flow for a successfully completed transaction credentials validation service action requested by a legitimate merchant (or PSP). This case covers an entirely vertical flow between V and mV without any escalation to the coordinated monitoring process M.

As before, the validation service V performs its actions in real time. Initialisation is as for the generation service case—there is no trace in the Transaction Database of mV (mVTRX DB) of validation by the transaction credentials validation service of a transaction with $P'=xx \ldots xx$, $Cr=yy \ldots yy$, MID where $P'$ is a challenge, Cr the cryptogram and MID a merchant (or PSP) identifier. Moreover, in an LTC database associated with V (VLTC DB) there is no trace of the challenge $P'$. Real time validation actions are as follows:

1. The merchant (or PSP) MID legitimately submits a transaction with $P'=xx \ldots xx$, $Cr=yy \ldots yy$, MID to the acquirer using transaction credentials returned by the generation service following a service request to the G credential generation process.

2. Vj receives the transaction credentials and checks that $P'$ is not already in its VLTC DB for the PAN/TUR (for a given Ni, KLi) and if not, it will insert it as to prevent replay attacks. After this, Vj performs the following processing:

It retrieves G's identity (GId) with associated key list KLi.

It validates cryptogram (i.e. re-compute and compare for legacy use. case) Cr for $P'=xx \ldots xx$, with the value $yy \ldots yy$. Note that KLi and KLs (not present in $P'$) are also part of the cryptographic process and must be available.

It performs the cryptographic validation of its result (recomputed $yy \ldots yy$) with the value received as cryptogram in the transaction credentials generated by G (received $yy \ldots yy$).

It sets the results in the Validation Outcome (VO) vector as following:

cryptoValidation=SUCCESS (no cryptogram validation failed for this PAN/TUR: recomputed $yy \ldots yy$=received $yy \ldots yy$).

replayDetection=NO_REPLAY ($P'$ was not in its list for the PAN/TUR on that Ni with that KLi).

retryControl=NO_RETRY (this field will be populated for the acceptance mode "L" only, while for the other acceptance types will stay as NO_RETRY).

expiryDate=STANDARD (no end of the month issue).

As validation succeeds, V returns "Continue Processing" to the authorization system (and hence to Issuer) from the transaction credentials validation service.

Vj reports whether Vj is the only node that validates transaction credentials generated by G, or whether there are other Vk (with $k \neq j$) that may validate transaction credentials generated by G, by sending KL.Isolation from its associated key list. (In this monitoring case we assume that Vj is the only validating node able to validate transaction credentials generated by G. In that case KL.Isolation=TRUE. This means that mVj does not need to escalate to M to mark $P'$ as used in the transaction credentials validation by Vj, as this isolation means that the coordinated monitoring does not need to act as a broadcasting service to inform other V's about the use of $P'$.

As before, validation monitoring takes place after a validation result has been returned, and the following steps take place in near real time:

3. Vj informs, in near real-time, its local monitoring process mVj about the completion of the transaction credentials validation service with an in-node monitoring message that sends the trace {GId, $P'=xx \ldots xx$, $Cr=yy \ldots yy$, VO} to mVj 4. mVj receives the trace of the validation of transaction credentials and performs the following processing:

It stores in its transactions database mVTRX DB the trace {GId, $P'=xx \ldots xx$, $Cr=yy \ldots yy$, VO}.

It checks whether there are other validation processes than Vj that can validate transaction credentials generated by G:

If KL.Isolation=TRUE, then mVj does not need to escalate to M to inquire about cross-node activity.

If KL.Isolation=FALSE, then mVj will escalate to M that it has interacted with a multi-validator generation process. This will trigger M to mark cross-node that the current LTC was used.

mVj will also keep in mVTRX DB a counter of the executions of the transaction credentials validation service, denoted with CtrTrxV. This counter will be incremented with any successful reporting of a transaction credentials validation service, and can be used to support the End of Period Balance Monitoring Flow—EoPBALANCE (discussed with reference to FIG. 31 further below).

The use of this monitoring structure will now be considered with reference to a number of different potential vulnerabilities.

FIG. 24 shows a monitoring flow detecting a replay attack (attempted resubmission of credentials that have already been validated). This can lead to suspension of access for a merchant or PSP to the transaction credentials generation service. The relevant initialization state of the flow is as follows:

- a Transaction Database of mG (mGTRX DB) has a generation trace for a transaction with P'=xx . . . xx, Cr=yy . . . yy, MID.
- b LTC Database of V (VLTC DB) has NO trace of the challenge P'=xx . . . xx for the PAN/TUR (for a given Ni, KLi)—it is here assumed to be possible for an attacker to clean up this database.
- c Transaction Database of mV (mVTRX DB) has a validation trace for a transaction with P'=xx . . . xx, Cr=yy . . . yy, MID.

The steps of the flow are as follows, with the steps below corresponding to the numbered steps in FIG. 24.

1. The merchant (or PSP) MID submits a transaction with P'=xx . . . xx, Cr=yy . . . yy, MID to the acquirer using transaction credentials previously returned by the generation service following a service request to the G process.
2. Vj receives the transaction credentials and checks that P' is not already in its VLTC DB for the PAN/TUR (for a given Ni, KLi) and if not, it will insert it as to prevent replay attacks-here it is assumed that P' is not already present as result of action by an attacker. After this, Vj performs the following processing (exactly as in the FIG. 23 case):

It retrieves G's identity (GId) with associated key list KLi.

It validates cryptogram (i.e. re-compute and compare for legacy use case) Cr for P'=xx . . . xx, with the value yy . . . yy. Note that KLi and KLs (not present in P') are also part of the cryptographic process and must be available.

It performs the cryptographic validation of its result (recomputed yy . . . yy) with the value received as cryptogram in the transaction credentials generated by G (received yy . . . yy).

It sets the results in the Validation Outcome (VO) vector as following:

cryptoValidation=SUCCESS (no cryptogram validation failed for this PAN/TUR: recomputed yy . . . yy=received yy . . . yy).

replayDetection=NO_REPLAY (P' was not in its list for the PAN/TUR on that Ni with that KLi).

retryControl=NO_RETRY (this field will be populated for the acceptance mode "L" only, while for the other acceptance types will stay as NO_RETRY).

expiryDate=STANDARD (no end of the month issue).

As validation succeeds, V returns "Continue Processing" to the authorization system (and hence to Issuer) from the transaction credentials validation service.

Vj reports whether Vj is the only node that validates transaction credentials generated by G, or whether there are other Vk (with k≠j) that may validate transaction credentials generated by G, by sending KL.Isolation from its associated key list. (In this monitoring case we assume that Vj is the only validating node able to validate transaction credentials generated by G. In that case KL.Isolation=TRUE. This means that mVj does not need to escalate to M to mark P' as used in the transaction credentials validation by Vj, as this isolation means that the coordinated monitoring does not need to act as a broadcasting service to inform other V's about the use of P'.

3. Vj informs, in near real-time, its local monitoring process mVj about the completion of the transaction credentials validation service with an in-node monitoring message that sends the trace {GId, P'=xx . . . xx, Cr=yy . . . yy, VO} to mVj
4. mVj receives the trace of the validation of transaction credentials and performs the following processing:

It <u>detects</u> a clash of payment proof as its transactions database mVTRX DB already contains the trace {GId, P'=xx . . . xx, Cr=yy . . . yy, VO}. This database is not susceptible to attack by an attacker, given the separation between service provision and monitoring.

It checks whether there are other validation processes than Vj that can validate transaction credentials generated by G. Since KL.Isolation=TRUE, mVj does not need to escalate to M to inquire cross-node as there are no other validation routes.
5. mVk prepares an in-node or inter-node Reporting message to indicate that there has been a replay attack using P'=xx . . . xx, Cr=yy . . . yy, MID, and submits it to the relevant mG.
6. After receiving this message, mG marks this transaction in the mGTRX DB as "replay attack" and keeps it available beyond the key list interval (archiving it) for a dispute resolution process.
7. mG informs the access control system with an in-node Action message that it is necessary to block access to the generation service for the merchant (or PSP) with MID until the dispute is resolved.
8. The access control system blocks access to the service for the merchant (or PSP) adding MID in its black access control list.
9. The access control mechanism can also send an outbound API to the merchant (or PSP) telling them of the suspension of their subscription to transaction credentials generation service.

FIG. 25 shows a monitoring flow that prevents a replay attack involving multiple nodes, here termed a double-spending attack. This is prevented by a post-transaction action flow running in near real-time that prevents the double spending of a valid payment message in the following two cases: multi-acquirer merchant (or PSP) attack; and merchant (or PSP) attack on a multi-node acquirer. In either case the attacker is hoping that two or more transactions performed with the same payment message may be authorised as the same valid payment message will be treated in multiple nodes and that their databases (particularly VLTC DB) may not be effectively synchronised:

For a multi-acquirer merchant (or PSP) attack the attacker may expect that the transaction credentials validation service will use nodes closest to the acquirer that presents the payment message, which may be different for acquirers in different geographies (e.g. one located in US and the other in Europe).

For a merchant (or PSP) attack on a multi-node acquirer, the attacker may for example try to exploit the policy of an acquirer to send its transactions to two different nodes that use different service fees for their merchants (or PSPs) based on time of day. This may be a feature of a distributed payment system to assign the transactions processing depending on the load of the nodes. For example, an acquirer may use a first node for day-light transactions and a different node for night transactions.

The following features of the system may be assumed:

G performs transaction credentials generation for any acceptance case.

G is assigned to a key list indicating that several validating nodes may check its transaction credentials, so KL.Isolation=FALSE (G does not work with a single validator but in distributed network with more than one validator).

The length of the generated cryptogram Cr=yy . . . yy depends on the acceptance mode, and it may range from:

Decimalized value (two digits D2D1) based on HMAC cryptogram—in case of "L" acceptance using CVC to carry counter information (C) and cryptogram (D2D1).

8 bytes truncated cryptogram consisting of the leftmost 8 bytes of the HMAC cryptogram—in case of "U" acceptance and of "D1" acceptance (DPD Option #1).

16 bytes truncated cryptogram consisting of the leftmost 16 bytes out of the HMAC 32 bytes—in case of "D2" acceptance (DPD Option #2).

The transaction credentials service was invoked by a merchant (or PSP) with MerchantID=MID.

Transaction credentials generated by G can be validated by in a set of two validators (either Vj or Vk) as described above.

Vj can be either in the same node with G or in a different node.

Vj validates transaction credentials generated by G with P'=xx . . . xx of adequate length, depending on the acceptance type. Note that KLi and KLs (not present in P') are also part of the cryptographic process and must be available.

Vj validates the cryptogram as part of transaction credentials validation:

Passes the cryptogram validation without any crypto failure: cryptoValidation=SUCCESS. As such Vj inserts P'=xx . . . xx in its VLTC DB for the PAN/TUR (for a given Ni, KLi).

Does NOT flag a replay attempt: replayDetection=NO_REPLAY.

Does NOT retry during crypto validation: retryControl=NO_RETRY.

Does NOT validate in a day at the end of the month: expiryDate=STANDARD.

The steps of the flow are as follows, with the steps below corresponding to the numbered steps in FIG. 25.

1. G performs the following operations:

Computes the cryptogram Cr=yy . . . yy and returns it as part of the transaction credentials with appropriate length depending on the acceptance type in the transaction credentials generation service response to the merchant (or PSP), which is then sent on to the transaction system via the acquirer.

Composes an in-node monitoring message for sending to mG passing as parameters P'=xx . . . xx, Cr=yy . . . yy, and the identifier MID of the merchant (or PSP) that initiated the service demand.

2. mG receives the in-node monitoring message {P'=xx . . . xx, Cr=yy . . . yy, MID} from G and stores it in its mGTRX DB as a trace of the transaction.

3. Vj receives the transaction credentials and performs the following processing:

It checks that P' is not in its VLTC DB for the PAN/TUR (for a given Ni, KLi), which means that Vj is not aware of any replay attempt for this payment message.

It retrieves G's identity GId with associated key list KLi.

It validates the cryptogram (i.e. re-computes and compares for a legacy use case) Cr for P'=xx . . . xx, with the value yy . . . yy. Note that KLi and KLs (not present in P') are also part of the cryptographic process and must be available.

It performs the cryptographic validation of its result (recomputed yy . . . yy) with the value received as cryptogram in the transaction credentials generated by G (received yy . . . yy).

It sets appropriately the results in the Validation Outcome (VO) vector as follows:

cryptoValidation=SUCCESS (no cryptogram validation failed for this PAN/TUR: recomputed yy . . . yy=received yy . . . yy).

replayDetection=NO_REPLAY (P' was not in its list for the PAN/TUR on that Ni with that KLi).

retryControl=NO_RETRY (this field will be populated for the acceptance mode "L" only, while for the other acceptance types will stay as NO_RETRY).

expiryDate=STANDARD (no end of the month issue).

As validation succeeds, V returns "Continue Processing" to the authorization system (with onward transmission to the Issuer) as the outcome of the transaction credentials validation service.

Vj also reports whether Vj is the only node that can validate transaction credentials generated by G or whether there are other Vk (with k≠j) that may validate transaction credentials generated by G, by sending KL. Isolation from its associated key list. In this monitoring case, we assume that Vj is in a list of validating nodes with other validating nodes (e.g. Vk) able to validate transaction credentials generated by G. In that case KL.Isolation=FALSE. This means that mVj needs to escalate to M to mark P' as used in a transaction credentials validation process (by Vj). The coordinated monitoring M will then broadcast to any other validation services V able to validate this credential that P' has been used, with the result that it should not be used for validating other payment messages.

4. mVj receives the transaction credentials and performs the following processing:

It stores in its transactions database mVTRX DB the trace {GId, P'=xx . . . xx, Cr=yy . . . yy, VO}.

It checks whether there are other validation processes than Vj that can validate transaction credentials generated by G:

If KL.Isolation=TRUE, then mVj does not need to escalate to M make a cross-node enquiry.

If KL.Isolation=FALSE, then mVj will escalate to M that it is interacting with a multi-validator generation process. This will trigger M to mark cross-node that the current LTC/P' was used by another validating node.

5. In this case, since KL.Isolation=FALSE then M is informed with an escalation message about the validated challenge P' together with the validation outcome (VO) corresponding to validation of transaction credentials generated by G (identified by GId).

6. When receiving this message, M will perform the following monitoring actions:

Check for the corresponding list of nodes that can validate the transaction credentials, denoted validatingNodes {Vj, Vk, . . . }. From this list it retrieves that Vk is also a node that may validate the transaction credentials generated by G (identified by GId).

Prepare one or more distributed action messages, corresponding to the number of nodes in the list of validatingNodes, except for the node that just validated the transaction credentials. The message will include among others the used challenge P'=xx . . . xx and the identifier of the node that performed the validation.

7. In this example there is only one node, Nk and its local verification monitoring process mVk, that needs to be sent a distributed action message to inform it about the use of P'=xx . . . xx.

8. When this message is received, mVk will inform in its turn Vk about the use of P'.

9. Vk will check that P' is not already in its VLTC DB for the PAN/TUR (for a given Ni, KLi) and if not, it will insert it as to prevent replay attacks.

By taking these steps, the monitoring process has enabled the system to identify not only replay attacks at a single node but also replay attacks involving multiple nodes. The reaction flows then vary depending on the situation as follows.

The reaction flow to be performed when a double-spending attack (replay attack with multiple nodes) is detected is provided below for the following two cases:

One G, but validation by separate Vj and Vk. In this case the near real-time action of the coordinated monitoring M adds P' to the VLTC DB of Vk for the PAN/TUR (for a given Ni, KLi) determines that this value was already used (step 9 in previous section) by Vk.

Single G and V—in this case the process is triggered by the validation of transaction credentials by V with no need for intervention of the coordinated monitoring M. At the moment of validation V sees that the P' has already been used before, as it is marked in its VLTC DB for the PAN/TUR (for a given Ni, KLi).

The protection in near real-time against a double-spending attack described in the previous paragraph can prevent the majority of fraud attempts. However, if the attacker has the possibility to submit P' in transaction credentials validation before the monitoring made it known to the node Vk, the attempt at prevention made by Vj will not be effective. Therefore, an extended flow is needed that includes a Reaction to signal that double-spend fraud has been detected. For the case of one G and two Vs this extended flow is shown in FIG. 26. While total prevention could have been achieved if the steps shown above had allowed Vk to be aware of earlier spending, the attack may be contained if it is determined in step 9 that P' has already been used.

10. Vk informs mVk with an in-node monitoring message that P'=xx . . . xx has already been used as a payment message since it is present in its VLTC DB for the PAN/TUR (for a given Ni, KLi).

11. mVk prepares an in-node/inter-node Reporting message about the double-spending of the payment message with P'=xx . . . xx, and submits it to mG.

12. After receiving this message, mG marks the transaction in the mGTRX DB as "double-spent" and keeps it available beyond the key list interval (archiving it) for the subsequent dispute resolution process.

13. mG informs the access control system with an in-node action message that it is necessary to block access to the service for the merchant (or PSP) with MID until the dispute resolution process is resolved.

14. The access control system blocks the access to the service for the merchant (or PSP) adding MID in its black access control list.

Here the primary objective of mVk is to notify G so that the merchant (or PSP) can be blacklisted so it will stop generating transaction credentials that can be misused. This decision to block could be taken when the first replay is detected, or when the number of replays exceeds a limit defined in the associated key list.

mVk may also escalate the detected issue to the coordinated monitoring M. Here, the objective would be for M to distribute the information to all mVs (and associated Vs using in-node messaging) if this is necessary to stop the validation of all transaction credentials that are part of transactions coming from that MID—this is not explicitly shown in FIG. 26. The same approach could be taken to communicate to a list of mGs (to cascade to the relevant Gs) where the merchant (or PSP) is using more than one node for the generation of transaction credentials.

FIG. 27 indicates the use of the monitoring system to detect and communicate replay fraud between an associated G and V—this is here a replay attack attempted by a merchant (or PSP) on a single node Vj validating transaction credentials generated by G.

The steps of the flow are as follows, with the steps below corresponding to the numbered steps in FIG. 27.

1. G performs the following operations:

Computes the cryptogram Cr=yy . . . yy and returns it as part of the transaction credentials with appropriate length depending on the acceptance type in the transaction credentials generation service response to the merchant (or PSP), which is then sent on to the transaction system via the acquirer.

Composes an in-node monitoring message for sending to mG passing as parameters P'=xx . . . xx, Cr=yy . . . yy, and the identifier MID of the merchant (or PSP) that initiated the service demand.

2. mG receives the in-node monitoring message {P'=xx . . . xx, Cr=yy . . . yy, MID} from G and stores it in its mGTRX DB as a trace of the transaction.

3. Vj receives the transaction credentials from merchant (or PSP) and attempts to add P' to the list of challenges that have already been used, but finds this value for P' is already in its VLTC DB for the PAN/TUR (for a given Ni, KLi)—this indicates that there has been a replay. Vj performs the transaction credentials validation, and in this example we show a case where the number of replay exceeds a limit defined in the key list (KLi).

4. Vj sends an in-node monitoring message for P'= xx . . . xx, Cr=yy . . . yy, GId, KL.Isolation indication, and a VO filled in with the replay detection indication of REPLAY_EXCEEDED to mVj.

5. mVj verifies the KL.Isolation indication, and if it is TRUE, it signals a replay attack by the merchant (or PSP) without a need for escalation to M.

6. mVj sends an in-node/inter-node reporting message with an indication of a "Replay attack" for the challenge P'=xx . . . xx.

7. mG marks the transaction in its mGTRX DB as a "replay", for archiving it for any further dispute resolution process.

8. mG will inform the access control system with an in-node action message that it is necessary to block access to the transaction credentials generation service for the merchant (or PSP) with MID until the dispute resolution process is resolved.

9. The access control system blocks the access to the service for the merchant (or PSP) by adding MID to its black access control list.

FIGS. 28 to 30 relate to the use of the monitoring system to detect and signal different types of guessing attacks. FIG. 28 relates to the situation where there is no malicious intent, but only a processing error introduced by the acceptance infrastructure; FIG. 29 relates to a guessing attempt made by a single Merchant (or PSP); whereas FIG. 30 relates to a guessing attempt made by a coalition of dishonest Merchants (or PSPs).

In the FIG. 28 case a processing error in the acceptance infrastructure of the merchant (or PSP) has led to a wrong value in the transaction credentials. The following assumptions are made:

G performs transaction credentials generation for an acceptance case where guessing is possible (e.g. legacy acceptance case "L", where the cryptogram generated is D2D1=yy (on two digits).

The transaction credentials generation service was requested by a merchant (or PSP) with MerchantID=MID.

Transaction credentials generated by G can be validated by a Vj either in the same node or in a different node.

Vj validates transaction credentials generated with LTC=8 by G. V inserts LTC=8 in its VLTC DB for the PAN/TUR (for a given Ni, KLi).

Vj validates cryptogram as part of transaction credentials validation with D2D1=xx (≠yy):

Vj does NOT pass the cryptogram validation and does exceed the number of admitted failures: cryptoValidation=FAILURE_EXCEEDED.

Vj does NOT flag a replay attempt: replayDetection=NO_REPLAY.

Vj does NOT retry during crypto validation (since LTC≤19): retryControl=NO_RETRY.

The monitoring and reaction flow shown in FIG. 28 is described below.

1. G performs the following operations:

Computes the cryptogram Cr=yy . . . yy and returns it as part of the transaction credentials with appropriate length depending on the acceptance type in the transaction credentials generation service response to the merchant (or PSP), which is then sent on to the transaction system via the acquirer.

Composes an in-node monitoring message for sending to mG passing as parameters P'=xx . . . xx, Cr=yy . . . yy, and the identifier MID of the merchant (or PSP) that initiated the service demand.

2. mG receives the in-node monitoring message {P'=xx . . . xx, Cr=yy . . . yy, MID} from G and stores it in its mGTRX DB as a trace of the transaction.

3. Vj receives the transaction credentials and performs the following processing:

It validates the cryptogram (i.e. re-compute and compare for legacy use case) D2D1 for LTC=8, with the value yy.

It performs the cryptographic validation of its result (yy) with value (xx) received as D2D1 from G.

It sets appropriately the results in the Validation Outcome (VO) vector as follows:

cryptoValidation=FAILURE_EXCEEDED (yy≠xx and overpass of number of cryptogram validations failed, since acceptance error is assumed to be persistent).

replayDetection=NO_REPLAY (LTC=8 was not in its VLTC DB for the PAN/TUR on that Ni with that KLi).

retryControl=NO_RETRY (LTC≤19).

expiryDate=STANDARD (no end of the month issue).

As validation has failed, Vj returns "Decline" to the authorization system (and hence to the Issuer) as the transaction credentials validation service result.

Vj reports to the monitoring level as to whether Vj is the only node that validates transaction credentials generated by G, or whether there are other Vk (with k≠j) that may validate G's transaction credentials, by sending KL.Isolation. In this monitoring case we assume that Vj is the only one validating G's transaction credentials since KL.Isolation=TRUE. This means that mVj does not need to escalate to M to find out whether the same LTC was used by someone else in the network (as we have shown in previous sections for the challenge P').

Vj composes an in-node monitoring message that sends the received transaction credentials, i.e., {LTC=8, D2D1=xx, VO, KL.Isolation} to mVj.

4. mVj receives the message and performs the following processing:

It stores in its transactions database mVTRX DB the trace {LTC=8, D2D1=xx, VO}.

It checks whether there are other validation processes than Vj that can validate transaction credentials generated by G:

If KL.Isolation=TRUE, then mVj does not need to escalate to M to address cross-node double-spending.

If KL.Isolation=FALSE, then mVj escalates to M that it has interacted with a multi-validator generation process. This will trigger M to verify cross-node whether the current LTC was or was not used by another validating node. In this case, since KL.Isolation=TRUE then M is not involved and no escalation message is sent by mVj.

Instead, mVj composes an in-node/inter-node reporting message informing mG about the cryptographic failure detected by V on the LTC=8. To this end, the reporting message carries over the LTC value itself, the value of the cryptogram D2D1 as received by V (i.e., xx), and the Validation Outcome (VO) vector.

5. mG verifies VO and detects that VO.cryptoValidation="FAILURE_EXCEEDED". mG infers that it must check on the suspicion of a guessing attack by the Merchant (or PSP) MID. To this end, mG performs the following processing:

Checks in its mGTRX DB whether it has recorded a generation of transaction credentials with LTC=8.

If there is a record corresponding to this:

Checks that the D2D1 value received from mVj (xx) is indeed different than the value (yy) generated by G (and traced in mG).

Identifies the Merchant (or PSP) who submitted a transaction that triggered the transaction credentials validation service. This merchant (or PSP) was expected to send the D2D1=yy value unaltered to the acquirer after getting it in the transaction credentials generation service response from G. If the cryptogram received in transaction credentials by Vj is different (i.e., xx), we may suppose that some alteration by the merchant/PSP/acquirer has happened.

If VO.cryptoValidation=FAILURE_EXCEEDED this means that merchant (or PSP) infrastructure is corrupted and has performed multiple (consistent) errors. The merchant (or PSP) should then be blacklisted in the Access Control List (ACL) managed by the access control mechanism associated with G until it repairs its infrastructure to work correctly.

Otherwise, if VO.cryptoValidation="FAILURE", the merchant (or PSP) will typically be tolerated, as this may be a one-time or immediately correctable problem rather than a systemic fault.

6. In the event that blacklisting is needed, mG will create an in-node action for the access control logic of G to block the merchant (or PSP) MID until it has upgraded/corrected its infrastructure.

7. After receiving this action message, the access control mechanism can add MID in the black access control list in order to temporarily forbid the Merchant (or PSP) to access the transaction credentials generation service.

8. The access control mechanism can also send an outbound API to the merchant (or PSP) indicating that the service is interrupted until the infrastructure fault is addressed.

FIG. 29 shows a monitoring and signalling flow where the Merchant is malicious, rather than facing an infrastructure fault. This monitoring flow is intended to contain the threat of a merchant (or PSP) introducing false transactions in the system. For these transactions:

No transaction credentials were legitimately generated by G.

The merchant (or PSP) attempted a guess xx for the cryptogram value contained in the transaction credentials, with the hope of creating and cashing forged payment transactions.

This process is shown in FIG. 29, with steps as follows:

1. The attacker proceeds as follows:

Guesses cryptogram D2D1=xx and sends it as part of transaction flow to the transaction scheme via the acquirer. In this case, the value is an incorrect guess, since G would have generated a cryptogram value yy (as part of transaction credentials generation) for the corresponding LTC with yy≠xx.

G receives NO transaction credentials generation service request from merchant (or PSP) MID.

NO in-node monitoring message is sent from G towards mG.

2. mG receives NO in-node monitoring message from G and does NOT store in its mGTRX DB any trace of the transaction {LTC=8, D2D1=xx, MID}.

3. The processing performed by Vj is slightly modified compared with the processing performed at the same step in the FIG. 26 case, as the MID received from the Acquirer must be passed further to mVj in the in-node monitoring message. The rest of the processing performed by Vj remains the same.

4. The processing performed by mVj is slightly modified compared with the FIG. 26 case, in the sense that the MID received from mVj must be passed further to mG in the in-node or inter-node reporting message.

5. mG verifies VO, and detects that VO.cryptoValidation="FAILURE_EXCEEDED" (here it is assumed that the merchant (or PSP) is not the first guessing attempt for that PAN/TUR on that LTC and that the attacker acted alone and not in a coalition/collusion with other Merchants or PSPs). mG infers that it must check on the suspicion of a guessing attack by the merchant (or PSP) MID. To this end, mG performs the following processing:

Checks in its mGTRX DB whether it has recorded a generation of transaction credentials with LTC=8.

Since there is NO record corresponding to it:

Stores in mGTRX DB a guessing attack trace proof {LTC=8, D2D1=xx, VO, MID}.

Identifies the merchant (or PSP) that introduced the rogue payment message using the MID.

If VO.cryptoValidation=FAILURE_EXCEEDED this means that merchant (or PSP) performed multiple rogue transactions attempts. The merchant (or PSP)

should be blacklisted in the Access Control List (ACL) managed by the access control mechanism associated with G until an audit triggered by the Acquirer or the transaction scheme clarifies the position.

Otherwise, if VO.cryptoValidation="FAILURE", then mG should look for other guessing attack trace proofs (see the FIG. 28 case below)).

6. mG creates an in-node action message for the access control logic of G to block the merchant (or PSP) MID as suspected of "Guessing Attack" until audit and appropriate corrective actions are undertaken.

7. After receiving this in-node action message, the access control mechanism adds MID in the black access control list in order to temporarily forbid the Merchant (or PSP) to access to the service.

8. The access control mechanism can also send an outbound API to the merchant (or PSP) advising that the service will be interrupted until a fraud and risk management audit has taken place.

The FIG. 30 case shows monitoring in the case of a guessing attempt by a coalition of dishonest Merchants (or PSPs). In this monitoring scenario we try to spot a collusion of two (or more) dishonest merchants (or PSPs). In this collusion, the total number of guesses for a cryptogram (contained in transaction credentials) is limited to only once or twice—in this way the Validation Outcome for the cryptoValidation remains at the level "FAILURE", but is not flagged with a cryptoValidation=FAILURE_EXCEEDED in the ValidationOutcome of a Vj to avoid black listing in the access control process. This allows attempts to continue in search of a correct guess without suspension of Merchant access to the transaction credentials validation service (as part of the processing of transactions) which may be combined with a suspension of their access to the transaction credentials generation service.

The monitoring flow is almost identical with the one shown in FIG. 27 with a few differences identified below:

At step 3, the VO reports VO.cryptoValidation=FAILURE (instead of FAILURE_EXCEEDED).

At step 5, if the VO.cryptoValidation=FAILURE then the processing is performed as follows:

Search another rogue transaction {LTC=8, D2D1=zz, VO, colludingMID} in the mGTRX DB coming from a different merchant (or PSP) (which is assumed to collude with the merchant in this transaction) for the same LTC.

If this is found, then both merchants (or PSPs) are blacklisted with MID and colludingMID as attempting a Collusion Attack.

Keep a trace of the current rogue transaction marked as a collusion, i.e., {LTC=8, D2D1=xx, VO, MID, collusion} for further auditing of the merchants (or PSPs) that attempted the guessing attack.

Else (i.e., no other fake transaction found for LTC=8 with another merchant (or PSP)) continue processing with no escalations.

FIG. 31 shows a further monitoring process to be carried out at the end of a period of validity for a particular key list. This allows statistics relating to the transaction credentials generated and validated for a (or a list of) PAN/TUR at the end of a key list validity period to be assessed. The objective is to identify any discrepancy with the counters (generation [CtrTrxG] vs. validation [CtrTrxVj, CtrTrxVk . . . ]) that may reveal some attempts to misuse the system.

The monitoring process shown in FIG. 31 is as follows:

1, 1.j, 1.k At the end of a period, each node—whether generation or validation—provides an in-node monitoring message to its corresponding monitoring processes mG, mVj, mVk (respectively) indicating their list of challenges P' at the end of period for the given key list.

2.j, 2.k On receiving this information, the monitoring processes inspect their respective mGTRX DB, VTRX DB Vj, VTRX DB Vk, to retrieve information concerning the counter for successful transaction credentials generations (CtrTrxG) for a generator node, and the counter for successful transaction credentials validations for which the Validation Outcome indicated no failure for crypto validation, and no replay indications, denoted CtrTrxVj, CtrTrxVk . . . .

3.j, 3.k The nodes validating transaction credentials generated from a certain generator will report their counter of validated transaction credentials (CtrTrxV) and the list with the used challenges (VLTCList (V)). To this extent, each Vj, Vk will send in-node/inter-node reporting messages indicating both CtrTrxVj, and VLTCList (Vj), for each validating node (only two in the example shown in FIG. 31, namely: Vj, Vk).

4 After receiving the aforementioned information from all validating nodes, mG will perform two balance equations:

$$\text{Check that } CtrTrxG \geq (CtrTrxVj + CtrTrxVk + \ldots ).$$

Check the intersection of any two VLTCList (Vj) and VLTCList (Vk), with j≠k, is empty (which means that were no double-spending attempts).

5.j, 5.k If both of these two equations above are verified, mG will send an in-node/inter-node reaction message indicating the closing of the balance for that PAN/TUR for each validating node.

6.j, 6.k As a consequence, each node will delete from its corresponding transactions database all the transactions that closed the balance for that PAN/TUR, as those will be not disputed.

7 If any of the balance equations does not verify, an escalation will be forwarded for that PAN/TUR from mG to the coordinated monitoring M.

8, 8.j, 8.k M will in its term coordinate Distribute actions to block the PAN/TUR and to store the corresponding disputed transactions in the mVTRXDB of each validating node Vj, Vk . . . .

As the skilled person will appreciate, the embodiments described above are exemplary, and further embodiments falling within the spirit and scope of the disclosure may be developed by the skilled person working from the principles and examples set out above. In particular, the embodiments described in detail above relate particularly to the generation and validation of credentials used in financial transactions. Generation and validation of credentials in this way is not limited to financial transactions—this approach may be used in any distributed system where it is necessary for one party to confirm that a legitimate action has been taken by another party, where the two parties may be accessing different nodes of the distributed system.

The invention claimed is:

1. A method of monitoring a first service performed at a computing node, wherein the computing node is one of a plurality of computing nodes in a distributed computing system, wherein each node is adapted to perform at least one service for clients, wherein a first monitoring process is adapted to monitor a first service process performing the first service, the method comprising:

monitoring the first service process for expected use of the first service;

capturing a first execution trace relating to use of the first service for a first transaction, wherein the first execution trace relates to generation of a credential;

storing the first execution trace in a first transaction database associated with the first service;

providing monitoring information between the first monitoring process and a second monitoring process for a second service process, wherein the first service process comprises generation of the credential and the second service process comprises validation of the credential, and wherein the credential includes a transaction-related challenge, a cryptogram, and an identifier for a requesting party; and determining, based on the transaction-related challenge, whether the credential has been misused;

wherein the monitoring information provided between the first monitoring process and the second monitoring process includes the transaction-related challenge and an indication of credential misuse.

2. The method of claim 1, wherein the first execution trace includes the transaction-related challenge and the cryptogram.

3. The method of claim 2, further comprising:

checking the first execution trace against any records gathered relating to a particular card/token for the first transaction; and storing a current generation service execution as a new record if no records relating to the particular card/token for the first transaction are located.

4. The method of claim 1, further comprising:

capturing a second execution trace relating to use of a second service for the first transaction, wherein the second execution trace relates to validation of the credential; and storing the second execution trace in a second transaction database associated with the second service.

5. The method of claim 4, wherein the second execution trace includes the transaction-related challenge and the cryptogram.

6. The method of claim 5, further comprising:

receiving transaction credentials relating to a second transaction;

detecting a replay attack based on matching the transaction credentials relating to the second transaction with the transaction-related challenge and the cryptogram in the second execution trace.

7. A computing node to monitor a first service performed in a distributed information security system, the computing node comprising:

a hardware security module (HSM) to store a plurality of keys, wherein the computing node is one of a plurality of computing nodes in a distributed computing system, wherein each node is adapted to perform at least one service for clients, wherein a first monitoring process is adapted to monitor a first service process performing the first service;

wherein the computing node is adapted to:

monitor the first service process for expected use of the first service;

capture a first execution trace relating to use of the first service for a first transaction, wherein the first execution trace relates to generation of a credential;

store the first execution trace in a first transaction database associated with the first service;

provide monitoring information between the first monitoring process and a second monitoring process for a second service process, wherein the first service process comprises generation of the credential and the second service process comprises validation of the credential, and wherein the credential includes a transaction-related challenge, a cryptogram, and an identifier for a requesting party; and determine, based on the transaction-related challenge, whether the credential has been misused;

wherein the monitoring information provided between the first monitoring process and the second monitoring process includes the transaction-related challenge and an indication of credential misuse.

8. The computing node of claim 7, wherein the first execution trace includes the transaction-related challenge and the cryptogram.

9. The computing node of claim 8, wherein the computing node is further adapted to:

check the first execution trace against any records gathered relating to a particular card/token for the first transaction; and store a current generation service execution as a new record if no records relating to the particular card/token for the first transaction are located.

10. The computing node of claim 8, wherein the computing node is further adapted to:

capture a second execution trace relating to use of a second service for the first transaction, wherein the second execution trace relates to validation of the credential; and store the second execution trace in a second transaction database associated with the second service.

11. The computing node of claim 10, wherein the second execution trace includes the transaction-related challenge and the cryptogram.

12. The computing node of claim 11, wherein the computing node is further adapted to:

receive transaction credentials relating to a second transaction;

detecting a replay attack based on matching the transaction credentials relating to the second transaction with the transaction-related challenge and the cryptogram in the second execution trace.

13. A computing node to monitor a first service performed in a distributed information security system, the computing node comprising:

a hardware security module (HSM) to store a plurality of keys, wherein the computing node is one of a plurality of computing nodes in a distributed computing system, wherein each node is adapted to perform at least one service for clients, wherein a first monitoring process is adapted to monitor a first service process performing the first service;

wherein the computing node is adapted to:

monitor the first service process for expected use of the first service;

provide monitoring information between the first monitoring process and a second monitoring process for a second service process, wherein the first service process comprises generation of a credential and the second service process comprises validation of the credential, and wherein the credential includes a transaction-related challenge, a cryptogram, and an identifier for a requesting party; and determine, based on the transaction-related challenge, whether the credential has been misused;

wherein the monitoring information provided between the first monitoring process and the second monitoring process includes the transaction-related challenge and an indication of credential misuse.

14. The computing node of claim 13, wherein the computing node is further adapted to implement a remedial action in response to determining, based on use of the transaction-related challenge, that the credential has been misused.

15. The computing node of claim 14, wherein the remedial action includes one or more of precluding generation of credentials for transactions involving the requesting party or precluding validation of credentials for transactions involving the requesting party.

16. The computing node of claim 14, wherein the transaction-related challenge includes a transaction counter.

17. The computing node of claim 13, wherein misuse of the credential is determined to involve a replay attack.

18. The computing node of claim 13, wherein the computing node is further adapted to:

receive a second credential, wherein the second credential includes a second transaction-related challenge, a second cryptogram, and an identifier for a second requesting party;

determine that the second credential was not generated by the first service process; and implement a remedial action in response to determining that the second credential was not generated by the first service process;

wherein the monitoring information provided between the first monitoring process and the second monitoring process includes a validation failure outcome.

19. The computing node of claim 18, wherein the remedial action includes precluding generation of credentials for transactions involving the second requesting party.

20. The computing node of claim 15, wherein the computing node is further adapted to:

assess statistics relating to generated transaction credentials and validated transaction credentials for a particular card or token during a key list validity period, wherein assessing the statistics includes to:

compare a counter for successful transaction credential generations with a counter for successful transaction credential validations; and compare lists of validated transaction-related challenges; and based on assessing the statistics, report disputed transactions via an escalation message to a coordinated monitoring process for implementing a second remedial action, wherein the coordinated monitoring process is associated with multiple service processes, and wherein the second remedial action includes blocking the particular card or token.

* * * * *